(12) United States Patent
Kume et al.

(10) Patent No.: US 12,728,879 B2
(45) Date of Patent: Sep. 8, 2026

(54) VEHICLE NOTIFICATION CONTROL DEVICE AND VEHICLE NOTIFICATION CONTROL METHOD

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 64 days.

(21) Appl. No.: 18/817,641

(22) Filed: Aug. 28, 2024

(65) Prior Publication Data

US 2024/0416945 A1 Dec. 19, 2024

Related U.S. Application Data

(63) Continuation of application No. PCT/JP2023/007207, filed on Feb. 28, 2023.

(30) Foreign Application Priority Data

Mar. 7, 2022 (JP) ................................ 2022-034622
Feb. 21, 2023 (JP) ................................ 2023-025462

(51) Int. Cl.
*B60W 50/14* (2020.01)
*B60K 35/28* (2024.01)
*B60W 30/18* (2012.01)
*B60W 60/00* (2020.01)

(52) U.S. Cl.
CPC ............ *B60W 50/14* (2013.01); *B60K 35/28* (2024.01); *B60W 30/18154* (2013.01); *B60W 30/18159* (2020.02); *B60W 60/001* (2020.02); *B60K 2360/126* (2024.01);
(Continued)

(58) Field of Classification Search
CPC .......... B60W 50/14; B60W 30/18159; B60W 60/001; B60W 30/18154; B60W 2050/146; B60K 35/28; B60K 2360/1868; B60K 2360/191; B60K 2360/126
See application file for complete search history.

(56) References Cited

U.S. PATENT DOCUMENTS 6,317,687 B1 * 11/2001 Morimoto .......... B60R 16/0373 701/443
8,170,795 B2 * 5/2012 Brulle-Drews .... G01C 21/3647 701/437
(Continued)

FOREIGN PATENT DOCUMENTS

AU 2012257053 A1 * 11/2013 ............ G06V 20/56
CN 111243307 A * 6/2020 ....... G08G 1/096725
(Continued)

*Primary Examiner* — Chico A Foxx
(74) *Attorney, Agent, or Firm* — Harness, Dickey & Pierce, PLC

(57) ABSTRACT

Disclosed is a technique of notification control for a vehicle configured to execute automated driving. In the technique, a predetermined operation of the vehicle to be executed in an intersection is identified. A notification related to the predetermined operation is made during automated driving of the vehicle based on the identifying the predetermined operation. The notification prompts a driver of the vehicle to assist in passing the intersection.

36 Claims, 29 Drawing Sheets

(52) U.S. Cl.
CPC ................. *B60K 2360/1868* (2024.01); *B60K 2360/191* (2024.01); *B60W 2050/146* (2013.01)

(56) References Cited

U.S. PATENT DOCUMENTS

| | | | | |
|---|---|---|---|---|
| 8,346,426 | B1 * | 1/2013 | Szybalski | B60K 35/60 701/28 |
| 10,093,324 | B1 * | 10/2018 | Szybalski | B60K 35/10 |
| 10,147,324 | B1 * | 12/2018 | Kuffner, Jr. | G08G 1/0962 |
| 11,072,343 | B2 * | 7/2021 | Emura | G05D 1/0257 |
| 11,117,513 | B2 * | 9/2021 | Wang | B60Q 1/5037 |
| 12,005,934 | B2 * | 6/2024 | Koda | G08G 1/09685 |
| 2006/0195257 | A1 * | 8/2006 | Nakamura | G01C 21/3632 701/437 |
| 2018/0367514 | A1 * | 12/2018 | Kido | H04L 67/12 |
| 2019/0011917 | A1 * | 1/2019 | Kuffner, Jr. | G08G 1/161 |
| 2019/0012910 | A1 * | 1/2019 | Kuffner, Jr. | G08G 1/166 |
| 2019/0276027 | A1 * | 9/2019 | Toda | B60W 40/04 |
| 2019/0308641 | A1 | 10/2019 | Sato | |
| 2019/0351897 | A1 * | 11/2019 | Gutmann | G08G 1/096725 |
| 2019/0354104 | A1 * | 11/2019 | Kuffner, Jr. | B60W 60/001 |
| 2019/0375430 | A1 | 12/2019 | Emura | |
| 2020/0117189 | A1 | 4/2020 | Kawai | |
| 2020/0290651 | A1 * | 9/2020 | Pan | B60W 30/18154 |
| 2020/0307636 | A1 * | 10/2020 | Ota | B60W 30/18009 |
| 2021/0081684 | A1 * | 3/2021 | Yamamoto | B62D 15/0275 |
| 2021/0316750 | A1 * | 10/2021 | Jo | B60W 30/18154 |
| 2021/0323568 | A1 * | 10/2021 | Kaino | B60W 30/18163 |
| 2022/0011771 | A1 * | 1/2022 | Matsunaga | B60W 30/182 |
| 2022/0073091 | A1 | 3/2022 | Emura | |
| 2022/0177006 | A1 * | 6/2022 | Ali | B60W 60/0015 |
| 2022/0219683 | A1 * | 7/2022 | Chikamori | B60W 30/18159 |
| 2022/0272448 | A1 * | 8/2022 | Rajkumar | H04R 1/08 |
| 2023/0135641 | A1 * | 5/2023 | Miyake | B60K 35/23 701/36 |
| 2023/0192091 | A1 * | 6/2023 | Arai | B60W 30/18154 701/93 |
| 2023/0227036 | A1 * | 7/2023 | Toyoda | B60W 10/18 701/93 |
| 2023/0227057 | A1 * | 7/2023 | Wu | B60Q 1/34 |
| 2023/0286527 | A1 | 9/2023 | Emura | |
| 2023/0304822 | A1 * | 9/2023 | Lee | G01C 21/3635 |
| 2023/0382431 | A1 * | 11/2023 | Kasuya | B60W 50/082 |
| 2024/0035845 | A1 * | 2/2024 | Deschenes | G01C 21/3837 |
| 2024/0161623 | A1 * | 5/2024 | Kawasaki | G08G 1/166 |
| 2024/0300543 | A1 * | 9/2024 | Rajkumar | B60W 60/0053 |

FOREIGN PATENT DOCUMENTS

| | | | | | |
|---|---|---|---|---|---|
| CN | 112477758 | A | * | 3/2021 | H04N 7/18 |
| EP | 1146315 | A2 | * | 10/2001 | G08G 1/0969 |
| EP | 2434257 | A2 | * | 3/2012 | G01C 21/3664 |
| JP | 2004145672 | A | * | 5/2004 | |
| JP | 2005165555 | A | | 6/2005 | |
| JP | 2005324661 | A | | 11/2005 | |
| JP | 201745130 | A | | 3/2017 | |
| JP | 2017107502 | A | | 6/2017 | |
| JP | 2017222271 | A | | 12/2017 | |
| JP | 2018144570 | A | | 9/2018 | |
| KR | 20170041417 | A | * | 4/2017 | G08G 1/162 |
| WO | WO-2017183072 | A1 | | 10/2017 | |
| WO | WO-2018012474 | A1 | | 1/2018 | |
| WO | WO-2018051586 | A1 | | 3/2018 | |

* cited by examiner

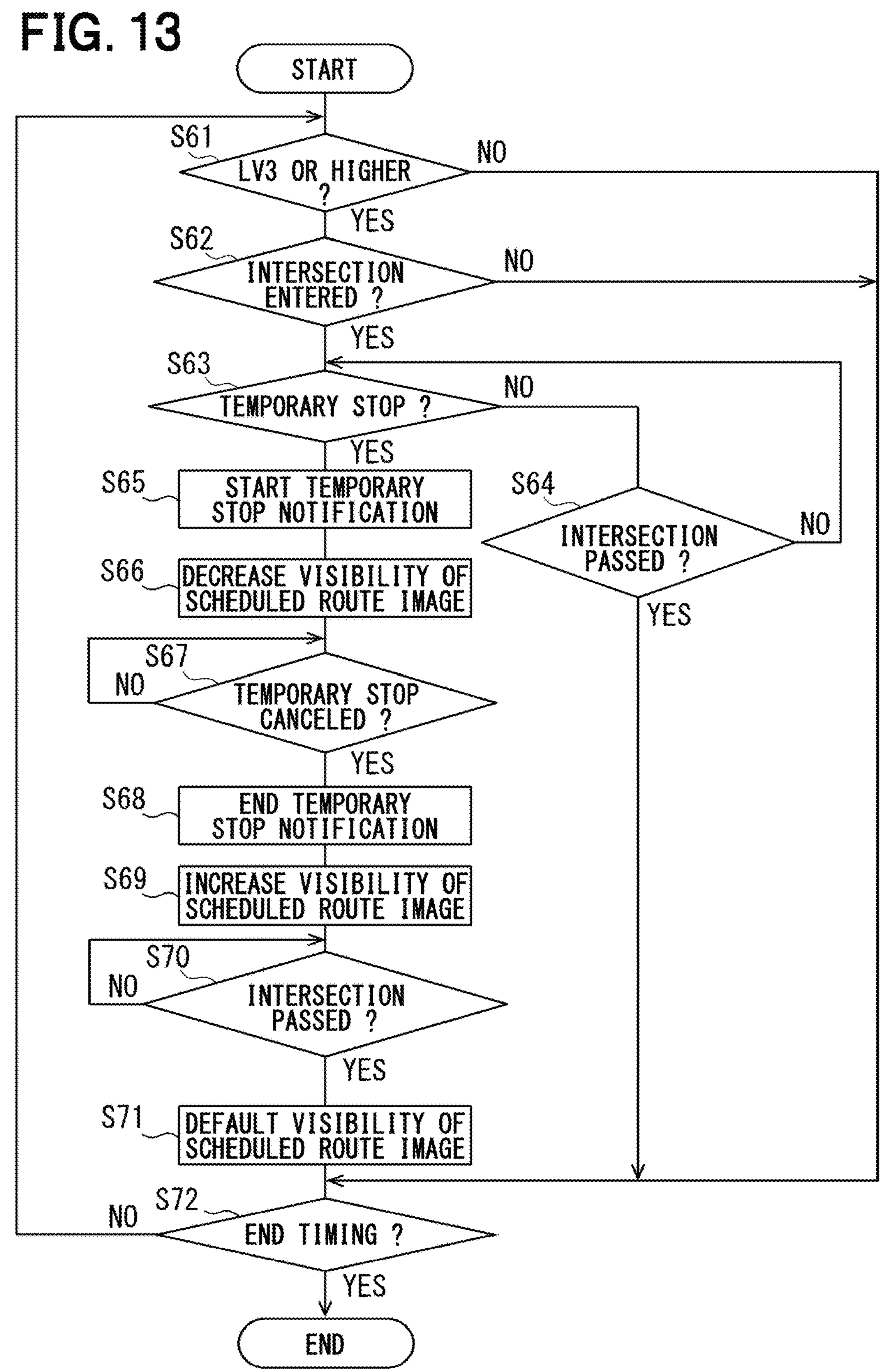
FIG. 13
START
S61
LV3 OR HIGHER ?
NO
YES
S62
INTERSECTION ENTERED ?
NO
YES
S63
TEMPORARY STOP ?
NO
YES
S65
START TEMPORARY STOP NOTIFICATION
S64
INTERSECTION PASSED ?
NO
YES
S66
DECREASE VISIBILITY OF SCHEDULED ROUTE IMAGE
S67
NO
TEMPORARY STOP CANCELED ?
YES
S68
END TEMPORARY STOP NOTIFICATION
S69
INCREASE VISIBILITY OF SCHEDULED ROUTE IMAGE
S70
NO
INTERSECTION PASSED ?
YES
S71
DEFAULT VISIBILITY OF SCHEDULED ROUTE IMAGE
S72
NO
END TIMING ?
YES
END PLI PLI Sc
OVIb
PLI
CI
PLI
IHI
OVIa
PLI
PLI
PLI HVI PLI PLI CI PLI Sc

PLI OVI PLI

CIc IT

CI

PLI PLI

PLI HVI PLI

| AUTOMATION LEVEL " HIGH " | FIXED DISPLAY |
| --- | --- |
| AUTOMATION LEVEL " LOW " | ROTATIONAL DISPLAY |

| | |
|---|---|
| TARGET MOVING OBJECT " PRESENT " | FIXED DISPLAY |
| TARGET MOVING OBJECT " NOT PRESENT " | ROTATIONAL DISPLAY |

| DRIVER INDICATOR | FIXED DISPLAY |
| --- | --- |
| FELLOW PASSENGER INDICATOR | ROTATIONAL DISPLAY |

PLI CI PLI Sc PIc

PLI

OVI

STOP

PLI

HL

PLI

PLI

PLI HVI PLI

PLI AP PLI Sc PIc

PLI

STOP

PLI

OVI

HL

CI

PLI

PLI

PLI HVI PLI

| AUTOMATION LEVEL "HIGH" | HIGHLIGHT TARGET MOVING OBJECT IMAGE |
|---|---|
| AUTOMATION LEVEL "LOW" | HIGHLIGHT SCHEDULED ROUTE IMAGE |
| AUTOMATION LEVEL "SUDDEN CHANGE" | MAINTAIN DISPLAY |

PLI PLI Sc
PLI
ObI IHI PLI
CI
CI
CI
PLI PLI
PLI HVI PLI

PLI PLI Sc

PLI

PLI

CI

PLI

PLI

PLI HVI PLI

| TURNING RIGHT OR LEFT WITH ARROW LIGHTING | DISPLAY IN SIMPLIFIED MANNER |
|---|---|
| TURNING RIGHT OR LEFT WITHOUT ARROW LIGHTING | DISPLAY IN NORMAL MANNER |

VEHICLE NOTIFICATION CONTROL DEVICE AND VEHICLE NOTIFICATION CONTROL METHOD

CROSS REFERENCE TO RELATED APPLICATIONS

The present application is a continuation application of International Patent Application No. PCT/JP2023/007207 filed on Feb. 28, 2023, which designated the U.S. and claims the benefit of priority from Japanese Patent Application No. 2022-034622 filed on Mar. 7, 2022, and Japanese Patent Application No. 2023-025462 filed on Feb. 21, 2023. The disclosures of all the above applications are incorporated herein.

TECHNICAL FIELD

The present disclosure relates to a vehicle notification control device and a vehicle notification control method.

BACKGROUND

Automated driving automates a driving operation of a vehicle. The automated driving can be performed on a general road having an intersection.

SUMMARY

According to at least one embodiment of the present disclosure, a vehicle notification control technique can be used for a vehicle configured to execute automated driving. The technique includes identifying a predetermined operation of the vehicle to be executed in an intersection, and making a notification related to the predetermined operation during automated driving of the vehicle based on the identifying the predetermined operation. The notification prompts a driver of the vehicle to assist in passing the intersection.

BRIEF DESCRIPTION OF THE DRAWINGS

The details of one or more embodiments are set forth in the accompanying drawings and the description below. Other features and advantages will be apparent from the description and drawings, and from the claims.

FIG. 13 is a flowchart illustrating an example of a flow of the temporary stop notification related process in the HCU in the fifth embodiment.

DETAILED DESCRIPTION

Figure 1:
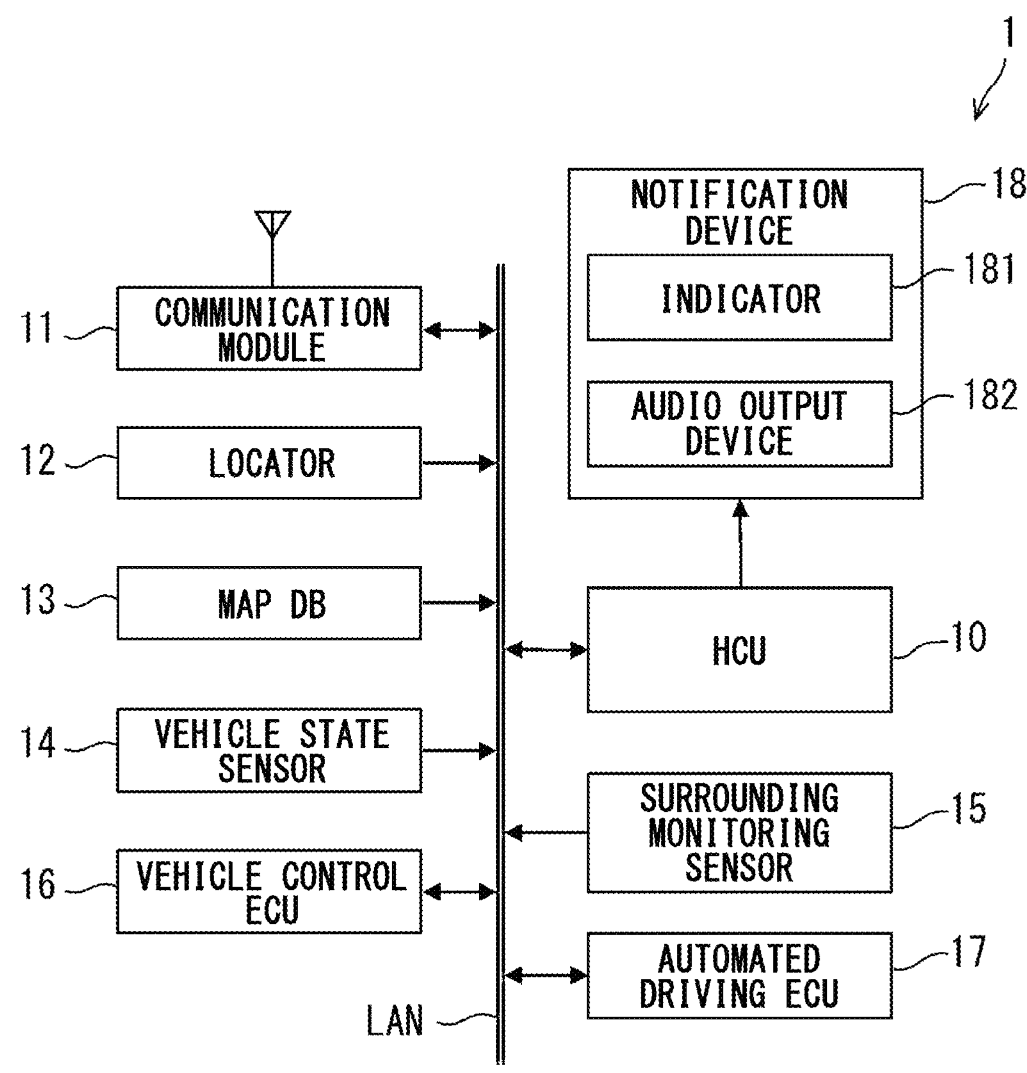
FIG. 1 is a diagram illustrating an example of a schematic configuration of a vehicle system.

To begin with, examples of relevant techniques will be described.

Automated driving automates a driving operation of a vehicle. According to a comparative example, automated driving is performed on a general road having an intersection.

In the comparative example, it is not assumed that the driver is prompted to monitor the surroundings when the automated driving is executed in the intersection. Since there are many disturbances in an intersection, driver's assistance is advisable in traveling the intersection even when automated driving is available for traveling in the intersection. This applies to the automated driving in which the surrounding monitoring obligation is not required.

In contrast, according to the present disclosure, a vehicle notification control device and a vehicle notification control method are capable of easily receiving assistance from a driver as necessary even in a case where automated driving is performed in an intersection.

According to an aspect of the present disclosure, a vehicle notification control device can be used for a vehicle configured to execute automated driving. The vehicle notification control device includes an operation identification unit configured to identify a predetermined operation of the vehicle to be executed in an intersection, a notification control unit configured to cause a notification device provided in a vehicle compartment of the vehicle to make a notification. The notification control unit is configured to make a notification related to the predetermined operation and prompting a driver of the vehicle to assist in passing the intersection during automated driving of the vehicle based on the operation identification unit identifying the predetermined operation to be executed in the intersection.

According to another aspect of the present disclosure, a vehicle notification control method can be used for a vehicle configured to execute automated driving. The method includes identifying a predetermined operation of the vehicle to be executed in an intersection, and making a notification related to the predetermined operation during automated driving of the vehicle based on the identifying the predetermined operation. The notification prompts a driver of the vehicle to assist in passing the intersection.

According to the above configuration, when the vehicle performs the predetermined operation in the intersection during automated driving, a notification related to the predetermined operation is made to prompt the driver of the vehicle to assist in passing the intersection. Therefore, it is possible to easily receive assistance from the driver according to the predetermined operation of the vehicle. As a result, even in a case where automated driving is performed in the intersection, it is possible to easily receive assistance from the driver as necessary.

Hereinafter, embodiments of the present disclosure will be described with reference to the drawings. For convenience of description, portions having the same functions as those illustrated in the drawings used for the description so far are denoted by the same reference numerals among the plurality of embodiments, and the description thereof may be omitted. For portions denoted by the same reference numerals, descriptions in other embodiments can be referred to.

First Embodiment

Hereinafter, first embodiment of the present disclosure will be described with reference to the drawings. A vehicle system 1 illustrated in FIG. 1 can be used in a vehicle capable of performing automated driving (hereinafter, automated driving vehicle). As illustrated in FIG. 1, the vehicle system 1 includes a human machine interface control unit (HCU) 10, a communication module 11, a locator 12, a map database (hereinafter, map DB) 13, a vehicle state sensor 14, a surrounding monitoring sensor 15, a vehicle control ECU 16, an automated driving ECU 17, and a notification device 18. For example, the HCU 10, the communication module 11, the locator 12, the map DB 13, the vehicle state sensor 14, the surrounding monitoring sensor 15, the vehicle control ECU 16, and the automated driving ECU 17 may be configured to be connected to an in-vehicle LAN (see the LAN in FIG. 1). Although the vehicle using the vehicle system 1 is not necessarily limited to an automobile, a case where the vehicle is used for an automobile will be described below as an example.

As the degree of automated driving (automation level) of the automated driving vehicle, for example, as defined by SAE, there may be a plurality of levels. The automation level is classified into LV0 to 5 as follows, for example.

LV0 is a level at which the driver performs all driving tasks without system intervention. The driving task may be referred to as a dynamic driving task. The driving tasks are, for example, steering, acceleration/deceleration, and surrounding monitoring. LV0 corresponds to so-called manual driving. LV1 is a level at which the system supports either steering or acceleration/deceleration. LV1 corresponds to so-called driving assistance. LV2 is a level at which the system supports both steering and acceleration/deceleration. LV2 corresponds to so-called partial driving automation. It is assumed that LV1 to 2 is part of the automated driving.

For example, the automated driving of LV1 to 2 is assumed to be automated driving in which the driver has the monitoring obligation (hereinafter, simply monitoring obligation) related to safe driving. As the monitoring obligation, there is visual surrounding monitoring. The automated driving of LV1 to 2 can be referred to as automated driving in which the second task is not permitted. The second task is an action other than driving permitted to the driver, and is a specific action defined in advance. The second task can be referred to as a secondary activity, another activity, or the like. The second task should not prevent the driver from responding to the driving operation takeover request from the automated driving system. As an example, actions such as viewing content such as a moving image, operating a smartphone or the like, reading, and eating are assumed as the second task.

The automated driving of LV3 is a level at which the system can perform all driving tasks under a specific condition and the driver performs a driving operation in an emergency. In the LV3 automated driving, in a case where there is a request for a driving-mode switch from the system, the driver is required to be able to respond quickly. This driving-mode switch can be referred to as transfer of the surrounding monitoring obligation from the vehicle system to the driver. LV3 corresponds to so-called conditional driving automation. As LV3, there is area-limited LV3 limited to a specific area. The specific area referred to herein may be an expressway. The specific area may be, for example, a specific lane. As LV3, there is traffic congestion limited LV3 limited to traffic congestion. The traffic congestion limited LV3 may be configured to be limited to, for example, traffic congestion on an expressway. The expressway may include an automobile exclusive road.

The LV4 automated driving is a level at which the system can perform all driving tasks except under specific situations such as unsupportable roads and extreme environments. LV4 corresponds to so-called advanced driving automation. The LV5 automated driving is a level at which the system can perform all driving tasks under any environment. LV5 corresponds to so-called full driving automation. The automated driving of LV4 and LV5 may be performed, for example, in a travel section in which highly accurate map data is prepared. The highly accurate map data will be described later.

For example, the automated driving of LV3 to 5 is the automated driving in which the driver does not have the surrounding monitoring obligation. That is, it corresponds to non-monitoring-obligation automated driving. The automated driving of LV3 to 5 can be referred to as automated driving in which a second task is permitted. Among the automated driving of LV3 to 5, the automated driving of LV4 or higher corresponds to the automated driving in which the driver is permitted to sleep. The automated driving at LV4 or higher can be referred to as automated driving that does not require a driving-mode switch to the driver even in an emergency. It is assumed that the automated driving vehicle of the present embodiment can switch the automation level. The automation level may be configured to be switchable only between some levels of LV0 to 5. It is assumed that the automated driving vehicle of the present embodiment can perform at least automated driving.

A communication module 11 transmits and receives information to and from a center outside the host vehicle via wireless communication. That is, wide-area communication is performed. The communication module 11 receives congestion information and the like from the center by wide-area communication. The communication module 11 may transmit and receive information to and from another vehicle via wireless communication. That is, inter-vehicle communication may be performed. The another vehicle is a vehicle other than the host vehicle. The communication module 11 may transmit and receive information to and from a roadside device installed on a roadside via wireless communication. That is, road-to-vehicle communication may be performed. In a case where road-to-vehicle communication is performed, the communication module 11 may receive, via a roadside device, information about surrounding vehicles of the host vehicle transmitted from the surrounding vehicles. Furthermore, the communication module 11 may receive, via the center, information about surrounding vehicles of the host vehicle transmitted from the surrounding vehicles via wide-area communication.

The locator 12 includes a global navigation satellite system (GNSS) receiver and an inertial sensor. The GNSS receiver receives positioning signals from a plurality of positioning satellites. The inertial sensor includes, for example, a gyro sensor and an acceleration sensor. The locator 12 sequentially measures a vehicle position (hereinafter, host vehicle position) of the host vehicle on which the locator 12 is mounted by combining a positioning signal received by the GNSS receiver and a measurement result by the inertial sensor. The host vehicle position may be represented by, for example, coordinates of latitude and longitude. A travel distance obtained from a signal sequentially output from a vehicle speed sensor to be described later may also be used for positioning the host vehicle position.

The map DB 13 is a nonvolatile memory and stores highly accurate map data. The highly accurate map data is map data with higher precision than map data used for route guidance in the navigation function. The map DB 13 may also store map data used for route guidance. The highly accurate map data includes information available for automated driving, such as three-dimensional shape information about a road, number-of-lanes information, and information indicating a traveling direction allowed for each lane. In addition, the highly accurate map data may include, for example, information about node points indicating the positions of both ends for road surface marks such as section lines. The locator 12 may be configured not to use the GNSS receiver by using the three-dimensional shape information about the road. For example, the locator 12 may be configured to identify the host vehicle position by using three-dimensional shape information about the road and a detection result obtained by a light detection and ranging/laser imaging detection and ranging (LIDAR) that detects a point group of feature points of the road shape and the structure or the surrounding monitoring sensor 15 such as a surrounding monitoring camera. The three-dimensional shape information about the road may be generated based on the captured image by road experience management (REM).

The map data distributed from the external server may be received by wide-area communication via the communication module 11 and stored in the map DB 13. In this case, the map DB 13 may be a volatile memory, and the communication module 11 may sequentially acquire map data of a region corresponding to the host vehicle position.

The vehicle state sensor 14 is a sensor group for detecting various states of the host vehicle. Examples of the vehicle state sensor 14 include a vehicle speed sensor, a steering sensor, and the like. The vehicle speed sensor outputs a vehicle speed pulse. The steering sensor detects a steering angle. The vehicle state sensor 14 outputs the detected sensing information to the in-vehicle LAN. The sensing information detected by the vehicle state sensor 14 may be output to the in-vehicle LAN via an ECU mounted on the host vehicle.

The surrounding monitoring sensor 15 monitors a surrounding environment of the host vehicle. As an example, the surrounding monitoring sensor 15 detects obstacles around the host vehicle such as moving objects such as pedestrians and other vehicles, and stationary objects such as falling objects on the road. In addition, the sensor detects road surface marks such as traveling section lines around the host vehicle. The surrounding monitoring sensor 15 is, for example, a surrounding monitoring camera that captures an image of a predetermined range around the host vehicle, or a sensor such as a millimeter wave radar, sonar, or LIDAR that transmits a probing wave to the predetermined range around the host vehicle. The surrounding monitoring camera sequentially outputs captured images sequentially captured as sensing information to the automated driving ECU 17. A sensor that transmits a probing wave such as a sonar, a millimeter wave radar, or a LIDAR sequentially outputs a scanning result based on a reception signal obtained in a case where a reflected wave reflected by an obstacle is received to the automated driving ECU 17 as sensing information. The sensing information detected by the surrounding monitoring sensor 15 may be output to the automated driving ECU 17 without passing through the in-vehicle LAN.

The vehicle control ECU 16 is an electronic control device that performs travel control of the host vehicle. Examples of the travel control include acceleration/deceleration control and/or steering control. Examples of the vehicle control ECU 16 include a steering ECU that performs steering control, a power unit control ECU that performs acceleration/deceleration control, and a brake ECU. The vehicle control ECU 16 performs travel control by outputting a control signal to each travel control device such as an electronically controlled throttle, a brake actuator, and an electric power steering (EPS) motor mounted on the host vehicle.

The automated driving ECU 17 includes, for example, a processor, a memory, an 1/O, and a bus connecting these components, and executes a control program stored in the memory to execute processing related to automated driving. The memory referred to herein is a non-transitory tangible storage medium that non-transiently stores computer-readable programs and data. In addition, the non-transitory tangible storage medium is realized by a semiconductor memory, a magnetic disk, or the like. The automated driving ECU 17 includes a travel environment recognition unit, an action determination unit, and a control execution unit as functional blocks.

The travel environment recognition unit recognizes the travel environment of the host vehicle from the host vehicle position acquired from the locator 12, the map data acquired from the map DB 13, and the sensing information acquired from the surrounding monitoring sensor 15. As an example, the travel environment recognition unit recognizes the position, the shape, and the movement state of the object around the host vehicle using these pieces of information, and generates a virtual space in which the actual travel environment is reproduced. The travel environment recognition unit may recognize the host vehicle position on the map from the host vehicle position and the map data. In a case where the travel environment recognition unit can acquire position information, speed information, and the like of surrounding vehicles and the like via the communication module 11, the travel environment recognition unit may also recognize the travel environment using these pieces of information.

The travel environment recognition unit may also determine a manual driving area (hereinafter, MD area) in the travel area of the host vehicle. The travel environment recognition unit may also determine an automated driving area (hereinafter, the AD area) in the travel area of the host vehicle. The travel environment recognition unit may also determine ST sections and non-ST sections described later in the AD area.

The MD area is an area where automated driving is prohibited. In other words, the MD area is an area defined such that the driver executes all of the longitudinal direction control, the lateral direction control, and the surrounding monitoring of the host vehicle. The longitudinal direction is a direction that coincides with the front-rear direction of the host vehicle. The lateral direction is a direction coinciding with the width direction of the host vehicle. The longitudinal direction control corresponds to acceleration/deceleration control of the host vehicle. The lateral direction control corresponds to steering control of the host vehicle. For example, the MD area may be a travel section of a general road on which highly accurate map data is not prepared.

The AD area is an area where automated driving is permitted. In other words, the AD area is an area defined such that the host vehicle can handle instead one or more of the longitudinal direction control, the lateral direction control, and the surrounding monitoring. For example, the AD area may be a travel section in which an expressway and highly accurate map data are prepared. For example, the automated driving (hereinafter, area-limited automated driving) of the area-limited LV3 may be permitted only on an expressway. The automated driving (hereinafter, traffic congestion limited automated driving) of the traffic congestion limited LV3 may be permitted only at the time of traffic congestion in the AD area.

The AD area is divided into an ST section and a non-ST section. The ST section is a section in which area-limited automated driving is permitted. The non-ST section may be a section in which automated driving of LV2 or less and traffic congestion limited automated driving are possible. In the present embodiment, the non-ST section in which the automated driving of LV1 is permitted and the non-ST section in which the automated driving of LV2 is permitted are not distinguished. The non-ST section may be a section that does not correspond to the ST section of the AD area.

The action determination unit switches a control subject of the driving operation between the driver and the system of the host vehicle. In a case where the control right of the driving operation is on the system side, the action determination unit determines a travel plan for causing the host vehicle to travel based on the recognition result of the travel environment by the travel environment recognition unit. As the travel plan, a long and medium term travel plan and a short term travel plan are generated. In the long and medium term travel plan, a scheduled route for causing the host vehicle to head toward a set destination is generated. The action determination unit may generate the scheduled route as in the route search of the navigation function. In the short term travel plan, the generated virtual space around the host vehicle is used to determine the behavior to be taken by the host vehicle for realizing travel according to the long and medium term travel plan (that is, the scheduled route). Examples of the behavior include going straight, turning right, turning left, stopping, and changing lanes.

The action determination unit determines a temporary stop of the host vehicle in a case where there is an object (hereinafter, passage blocking object) that obstructs traveling of the host vehicle in a case where the host vehicle passes through an intersection in automated driving. The automated driving referred to herein may be automated driving that automatically turns right or left. The passage blocking object may be, for example, a moving object such as another vehicle or a pedestrian. In a case where the host vehicle turns right or left at an intersection, an oncoming vehicle, a pedestrian on a crosswalk ahead of the right or left turn, or the like corresponds to the passage blocking object. In a case where the host vehicle travels straight at the intersection, a stopping preceding vehicle, an oncoming vehicle, or the like corresponds to the passage blocking object. The travel environment recognition unit may recognize the passage blocking object.

The action determination unit determines avoidance of the passage blocking object when the vehicle passes through an intersection by automated driving, and in a case where the action determination unit identifies the passage blocking object on a lane that the vehicle enters by turning right or left after turning right or left at the intersection. As an example, a temporary stop, a course change, or the like of the host vehicle may be determined.

In addition, the action determination unit switches the automation level of the automated driving of the host vehicle as necessary. The action determination unit determines whether the automation level can be increased. For example, in a case where the host vehicle moves from the MD area to the non-ST section in the AD area, it may be determined that the manual driving of LV0 can be switched to the automated driving of LV2 or less. In a case where the host vehicle moves from the MD area to the ST section in the AD area, it may be determined that the manual driving of LV0 can be switched to the area-limited automated driving. In a case where the host vehicle moves from the non-ST section to the ST section in the AD area, it may be determined that the automated driving of LV2 or less can be switched to the automated driving of LV3. In a case where all the conditions of the traffic congestion limited LV3 are satisfied in a state where the host vehicle is located in the AD area and the automation level is LV2 or less, it may be determined that the automated driving of LV2 or less can be switched to the traffic congestion limited automated driving. In addition, in a case where the start condition of LV4 is satisfied, it may be determined that switching from LV3 or less to LV4 is possible. The action determination unit may increase the automation level in a case where it is determined that the automation level can be increased and in a case where the driver approves the increase in the automation level.

The action determination unit may lower the automation level in a case where it is determined that it is necessary to lower the automation level. Examples of the case where it is determined that it is necessary to lower the automation level include the time of override detection, the time of planned driving-mode switch, and the time of unplanned driving-mode switch. The override is an operation for a driver of the host vehicle to voluntarily acquire a control right of the host vehicle. In other words, the override is an operational intervention by the driver of the vehicle. The planned driving-mode switch is a scheduled driving-mode switch determined by the system. The unplanned driving-mode switch is an unscheduled sudden driving-mode switch determined by the system.

The action determination unit may switch to the manual driving in a case where it is determined that the driving-mode switch from the automated driving to the manual driving is preferable even if the driving-mode switch from the automated driving to the manual driving is not essential and in a case where this driving-mode switch is approved by the driver. An example of a situation in which the driving-mode switch from the automated driving to the manual driving is preferable includes a situation in which the host vehicle is temporarily stopped at an intersection due to the presence of the above-described passage blocking object. Hereinafter, the passage blocking object causing the temporary stop is referred to as a stop object. In a case where the driver does not approve the driving-mode switch, the action determination unit may wait until the cause of the temporary stop is resolved and determine to continue the automated driving.

In a case where the control right of the driving operation is on the system side of the host vehicle, the control execution unit executes acceleration/deceleration control, steering control, and the like of the host vehicle according to the travel plan determined by the action determination unit in cooperation with the vehicle control ECU 16.

The notification device 18 is provided in the vehicle compartment of the host vehicle. The notification device 18 makes a notification toward the vehicle compartment of the host vehicle. The notification device 18 makes a notification in accordance with an indication from the HCU 10. The notification device 18 may be configured to make a notification to at least the driver. Notification device 18 may also make a notification to a fellow passenger other than the driver. The notification device 18 includes an indicator 181 and an audio output device 182.

The indicator 181 makes a notification by displaying information. The indicator 181 can include, for example, a meter multi information display (MID), a center information display (CID), a head-up display (HUD), or the like. The meter MID is provided in front of the driver seat in the interior of the host vehicle. As an example, the meter MID may be provided on a meter panel. The CID is disposed at the center of an instrument panel of the host vehicle. The HUD is provided on, for example, an instrument panel in the vehicle compartment. The HUD projects a display image formed by the projector onto a projection area defined on a front windshield as a projection member. The light of the image reflected by the front windshield toward the vehicle compartment is perceived by the driver seated on the driver seat. As a result, the driver can visually recognize the virtual image of the display image formed in front of the front windshield with part of the foreground overlapped. The HUD may be configured to project a display image on a combiner provided in front of the driver seat instead of the front windshield. Hereinafter, a case where the indicator 181 is the meter MID will be described as an example. The audio output device 182 makes a notification by outputting a voice. Examples of the audio output device 182 include a speaker and the like.

The HCU 10 is mainly configured by a computer including a processor, a volatile memory, a nonvolatile memory, an I/O, and a bus that connects these. The HCU 10 is connected to the notification device 18 and the in-vehicle LAN. The HCU 10 controls the notification by the notification device 18 by executing the control program stored in the nonvolatile memory. The HCU 10 corresponds to a vehicle notification control device. In the present embodiment, a case where the HCU 10 is used in a vehicle capable of at least automated driving will be described as an example. The configuration of the HCU 10 related to the control of the notification by the notification device 18 will be described in detail below.

Figure 2:
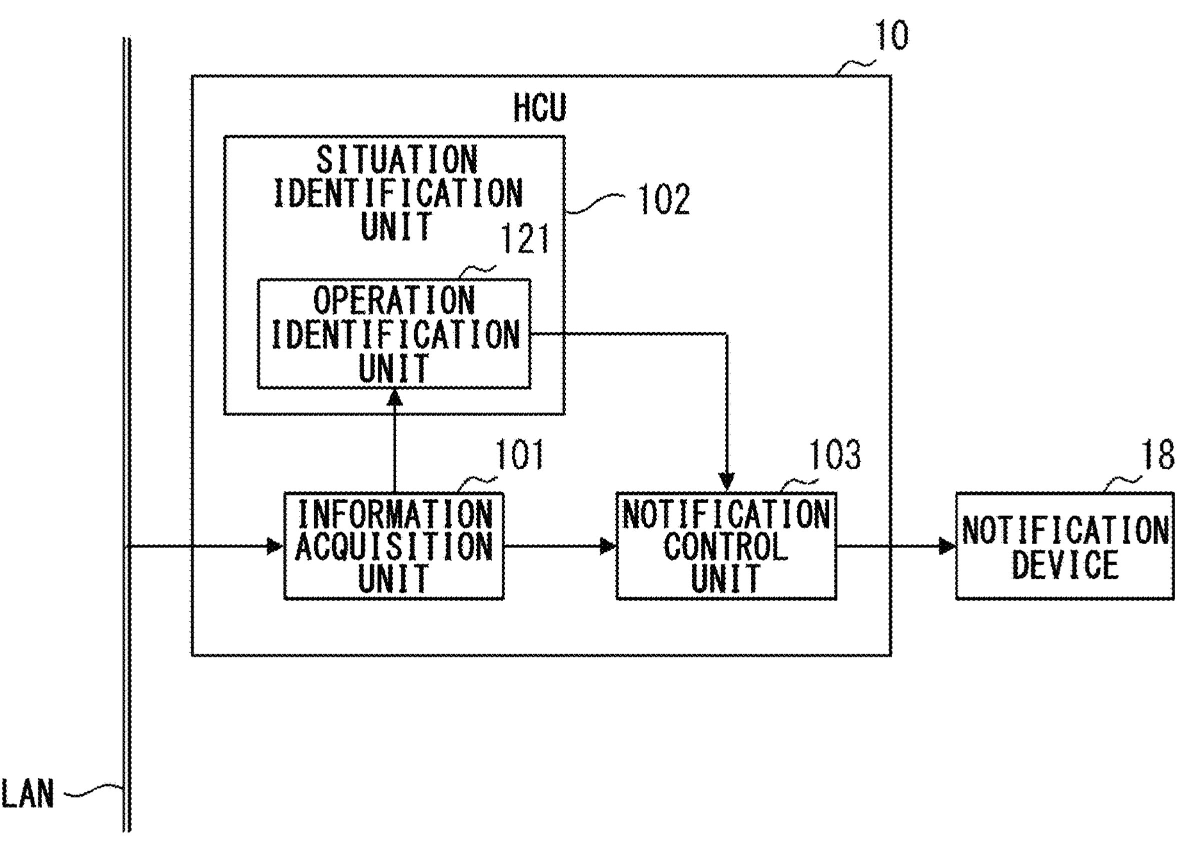
FIG. 2 is a diagram illustrating an example of a schematic configuration of an HCU.

Next, a schematic configuration of the HCU 10 will be described with reference to FIG. 2. As illustrated in FIG. 2, the HCU 10 includes an information acquisition unit 101, a situation identification unit 102, and a notification control unit 103 as functional blocks with respect to the control of the notification by the notification device 18. Execution of processing of each functional block of the HCU 10 by the computer corresponds to execution of the vehicle notification control method. Some or all of the functions executed by the HCU 10 may be configured as hardware by one or a plurality of ICs or the like. In addition, some or all of the functional blocks included in the HCU 10 may be realized by a combination of execution of software by a processor and a hardware member.

The information acquisition unit 101 acquires information input from the outside of the HCU 10. The information acquisition unit 101 acquires information via, for example, an in-vehicle LAN. For example, information acquisition unit 101 acquires a recognition result by the travel environment recognition unit of automated driving ECU 17. The information acquisition unit 101 acquires a determination result by the action determination unit of automated driving ECU 17.

The situation identification unit 102 identifies the situation of the host vehicle. The situation identification unit 102 identifies the situation of the host vehicle from the information acquired by the information acquisition unit 101. The situation identification unit 102 may identify the current automation level of the host vehicle based on the determination result by the action determination unit, the result being obtained from the automated driving ECU 17. More specifically, the situation identification unit 102 may identify the current automation level of the host vehicle based on the information about the switching of the automation level in the action determination unit.

The situation identification unit 102 includes an operation identification unit 121 as a sub-functional block. The operation identification unit 121 identifies a predetermined operation of the host vehicle to be executed in the intersection. The process by the operation identification unit 121 corresponds to an operation identification step. The operation identification unit 121 identifies a right or left turn of the host vehicle to be executed in the intersection. The operation identification unit 121 may identify a scheduled right or left turn of the host vehicle in an intersection. The operation identification unit 121 may identify a scheduled right or left turn of the host vehicle in an intersection before the vehicle enters the intersection. The operation identification unit 121 may identify a right or left turn of the host vehicle at the intersection from a determination result by the action determination unit.

The notification control unit 103 controls a notification by the notification device 18. The notification control unit 103 controls display on the indicator 181. The notification control unit 103 controls audio output by the audio output device 182. The notification control unit 103 displays an image (hereinafter, the surrounding situation image) indicating the surrounding situation of the host vehicle on the display face of the indicator 181.

Figure 3:
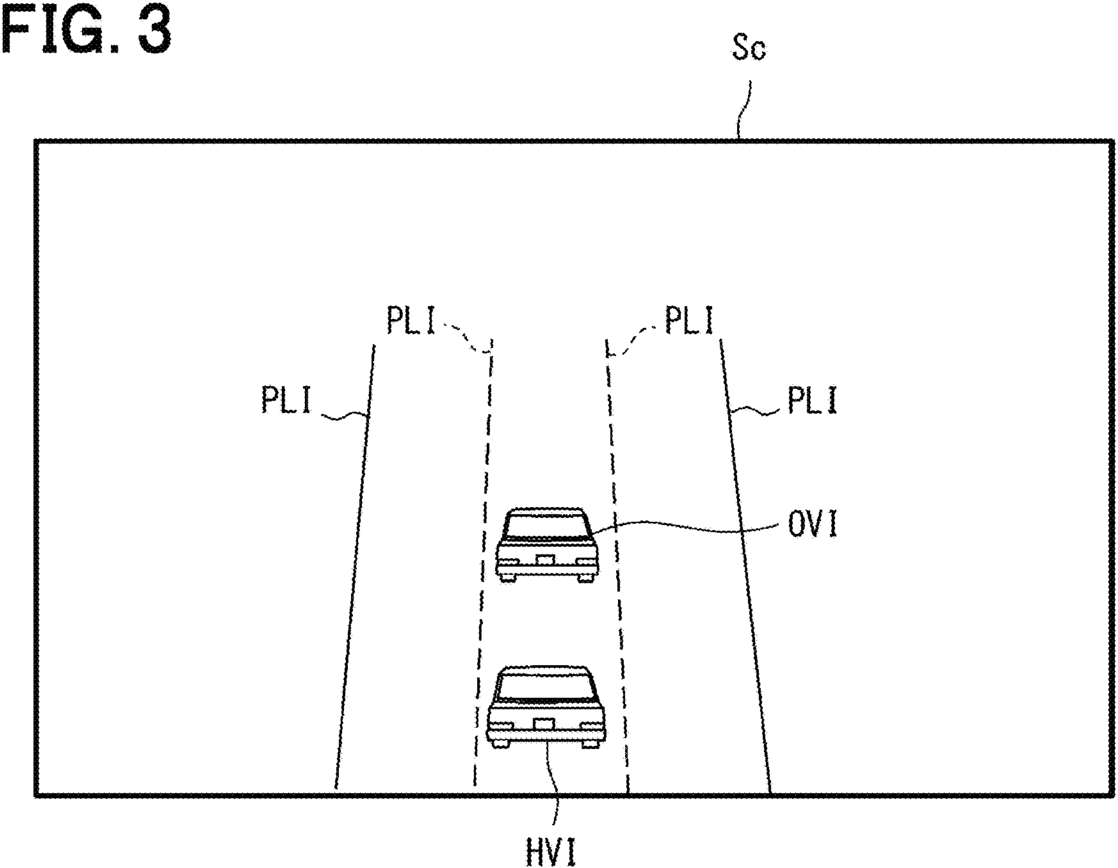
FIG. 3 is a diagram for describing an example of a surrounding situation image.

An example of the surrounding situation image will be described with reference to FIG. 3. FIG. 3 is a display example of a surrounding situation image. The surrounding situation image may be a bird's-eye image of the host vehicle and the surroundings thereof viewed from a virtual viewpoint above the host vehicle. This virtual viewpoint may be right above the host vehicle or may be a position shifted from right above the host vehicle. For example, it may be a bird's-eye view viewed from a virtual viewpoint above and behind the host vehicle. The surrounding situation image may be a virtual image for indicating the surrounding situation of the host vehicle, or may be an image obtained by processing a captured image captured by a surrounding monitoring camera among the surrounding monitoring sensors 15. Sc in the figure indicates a display screen of the indicator 181. PLI represents an image (hereinafter, the section line image) indicating a section line. HVI represents an image (hereinafter, host vehicle image) indicating the host vehicle. OVI represents an image (hereinafter, surrounding vehicle image) indicating a surrounding vehicle for the host vehicle. An image indicating the vehicle speed of the host vehicle, an image indicating the operation state of the automated driving function, and the like may also be displayed in the surrounding situation image.

In addition, it is preferable that the notification control unit 103 displays, on the indicator 181, the surrounding situation image and the scheduled route image in the surrounding situation image regarding the traveling at the intersection. The scheduled route image is an image indicating a scheduled route of the host vehicle. The traveling at the intersection referred to herein may include not only traveling in the intersection but also traveling a certain distance before and after the vehicle enters the intersection. The certain distance may be set in any distance. In addition, the certain distance may be different between before entry and after passing. The notification control unit 103 may display the surrounding situation image and the scheduled route image even in a case where the vehicle is not traveling at the intersection.

In a case where the operation identification unit 121 identifies the predetermined operation at the intersection during the automated driving of the host vehicle, the notification control unit 103 makes a notification related to the predetermined operation for prompting the driver of the host vehicle to assist in passing the intersection. The process by the notification control unit 103 corresponds to a notification control step. In a case where the operation identification unit 121 identifies a right or left turn at an intersection during automated driving of the host vehicle, the notification control unit 103 makes a notification for prompting the driver of the host vehicle to perform surrounding monitoring (hereinafter, monitoring prompting notification) as the above-described notification. According to this, in a case where the vehicle turns right or left at the intersection during automated driving, the notification prompting the driver of the vehicle to perform surrounding monitoring is made. Since there are many disturbances at the intersection, even when the vehicle can travel at the intersection by automated driving, it is preferable to assist the driver in monitoring the surroundings. On the other hand, when the vehicle turns right or left at the intersection, the notification prompting the driver of the vehicle to perform surrounding monitoring is made, so that it is possible to easily receive assistance of surrounding monitoring from the driver. As a result, even in a case where automated driving is performed at an intersection, it is possible to easily receive assistance from the driver as necessary.

The monitoring prompting notification may be made by display on the indicator 181. An example of the display of the monitoring prompting notification may be display of an icon or display of a text. As an example, an icon schematically representing the eye may be displayed. The monitoring prompting notification may be made by audio output from the audio output device 182.

Figure 4:
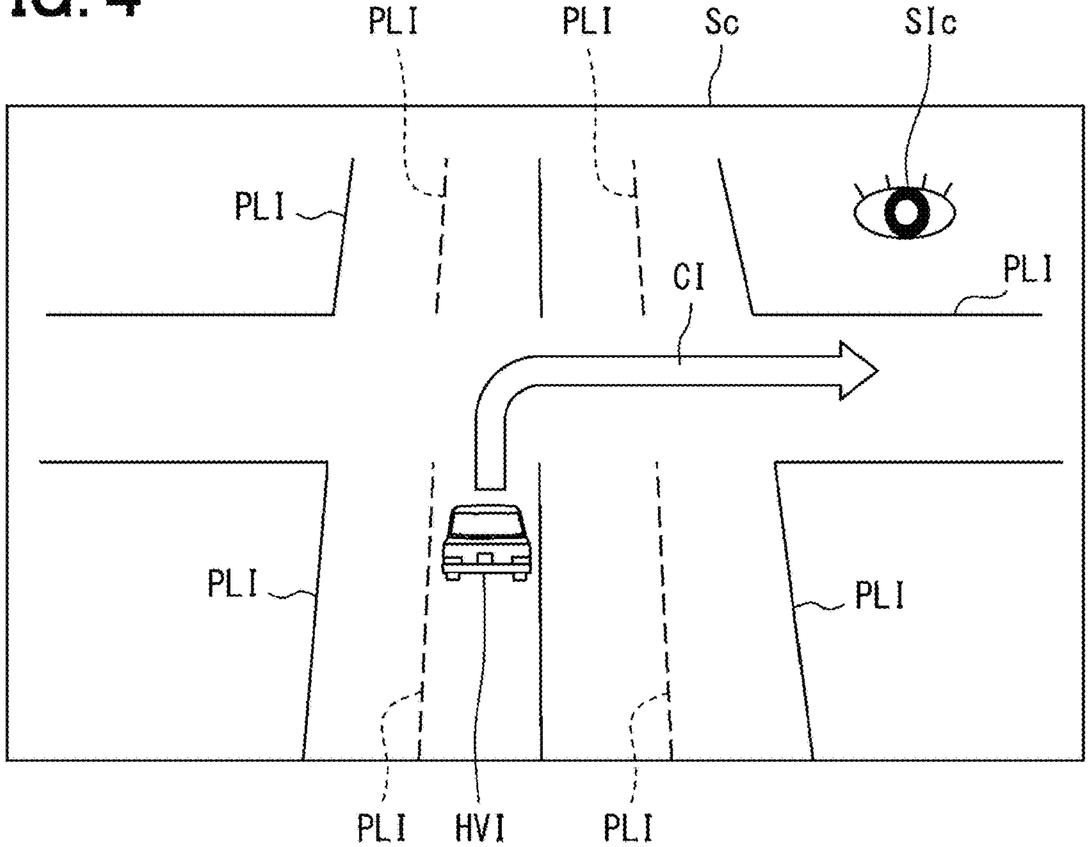
FIG. 4 is a diagram for describing an example of a monitoring prompting notification.

An example of the monitoring prompting notification will be described with reference to FIG. 4. FIG. 4 exemplifies a case where the monitoring prompting notification is made by displaying an icon in the surrounding situation image. Sic in the figure indicates an icon image corresponding to the monitoring prompting notification. CI indicates the scheduled route image. As illustrated in FIG. 4, the scheduled route image indicates that a right turn is to be made at the intersection, and the icon image may prompt the driver to monitor the surroundings.

In a case where the operation identification unit 121 identifies a right or left turn at an intersection during automated driving of the host vehicle, the notification control unit 103 may make the monitoring prompting notification before the vehicle enters the intersection. According to this, in a right or left turn at an intersection, assistance of surrounding monitoring by the driver is easily received before the vehicle enters the intersection.

It is preferable that in a case where the monitoring prompting notification is started, the notification control unit 103 continues making the monitoring prompting notification until the host vehicle finishes turning right or left at the intersection and starts straight traveling. According to this, assistance of surrounding monitoring by the driver is easily received until the right or left turn at the intersection is completed. The situation identification unit 102 may identify that the host vehicle has finished turning right or left at the intersection and started straight traveling. The situation identification unit 102 may determine whether the host vehicle has started straight traveling from a steering angle of the host vehicle detected by a steering sensor. The notification control unit 103 may be configured to end the monitoring prompting notification without waiting for the host vehicle to finish turning right or left at the intersection and start straight traveling in a case of starting the monitoring prompting notification.

An example of a flow of processing (hereinafter, monitoring prompting notification related process) related to the control of the monitoring prompting notification in the HCU 10 will be described with reference to a flowchart of FIG. 5. The flowchart of FIG. 5 may be started in a case where, for example, a switch (hereinafter, a power switch) for starting the internal combustion engine or the motor generator of the host vehicle is turned on.

First, in step S1, in a case where the situation identification unit 102 identifies that the automation level of the host vehicle is LV3 or higher (YES in S1), the process proceeds to step S2. That is, in a case where the situation identification unit 102 identifies that the host vehicle is in non-monitoring-obligation automated driving, the process proceeds to step S2. On the other hand, in a case where the automation level of the host vehicle is identified to be less than LV3 (NO in S1), the process proceeds to step S7.

In step S2, in a case where the operation identification unit 121 identifies a right or left turn of the host vehicle at the intersection (YES in S2), the process proceeds to step S3. In a case where the operation identification unit 121 does not identify the right or left turn of the host vehicle at the intersection (NO in S2), the process proceeds to step S7.

In step S3, in a case where the situation identification unit 102 identifies that the distance (hereinafter, intersection distance) from the host vehicle to the intersection is less than the threshold value (YES in S3), the process proceeds to step S4. On the other hand, in a case where it is not identified that the intersection distance is less than the threshold value (NO in S3), the process of S3 is repeated. The threshold value referred to herein is a distance of 0 or more, and may be set in any value.

In step S4, the notification control unit 103 starts the monitoring prompting notification. In step S5, in a case where the situation identification unit 102 identifies that the host vehicle has finished turning right or left at the intersection and started straight traveling (YES in S5), the process proceeds to step S6. On the other hand, in a case where the situation identification unit 102 does not identify that the host vehicle has finished turning right or left at the intersection and has started straight traveling (NO in S5), the process of S5 is repeated.

In step S6, the notification control unit 103 ends the monitoring prompting notification. In step S7, in a case where it is the timing at which the monitoring prompting notification related process ends (YES in S7), the monitoring prompting notification related process ends. In a case where it is not the timing at which the monitoring prompting notification related process ends (NO in S7), the process returns to S1 and repeats. An example of the timing at which the monitoring prompting notification related process ends is that the power switch is turned off.

Figure 5:
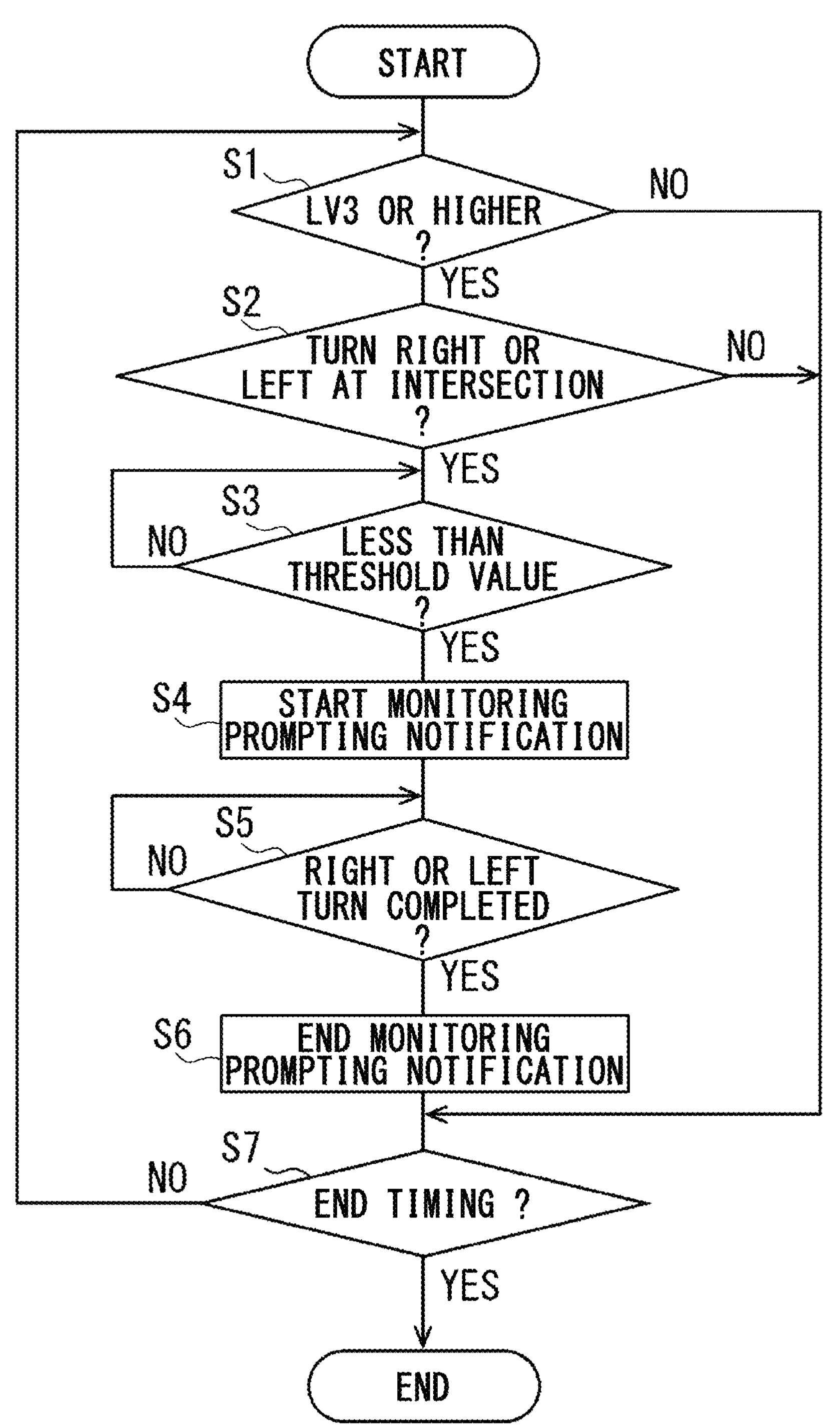
FIG. 5 is a flowchart illustrating an example of a flow of the monitoring prompting notification related process in the HCU according to the first embodiment.

FIG. 5 illustrates a configuration in which, in a case where it is identified in S1 that the host vehicle is in non-monitoring-obligation automated driving, the process proceeds to S2, but the present invention is not necessarily limited thereto. For example, in a case where the automation level of the host vehicle is identified in S1 to be one or more, the process may proceed to S2. That is, in a case where it is identified in S1 that the host vehicle is in automated driving, the process may proceed to S2. Alternatively, in a case where the automation level of the host vehicle is identified in S1 to be two or more, the process may proceed to S2.

Second Embodiment

In the first embodiment, the configuration in which the monitoring prompting notification is made before the vehicle enters the intersection is described, but the present invention is not necessarily limited thereto. For example, the configuration of the following second embodiment may be used. The second embodiment is similar to the first embodiment except that the process by the notification control unit 103 is partially different. Differences from the first embodiment will be described below.

The notification control unit 103 makes the monitoring prompting notification in a case where the operation identification unit 121 identifies a right or left turn at the intersection during the automated driving of the host vehicle and in a case where the temporary stop of the host vehicle is required in the intersection. This makes it possible to easily receive assistance from the driver for avoiding the cause of the temporary stop.

The case where the temporary stop of the host vehicle is required in the intersection may be the case where the action determination unit determines the temporary stop of the host vehicle as described in the first embodiment. The case where the temporary stop of the host vehicle is required in the intersection is a case where a passage blocking object is present when the host vehicle passes through the intersection by automated driving. The situation identification unit 102 may identify that the temporary stop of the host vehicle is required in the intersection. In the second embodiment, after the vehicle enters the intersection, the operation identification unit 121 may identify a right or left turn of the host vehicle at the intersection as a schedule.

An example of a flow of the monitoring prompting notification related process in the second embodiment will be described with reference to a flowchart of FIG. 6. The flowchart of FIG. 6 may also be started in a case where the power switch of the host vehicle is turned on, for example.

First, in step S21, in a case where the situation identification unit 102 identifies that the automation level of the host vehicle is LV3 or higher (YES in S21), the process proceeds to step S22. On the other hand, in a case where the automation level of the host vehicle is identified to be less than LV3 (NO in S21), the process proceeds to step S28.

In step S22, in a case where the operation identification unit 121 identifies a right or left turn of the host vehicle at the intersection (YES in S22), the process proceeds to step S23. In a case where the operation identification unit 121 does not identify the right or left turn of the host vehicle at the intersection (NO in S22), the process proceeds to step S28.

In step S23, in a case where the situation identification unit 102 identifies that the temporary stop of the host vehicle is required in the intersection (YES in S23), the process proceeds to step S25. On the other hand, in a case where it is not identified that the temporary stop of the host vehicle is required in the intersection (NO in S23), the process proceeds to step S24.

In step S24, in a case where the situation identification unit 102 identifies that the host vehicle has finished turning right or left at the intersection and started straight traveling (YES in S24), the process proceeds to step S28. On the other hand, in a case where the situation identification unit 102 does not identify that the host vehicle has finished right or left turning at the intersection and has started straight traveling (NO in S24), the process returns to S23 and is repeated.

In step S25, the notification control unit 103 starts the monitoring prompting notification. In step S26, in a case where the situation identification unit 102 identifies that the host vehicle has finished turning right or left at the intersection and started straight traveling (YES in S26), the process proceeds to step S27. On the other hand, in a case where the situation identification unit 102 does not identify that the host vehicle has finished right or left turning at the intersection and has started straight traveling (NO in S26), the process of S26 is repeated.

In step S27, the notification control unit 103 ends the monitoring prompting notification. In step S28, in a case where it is the timing at which the monitoring prompting notification related process ends (YES in S28), the monitoring prompting notification related process ends. On the other hand, in a case where it is not the timing at which the monitoring prompting notification related process ends (NO in S28), the process returns to S21 to repeat the process.

Figure 6:
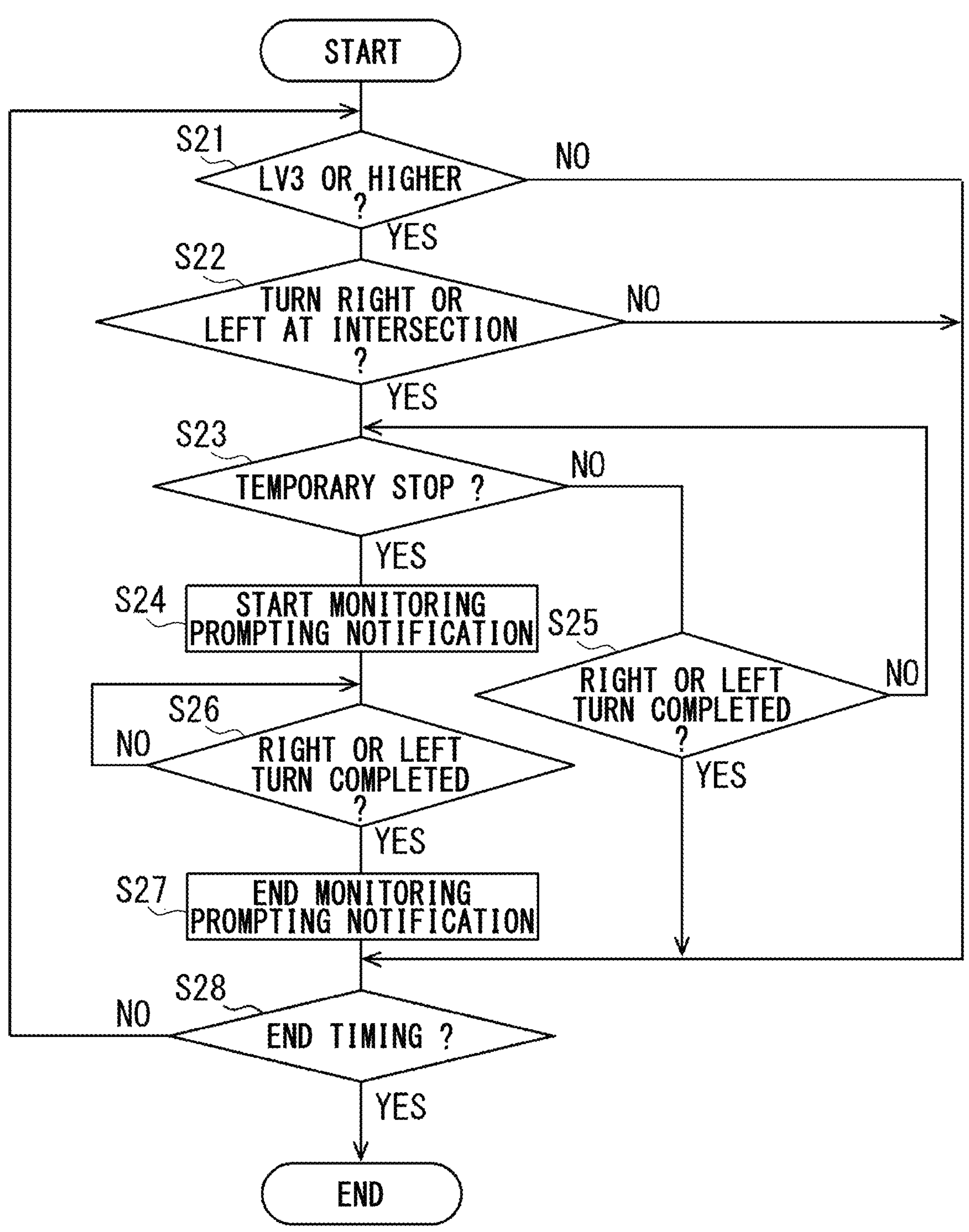
FIG. 6 is a flowchart showing an example of a flow of the monitoring prompting notification related process in the HCU in the second embodiment.

FIG. 6 illustrates a configuration in which, in a case where the host vehicle is identified to be in non-monitoring-obligation automated driving in S21, the process proceeds to S22, but the present invention is not necessarily limited thereto. For example, in a case where the automation level of the host vehicle is identified in S21 to be one or more, the process may proceed to S22. Alternatively, in a case where the automation level of the host vehicle is identified in S21 to be two or higher, the process may proceed to S22.

Third Embodiment

In the first embodiment, the configuration in which the monitoring prompting notification is made before the vehicle enters the intersection is described, but the present invention is not necessarily limited thereto. For example, the configuration of the following third embodiment may be used. The third embodiment is similar to the first embodiment except that the process by the notification control unit 103 is partially different. Differences from the first embodiment will be described below.

The notification control unit 103 makes the monitoring prompting notification in a case where the operation identification unit 121 identifies a right or left turn at an intersection during automated driving of the host vehicle and in a case where a request for a driving operation is temporarily made of the driver. According to this, it is possible to easily receive the assistance from driver in the avoidance of the cause for making the request of the driver for the driving operation. In addition, in a case where the driving-mode switch to the driver is performed, the driver is prompted to monitor the surroundings before the driving-mode switch. Therefore, the transition to the driving-mode switch can be smoothly performed.

The request for driving operation is a request for a driving-mode switch to manual driving. The notification control unit 103 may make the monitoring prompting notification even in a case where the situation in which the request for the driving operation is required is canceled and the request for the driving operation is ended in a case where the request for the driving operation by the driver is temporarily made. In response to the request for the driving operation, the notification control unit 103 may make the monitoring prompting notification regardless of whether the driver performs the driving-mode switch. For example, in a case where the situation identification unit 102 identifies that the temporary stop of the host vehicle is required in the intersection, the notification control unit 103 may request the driving operation. The driving operation request may be made by displaying an icon and a text on the indicator 181, or may be made by audio output from the audio output device 182. In the third embodiment, after the vehicle enters the intersection, the operation identification unit 121 may identify a right or left turn of the host vehicle at the intersection as a schedule.

An example of a flow of the monitoring prompting notification related process in the third embodiment will be described with reference to a flowchart of FIG. 7. The flowchart of FIG. 7 may also be started in a case where the power switch of the host vehicle is turned on, for example.

First, in step S31, in a case where the situation identification unit 102 identifies that the automation level of the host vehicle is LV3 or higher (YES in S31), the process proceeds to step S32. On the other hand, in a case where the automation level of the host vehicle is identified to be less than LV3 (NO in S31), the process proceeds to step S38.

In step S32, in a case where the operation identification unit 121 identifies a right or left turn of the host vehicle at the intersection (YES in S32), the process proceeds to step S33. In a case where the operation identification unit 121 does not identify the right or left turn of the host vehicle at the intersection (NO in S32), the process proceeds to step S38.

In step S33, in a case where the situation identification unit 102 identifies that the temporary stop of the host vehicle is required in the intersection and the notification control unit 103 makes the request for the driving operation (YES in S33), the process proceeds to step S35. On the other hand, in a case where it is not identified that the temporary stop of the host vehicle is required in the intersection (NO in S33), the process proceeds to step S34.

In step S34, in a case where the situation identification unit 102 identifies that the host vehicle has finished turning right or left at the intersection and started straight traveling (YES in S34), the process proceeds to step S38. On the other hand, in a case where the situation identification unit 102 does not identify that the host vehicle has finished right or left turning at the intersection and has started straight traveling (NO in S34), the process returns to S33 and is repeated.

In step S35, the notification control unit 103 starts the monitoring prompting notification. In step S36, in a case where the situation identification unit 102 identifies that the host vehicle has finished turning right or left at the intersection and started straight traveling (YES in S36), the process proceeds to step S37. On the other hand, in a case where the situation identification unit 102 does not identify that the host vehicle has finished right or left turning at the intersection and has started straight traveling (NO in S36), the process of S36 is repeated.

In step S37, the notification control unit 103 ends the monitoring prompting notification. In step S38, in a case where it is the timing at which the monitoring prompting notification related process ends (YES in S38), the monitoring prompting notification related process ends. On the other hand, in a case where it is not the timing at which the monitoring prompting notification related process ends (NO in S38), the process returns to S31 to repeat the process.

Figure 7:
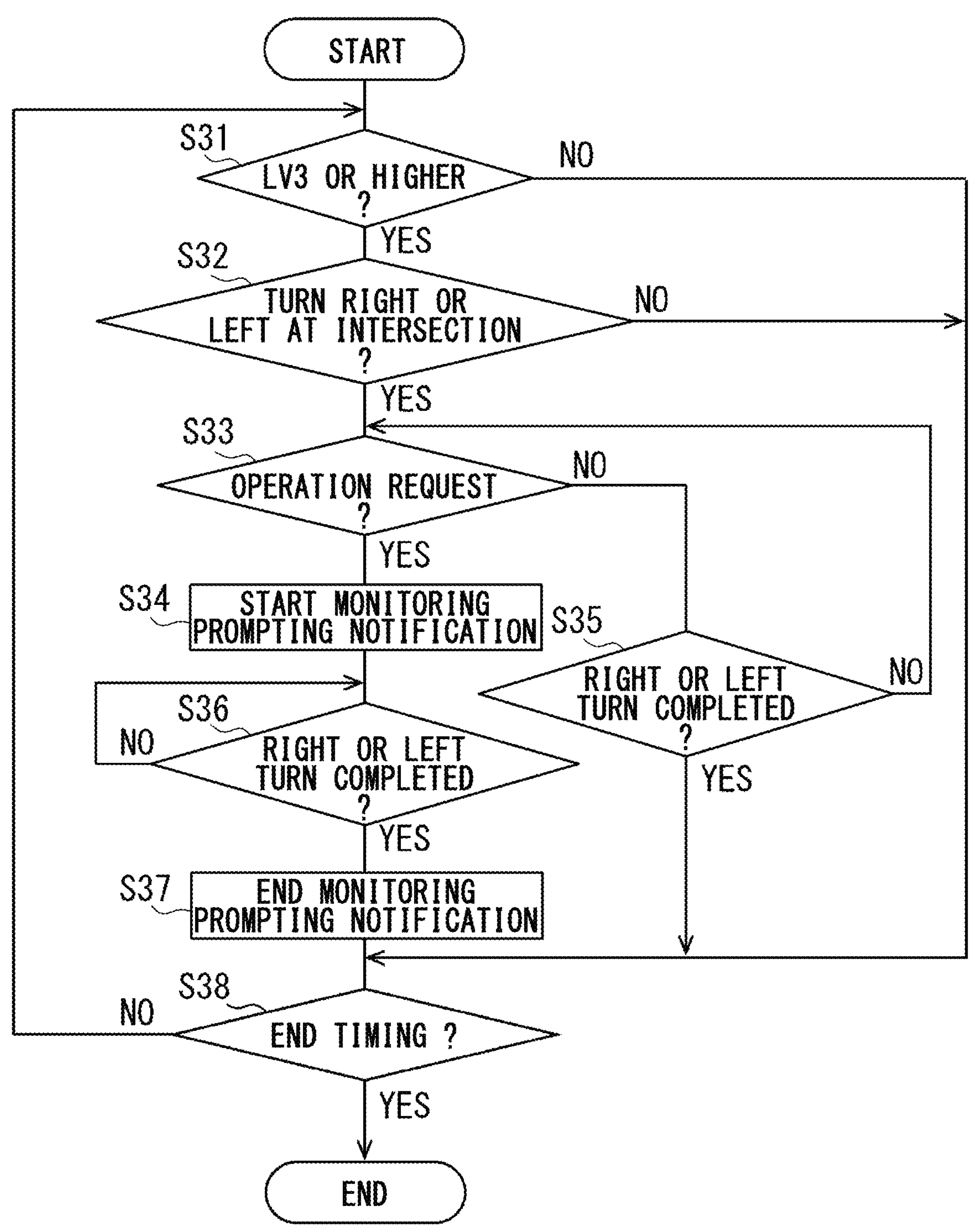
FIG. 7 is a flowchart showing an example of a flow of the monitoring prompting notification related process in the HCU in the third embodiment.

FIG. 7 illustrates a configuration in which, in a case where it is identified in S31 that the host vehicle is in non-monitoring-obligation automated driving, the process proceeds to S32, but the present invention is not necessarily limited thereto. For example, in a case where the automation level of the host vehicle is identified in S31 to be one or more, the process may proceed to S32. Alternatively, in a case where the automation level of the host vehicle is identified in S31 to be two or higher, the process may proceed to S32.

Fourth Embodiment

In the first embodiment, the configuration in which the monitoring prompting notification is made before the vehicle enters the intersection is described, but the present invention is not necessarily limited thereto. For example, the configuration of the following fourth embodiment may be used. The fourth embodiment is similar to the first embodiment except that the process by the notification control unit 103 is partially different. Differences from the first embodiment will be described below.

In a case where the operation identification unit 121 identifies a right or left turn at an intersection during automated driving of the host vehicle, the notification control unit 103 makes the monitoring prompting notification before the right or left turn in the intersection and before the vehicle enters the crosswalk after the right or left turn. This makes it possible to easily receive assistance of surrounding monitoring from the driver for both at the time of right or left turning and before the vehicle enters the crosswalk after right or left turning.

The notification control unit 103 may make the monitoring prompting notification before turning right or left in the intersection, for example, at the time of entering the intersection. The notification control unit 103 may cause the monitoring prompting notification to be performed before turning right or left in the intersection, for example, at the start of turning right or left in the intersection. The notification control unit 103 may make the monitoring prompting notification before the vehicle enters the crosswalk after the right or left turn, that is, at a point of time when the distance between the crosswalk and the host vehicle is less than the threshold value after the right or left turn. These situations may be identified by the situation identification unit 102.

An example of a flow of the monitoring prompting notification related process in the fourth embodiment will be described with reference to a flowchart of FIG. 8. The flowchart of FIG. 8 may also be started in a case where the power switch of the host vehicle is turned on, for example.

First, in step S41, in a case where the situation identification unit 102 identifies that the automation level of the host vehicle is LV3 or higher (YES in S41), the process proceeds to step S42. On the other hand, in a case where the automation level of the host vehicle is identified to be less than LV3 (NO in S41), the process proceeds to step S51.

In step S42, in a case where the operation identification unit 121 identifies a right or left turn of the host vehicle at the intersection (YES in S42), the process proceeds to step S43. In a case where the operation identification unit 121 does not identify the right or left turn of the host vehicle at the intersection (NO in S42), the process proceeds to step S51.

In step S43, in a case where the situation identification unit 102 identifies that the host vehicle has entered the intersection (YES in S43), the process proceeds to step S45. On the other hand, in a case where it is not identified that the host vehicle has entered the intersection (NO in S43), the process of step S43 is repeated. In step S44, the notification control unit 103 starts the monitoring prompting notification.

In step S45, in a case where the situation identification unit 102 identifies that the host vehicle has started turning right or left (YES in S45), the process proceeds to step S46. On the other hand, in a case where it is not identified that the host vehicle has started turning right or left (NO in S45), the process of S45 is repeated. In step S46, the notification control unit 103 ends the monitoring prompting notification. The situation identification unit 102 may identify that the host vehicle has started turning right or left based on the steering angle detected by the steering sensor.

In a case where situation identification unit 102 identifies in step S47 that the distance from the host vehicle to the target crosswalk (hereinafter, crosswalk distance) is less than the threshold value (YES in step S47), the process proceeds to step S48. On the other hand, in a case where it is not identified that the crosswalk distance is less than the threshold value (NO in S47), the process of S47 is repeated. The threshold value referred to herein is a distance of 0 or more, and may be set in any value. The target crosswalk is the nearest crosswalk through which the vehicle is scheduled to pass after turning right or left. In step S48, the notification control unit 103 starts the monitoring prompting notification.

In a case where situation identification unit 102 identifies that the host vehicle has passed through the target crosswalk in step S49 (YES in S49), the process proceeds to step S50. On the other hand, in a case where it is not identified that the host vehicle has passed through the target crosswalk (NO in S49), the process of S49 is repeated. In step S50, the notification control unit 103 ends the monitoring prompting notification.

In step S51, in a case where it is the timing at which the monitoring prompting notification related process ends (YES in S51), the monitoring prompting notification related process ends. On the other hand, in a case where it is not the timing at which the monitoring prompting notification related process ends (NO in S51), the process returns to S41 to repeat the process.

Figure 8:
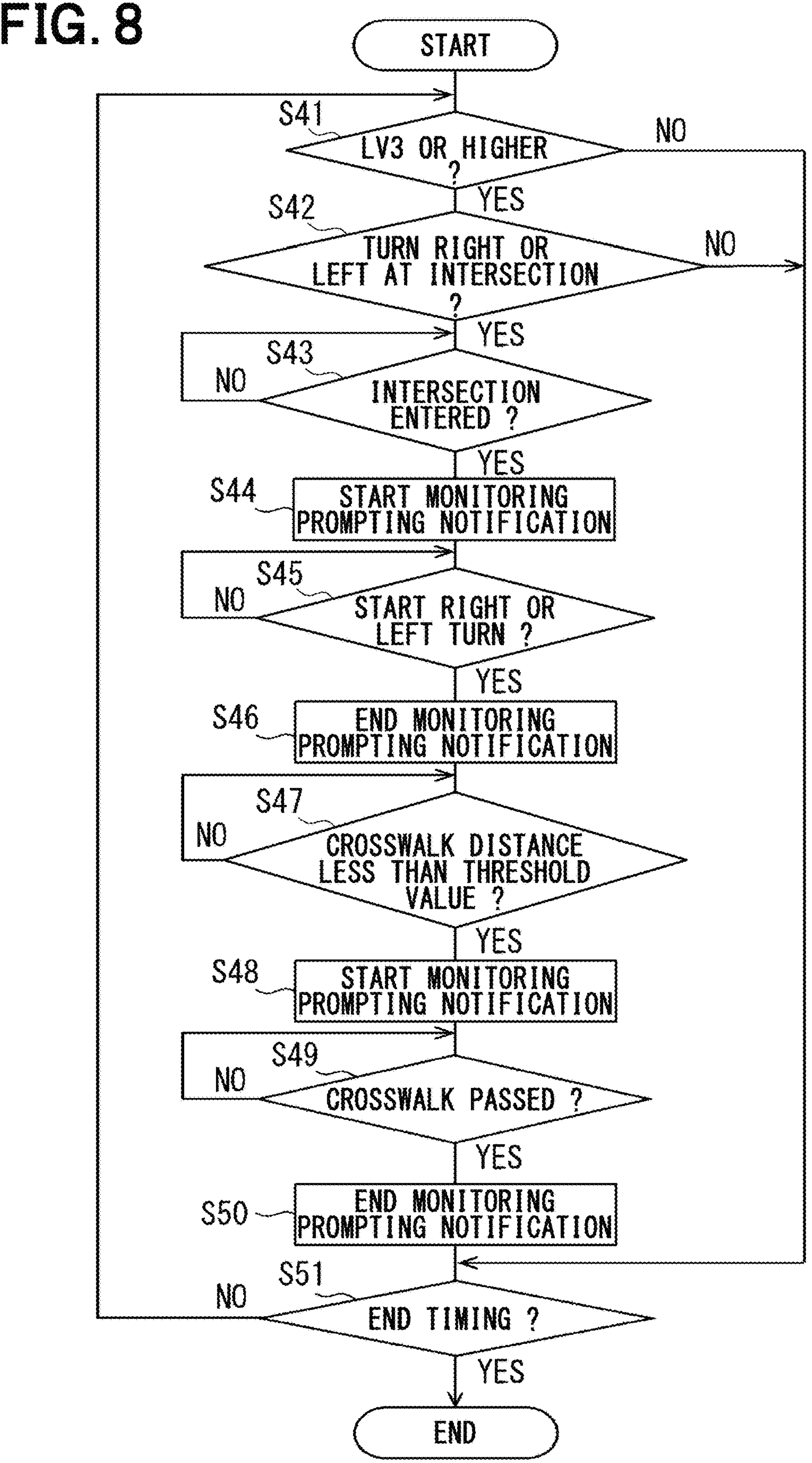
FIG. 8 is a flowchart showing an example of a flow of the monitoring prompting notification related process in the HCU in the fourth embodiment.

FIG. 8 illustrates a configuration in which, in a case where it is identified in S41 that the host vehicle is in non-monitoring-obligation automated driving, the process proceeds to S42, but the present invention is not necessarily limited thereto. For example, in a case where the automation level of the host vehicle is identified in S41 to be one or more, the process may proceed to S42. Alternatively, in a case where the automation level of the host vehicle is identified in S41 to be two or higher, the process may proceed to S32.

Fifth Embodiment

The present invention is not limited to the above-described embodiment, and may have a configuration as in the following fifth embodiment. Hereinafter, an example of the fifth embodiment will be described with reference to the drawings. A vehicle system 1 of the fifth embodiment is similar to the vehicle system 1 of the first embodiment except that an HCU 10*a* is included instead of the HCU 10.

Figure 9:
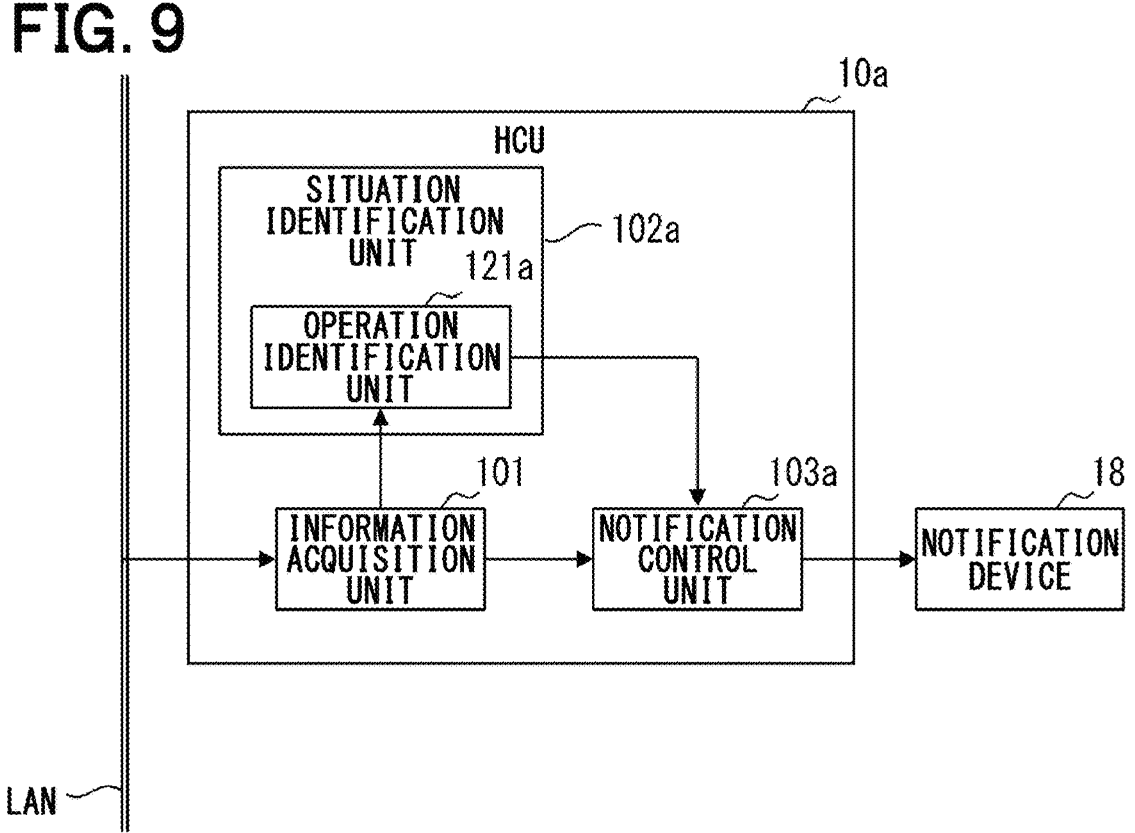
FIG. 9 is a diagram illustrating an example of a schematic configuration of an HCU.

Next, a schematic configuration of the HCU 10*a* will be described with reference to FIG. 9. As illustrated in FIG. 9, the HCU 10*a* includes an information acquisition unit 101, a situation identification unit 102*a*, and a notification control unit 103*a* as functional blocks with respect to the control of the notification by the notification device 18. The HCU 10*a* is similar to the HCU 10 of the first embodiment except that the situation identification unit 102*a* and the notification control unit 103*a* are provided instead of the situation identification unit 102 and the notification control unit 103. The HCU 10*a* also corresponds to a vehicle notification control device. Execution of processing of each functional block of the HCU 10*a* by the computer also corresponds to execution of the vehicle notification control method.

The situation identification unit 102*a* is similar to the situation identification unit 102 of the first embodiment except that an operation identification unit 121*a* is provided instead of the operation identification unit 121. The process in the operation identification unit 121*a* also corresponds to an operation identification step. The operation identification unit 121*a* identifies a temporary stop of the host vehicle at the intersection. The operation identification unit 121*a* may identify the temporary stop of the host vehicle at the intersection from the determination result by the action determination unit.

The notification control unit 103*a* controls the notification by the notification device 18 as in the notification control unit 103. In a case where the operation identification unit 121*a* identifies a temporary stop of the host vehicle at an intersection during automated driving of the host vehicle, the notification control unit 103*a* makes a notification (hereinafter, temporary stop notification) indicating to a driver of the host vehicle that the host vehicle temporarily stops. This makes it possible to easily receive assistance from the driver for avoiding the cause of the temporary stop. The temporary stop notification is not limited to be performed in the case of the temporary stop at the time of turning right or left at the intersection, and may be performed even in the case of the temporary stop at the time of traveling straight. The process in the notification control unit 103*a* also corresponds to a notification control step.

The temporary stop notification may be made by display on the indicator 181. An example of the display of the temporary stop notification may be display of an icon or display of a text. As an example, an icon representing the meaning of stop may be displayed. The temporary stop notification may be made by audio output from audio output device 182.

Figure 10:
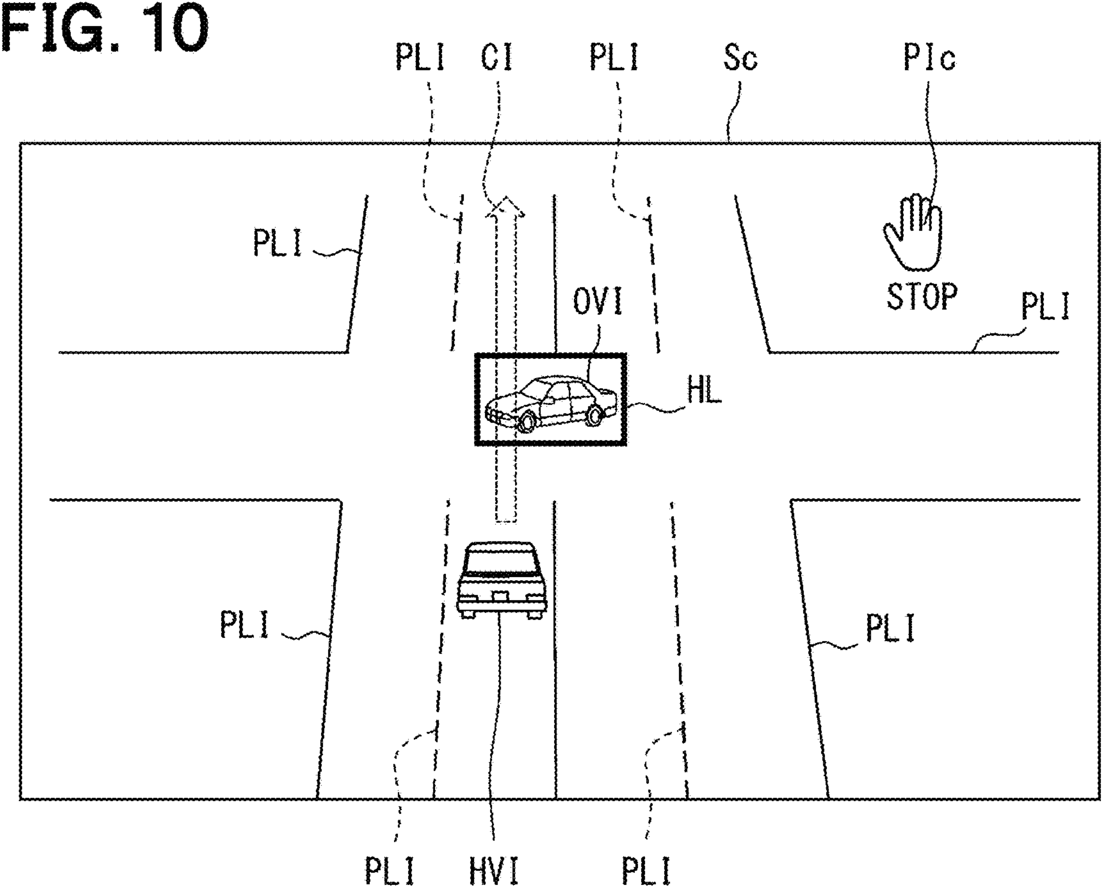
FIG. 10 is a diagram for describing an example of the temporary stop notification.

An example of the temporary stop notification will be described with reference to FIG. 10. FIG. 10 exemplifies a case where the temporary stop notification is made by displaying an icon in the surrounding situation image. In FIG. 10, a case where there is an oncoming vehicle that obstructs passage of the host vehicle scheduled to travel straight through the intersection will be described as an example. The oncoming vehicle corresponds to a stop object. PIc in the figure indicates an icon image corresponding to the temporary stop notification. HL indicates an indication highlighting a stop object. CI indicates the scheduled route image. In the example of FIG. 10, the stop object is highlighted by displaying a frame surrounding the surrounding vehicle image OVI indicating the stop object. As illustrated in FIG. 10, the scheduled route image may indicate that the vehicle travels straight through the intersection, and the icon image may make notify the driver of the temporary stop.

It is preferable that in a case where the temporary stop notification is made, the notification control unit 103*a* display-highlights a stop object as a factor of the temporary stop in the surrounding situation image as illustrated in FIG. 10. According to this, the driver can easily recognize which object to avoid in order to cancel the temporary stop. The display style for highlighting the stop object is not limited to being surrounded by a frame. For example, the configuration may be such that the stop object is highlighted by an arrow indicating a stop object, blinking of an image of the stop object, or the like.

It is preferable that, the notification control unit 103*a* displays the scheduled route image with lower visibility in a case where the host vehicle temporarily stops at an intersection than in a case where the host vehicle does not temporarily stop. According to this, even in a case where the scheduled route image is displayed in the surrounding situation image, it is possible to easily direct the attention of the driver to the stop object that is a factor of the temporary stop. As an example, the decrease in the visibility of the scheduled route image may be realized by lowering the brightness of the image or the like.

In addition, it is preferable that in a case where the host vehicle resumes passing through the intersection after the temporary stop, the notification control unit 103*a* displays the scheduled route image with the lower visibility to be higher in visibility than in a case where the host vehicle does not perform the temporary stop. According to this, in a case where the host vehicle resumes passing through the intersection after the temporary stop, it is possible to easily direct the attention of the driver to the scheduled route image. As an example, the visibility of the scheduled route image may be increased by increasing the brightness of the image or the like.

Figure 11:
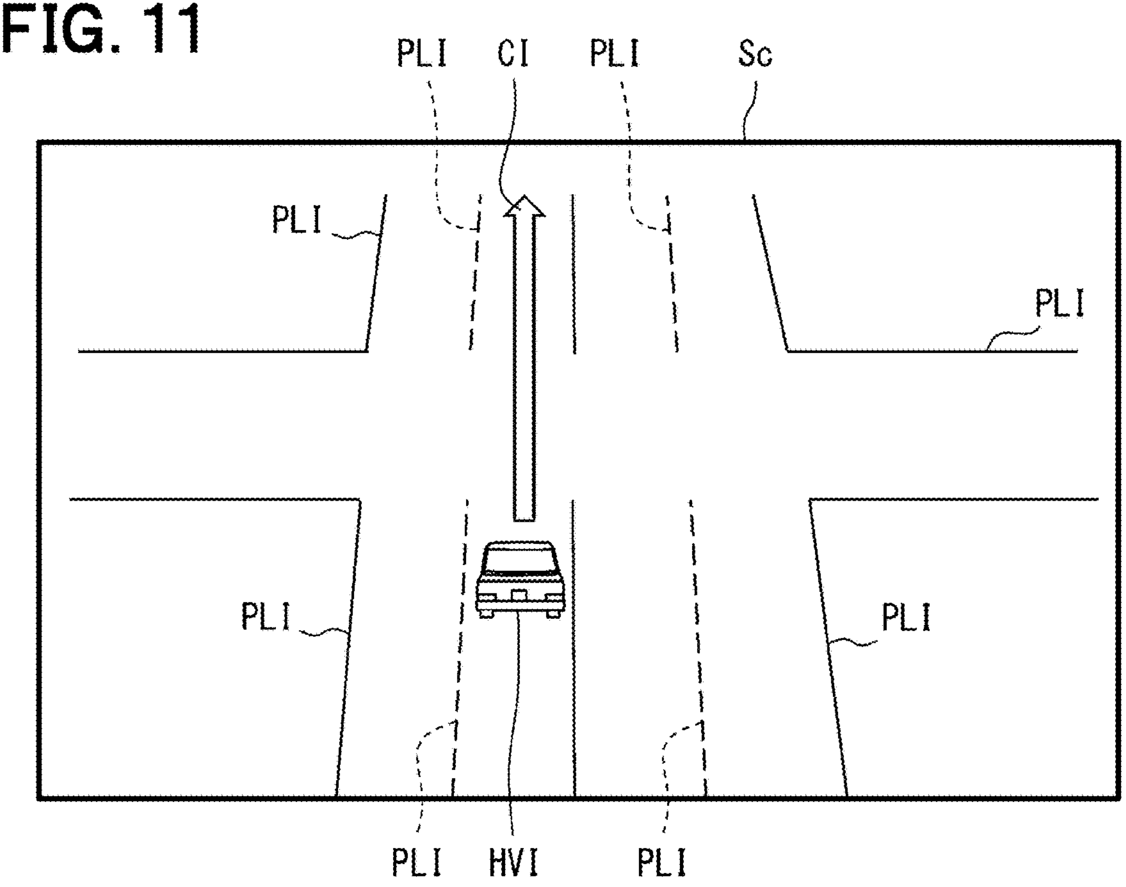
FIG. 11 is a diagram for describing an example of a change in visibility of a scheduled route image.
Figure 12:
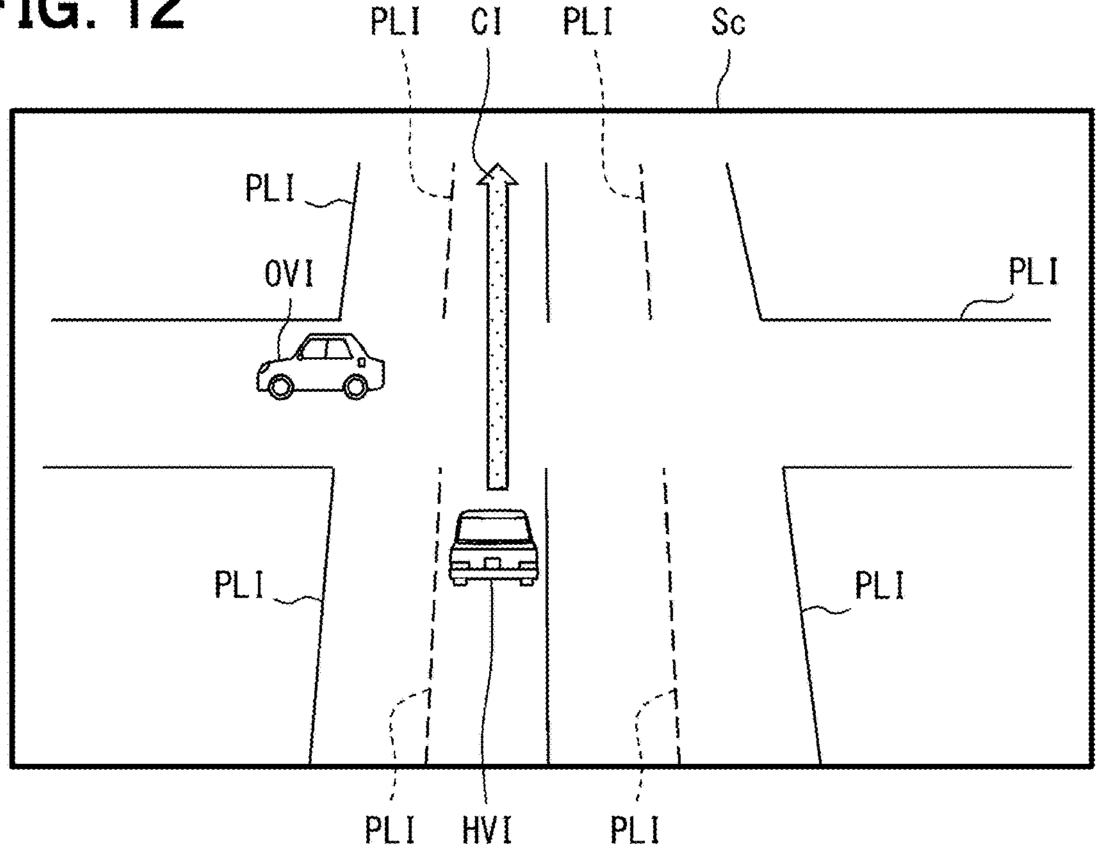
FIG. 12 is a diagram for describing an example of a change in visibility of a scheduled route image.

An example of a change in visibility of the scheduled route image will be described with reference to FIGS. 10 to 12. FIG. 11 is a display example of a surrounding situation image in a case where the host vehicle does not make a temporary stop at an intersection. FIG. 12 is a display example of the surrounding situation image in a case where the host vehicle resumes passing through the intersection after a temporary stop. As illustrated in FIGS. 11 and 12, the scheduled route image is displayed with lower visibility in a case where the host vehicle temporarily stops at an intersection than in a case where the host vehicle does not temporarily stop. As illustrated in FIGS. 10 and 12, the scheduled route image is displayed with higher visibility in a case where the host vehicle resumes passing through the intersection after the temporary stop, than in a case where the host vehicle does not perform the temporary stop. In FIGS. 10 to 12, the example in which the host vehicle goes straight at the intersection is described, but the present invention is not necessarily limited thereto. In a case where the host vehicle turns right or left at the intersection, the display may be similarly changed according to the presence or absence of the temporary stop.

An example of a flow of a process (hereinafter, temporary stop notification related process) related to the control of the temporary stop notification in the HCU 10*a* will be described with reference to a flowchart of FIG. 13. The flowchart of FIG. 13 may be started, for example, in a case where the power switch of the host vehicle is turned on.

First, in step S61, in a case where the situation identification unit 102*a* identifies that the automation level of the host vehicle is LV3 or higher (YES in S61), the process proceeds to step S62. That is, in a case where the situation identification unit 102*a* identifies that the host vehicle is in non-monitoring-obligation automated driving, the process proceeds to step S62. On the other hand, in a case where the automation level of the host vehicle is identified to be less than LV3 (NO in S61), the process proceeds to step S72.

In step S62, in a case where the situation identification unit 102*a* identifies that the host vehicle has entered the intersection (YES in S62), the process proceeds to step S63. On the other hand, in a case where it is not identified that the host vehicle has entered the intersection (NO in S62), the process proceeds to step S72.

In step S63, in a case where the operation identification unit 121*a* identifies the temporary stop of the host vehicle at the intersection (YES in S63), the process proceeds to step S65. On the other hand, in a case where the temporary stop of the host vehicle at the intersection is not identified (NO in S63), the process proceeds to step S64.

In step S64, in a case where the situation identification unit 102*a* identifies that the host vehicle has passed through the intersection (YES in S64), the process proceeds to step S72. On the other hand, in a case where it is not identified that the host vehicle has passed through the intersection (NO in S64), the process returns to S63 and is repeated.

In step S65, the notification control unit 103*a* starts the monitoring prompting notification. In step S66, the notification control unit 103*a* performs display by making the visibility of the scheduled route image in the surrounding situation image lower than the default visibility in a case where the host vehicle does not make a temporary stop.

In step S67, in a case where the operation identification unit 121*a* no longer identifies the temporary stop of the host vehicle at the intersection (YES in S67), the process proceeds to step S68. That is, in a case where the temporary stop is terminated, the process proceeds to S68. On the other hand, in a case where the temporary stop of the host vehicle at the intersection is continuously identified (NO in S67), the process of S67 is repeated.

In step S68, the notification control unit 103*a* ends the monitoring prompting notification. In step S69, the notification control unit 103*a* performs display by making the visibility of the scheduled route image in the surrounding situation image higher than the default visibility in a case where the host vehicle does not temporarily stop.

In step S70, in a case where the situation identification unit 102*a* identifies that the host vehicle has passed through the intersection (YES in S70), the process proceeds to step S71. On the other hand, in a case where it is not identified that the host vehicle has passed through the intersection (NO in S70), the process of S70 is repeated.

In step S71, the notification control unit 103*a* performs display by returning the visibility of the scheduled route image in the surrounding situation image to the default visibility in a case where the host vehicle does not make a temporary stop. In step S72, in a case where it is the timing at which the temporary stop notification related process ends (YES in S72), the temporary stop notification related process ends. On the other hand, in a case where it is not the timing at which the temporary stop notification related process ends (NO in S72), the process returns to S61 and repeats. An example of the timing at which the temporary stop notification related process ends includes that the power switch is turned off.

FIG. 13 illustrates a configuration in which, in a case where it is identified in S61 that the host vehicle is in non-monitoring-obligation automated driving, the process proceeds to S62, but the present invention is not necessarily limited thereto. For example, in a case where the automation level of the host vehicle is identified in S61 to be one or more, the process may proceed to S62. That is, in a case where it is determined in S61 that the host vehicle is in automated driving, the process may proceed to S62. Alternatively, in a case where the automation level of the host vehicle is identified in S61 to be two or higher, the process may proceed to S62.

Sixth Embodiment

The present invention is not limited to the above-described embodiment, and may have a configuration as in the following sixth embodiment. Hereinafter, an example of the sixth embodiment will be described with reference to the drawings. The vehicle system 1 of the sixth embodiment is similar to the vehicle system 1 of the first embodiment except that an HCU 10*b* is included instead of the HCU 10.

Figures 14, 15:
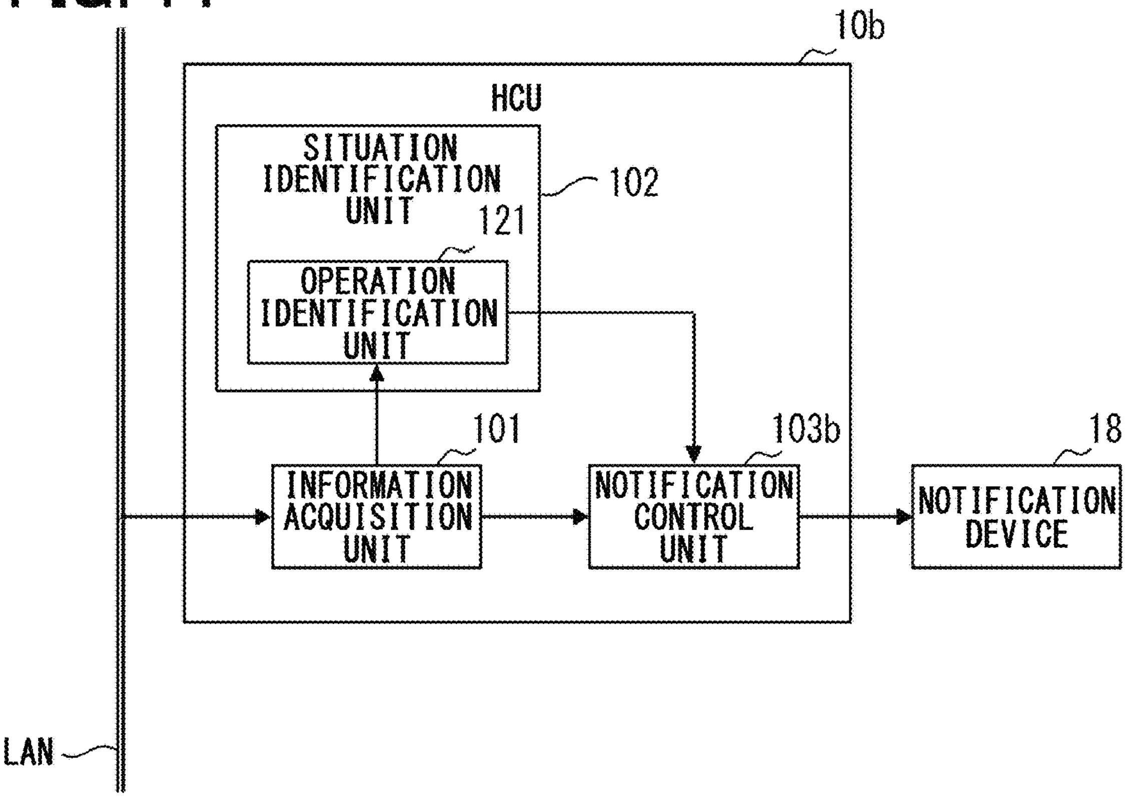
FIG. 14 is a diagram illustrating an example of a schematic configuration of an HCU.
FIG. 15 is a diagram for describing an example of an obstacle factor notification.

Next, a schematic configuration of the HCU 10*b* will be described with reference to FIG. 14. As illustrated in FIG. 14, the HCU 10*b* includes an information acquisition unit 101, a situation identification unit 102, and a notification control unit 103*b* as functional blocks regarding control of notification by the notification device 18. The HCU 10*b* is similar to the HCU 10 of the first embodiment except that a notification control unit 103*b* is provided instead of the notification control unit 103. The HCU 10*b* also corresponds to a vehicle notification control device. Execution of processing of each functional block of the HCU 10*b* by the computer also corresponds to execution of the vehicle notification control method.

The notification control unit 103*b* controls the notification by the notification device 18 as in the notification control unit 103. In a case where the operation identification unit 121 identifies a right or left turn at an intersection during automated driving of the host vehicle and in a case where an obstacle as a factor that obstructs the right or left turn is present, the notification control unit 103*b* makes a notification indicating the obstacle (hereinafter, obstacle factor notification). This makes it possible to easily receive assistance from the driver for avoiding a factor that hinders right or left turning. The obstacle is not limited to the above-described passage blocking object, and may be configured to include an object that may inhibit right or left turning. The identification of the obstacle may be performed by the situation identification unit 102 based on the determination result by the action determination unit. The process in the notification control unit 103*b* also corresponds to a notification control step.

The obstacle factor notification may be made by display on the indicator 181. As an example of the display of the obstacle factor notification, the display may be performed by highlighting the obstacle in the surrounding situation image. The obstacle factor notification may be made by audio output from the audio output device 182. In this case, the obstacle factor notification may be made by an audio output for guiding the position of the obstacle with respect to the host vehicle.

An example of the obstacle factor notification will be described with reference to FIG. 15. In FIG. 15, a case where the obstacle factor notification is made by the display highlighting the obstacle in the surrounding situation image will be described as an example. In FIG. 15, a case where there is an oncoming vehicle that obstructs the right turn of the host vehicle scheduled to turn right at the intersection will be described as an example. The oncoming vehicle corresponds to the obstacle. The obstacle may be limited to one that is a factor of temporary stop. IHI in the figure indicates a display highlighting the obstacle. OVIa is a surrounding vehicle image representing an oncoming vehicle as an obstacle. OVIb is a surrounding vehicle image representing an oncoming vehicle following the oncoming vehicle as the obstacle. In the example of FIG. 15, the obstacle is highlighted by displaying a frame surrounding the surrounding vehicle image OVIa indicating an oncoming vehicle that inhibits right turn. As illustrated in FIG. 15, the obstacle as a factor that obstructs the right or left turn of the host vehicle may be display-highlighted to allow the driver to recognize the obstacle. It is preferable that in the fifth embodiment, as illustrated in FIG. 15, the route of the host vehicle at the intersection is indicated by the scheduled route image.

It is preferable that in a case where the operation identification unit 121 identifies a right turn at an intersection during automated driving of the host vehicle on a road where left-hand traffic is mandatory, i.e., required by law, the notification control unit 103*b* makes the obstacle factor notification indicating the oncoming vehicle in a case where the oncoming vehicle for the host vehicle is present as the obstacle. On the other hand, it is preferable that in a case where the operation identification unit 121 identifies a left turn at the intersection during the automated driving of the host vehicle on a road where left-hand traffic is a mandatory, the notification control unit 103*b* makes the obstacle factor notification indicating the object in a case where the object of either a pedestrian or a two-wheeled vehicle is present as the obstacle. The two-wheeled vehicle includes a bicycle, a motorcycle, and the like. When the host vehicle turns right at an intersection of a road where left-hand traffic is mandatory, there is a high possibility that an oncoming vehicle traveling straight on the opposite lane obstructs the turning right of the host vehicle. On the other hand, at the time of a left turn at an intersection of a road where left-hand traffic is mandatory, there is a high possibility that a pedestrian crossing the road or a two-wheeled vehicle trying to get off the left side of the host vehicle obstructs the left turn of the host vehicle. According to the above configuration, it is possible to make the obstacle factor notification about the object that is likely to actually obstruct the passage of the host vehicle according to each of the right turn and the left turn of the host vehicle at the intersection.

Figure 16:
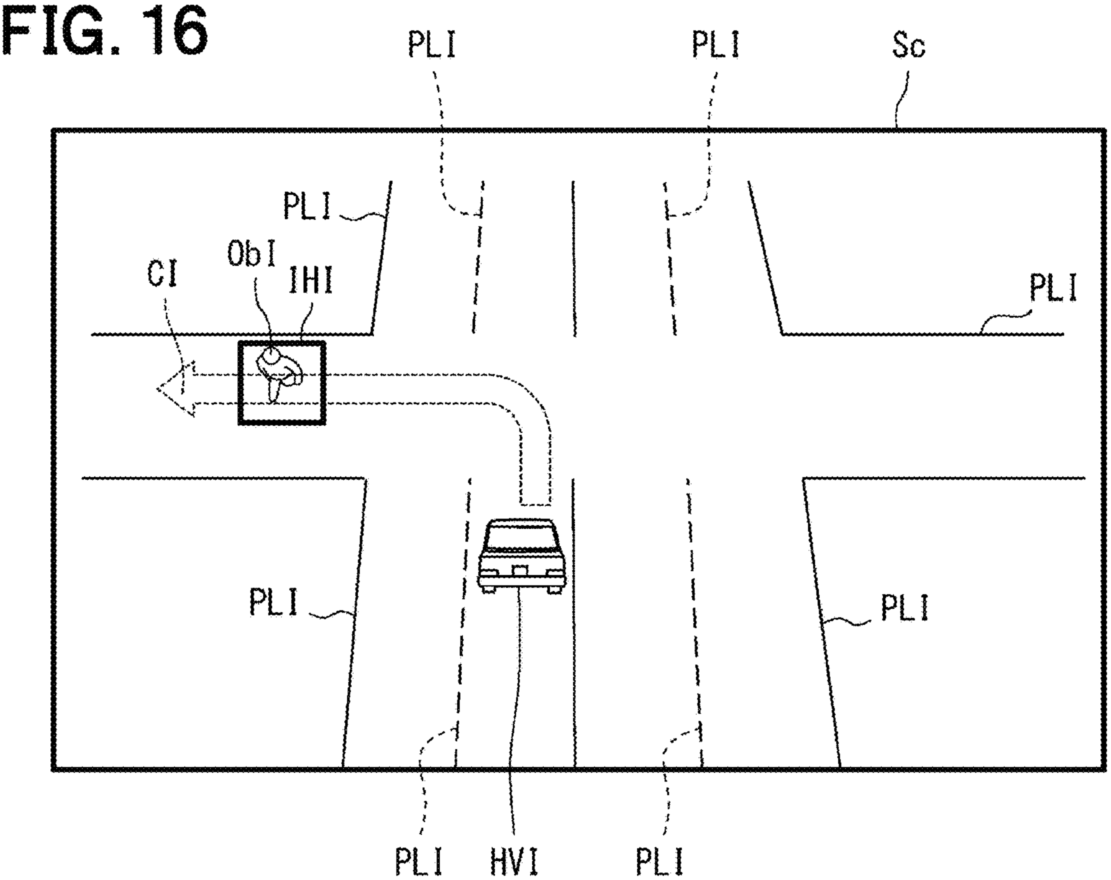
FIG. 16 is a diagram for describing an example of the use of the obstacle factor notification according to the right or left turn of the host vehicle.

An example of the use of the obstacle factor notification according to the right or left turn of the host vehicle will be described with reference to FIGS. 15 and 16. In FIG. 16, a case where there is a pedestrian who obstructs the left turn of the host vehicle scheduled to turn left at the intersection will be described as an example. This pedestrian corresponds to the obstacle. ObI in the figure is an image representing a pedestrian as an obstacle. As illustrated in FIG. 15, when the host vehicle turns right at the intersection, in a case where an oncoming vehicle of the host vehicle exists as the obstacle, the obstacle factor notification indicating the oncoming vehicle is made (see IHI in FIG. 15). On the other hand, as illustrated in FIG. 16, in a case where a pedestrian is present as the obstacle at the time of turning left at the intersection, the obstacle factor notification indicating the pedestrian is made (see IHI in FIG. 16).

It is preferable that the notification control unit 103*b* also make the obstacle factor notification in a case where the object to be the obstacle is switched. The case where the object to be the obstacle is switched includes, for example, a case where an oncoming vehicle that has been the obstacle has passed, but the next oncoming vehicle is a new obstacle. According to this, the obstacle factor notification can be made every time the object to be the obstacle is switched. Therefore, even when the object to be the obstacle is switched, it is possible to cause the driver to recognize a new obstacle.

Figure 17:
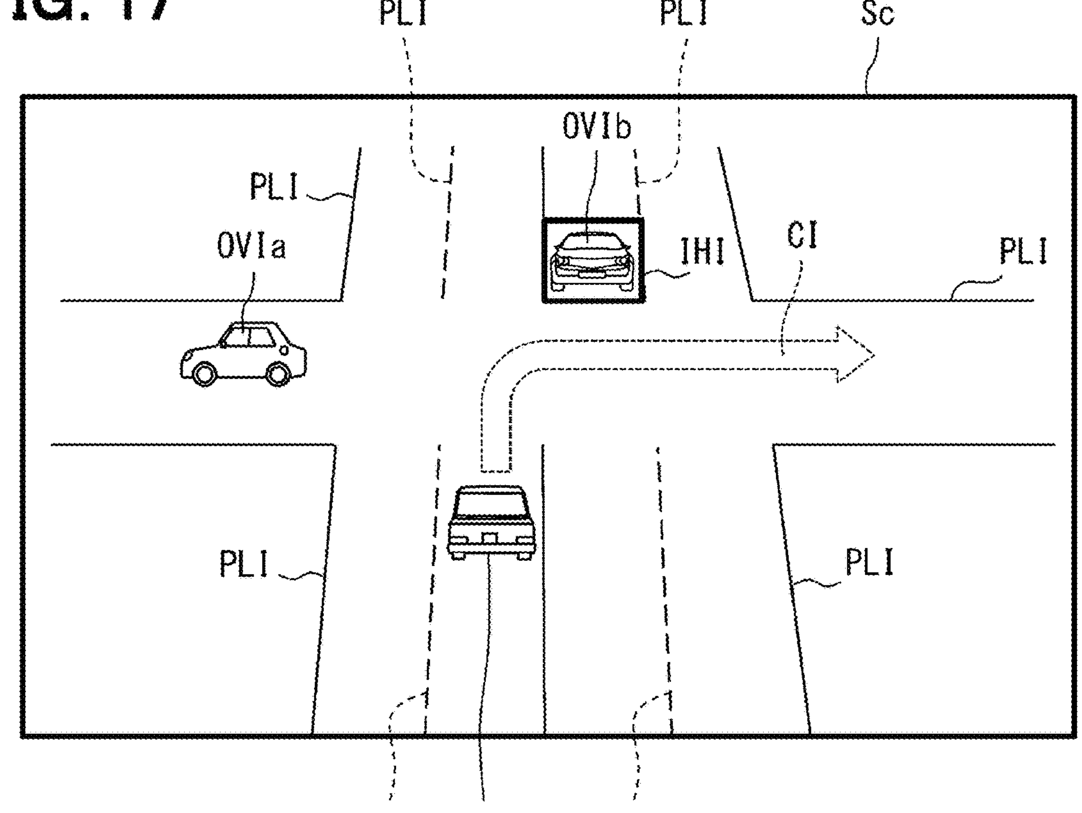
FIG. 17 is a diagram for describing an example of switching of the obstacle factor notification according to switching of the obstacle.

An example of switching of the obstacle factor notification according to the switching of the obstacle will be described with reference to FIGS. 15 and 17. In FIG. 17, as in FIG. 15, a case where there is an oncoming vehicle that obstructs the right turn of the host vehicle scheduled to turn right at the intersection will be described as an example. FIG. 17 shows an example in which the oncoming vehicle (hereinafter, the first target) that was the obstacle in FIG. 15 has left, and the next oncoming vehicle (hereinafter, the second vehicle) that was the vehicle of following the oncoming vehicle has become a new obstacle. As illustrated in FIGS. 15 and 17, in a case where the first vehicle is the obstacle, the obstacle factor notification is made for the first vehicle (see IHI in FIG. 15). On the other hand, in a case where the obstacle is switched from the first vehicle to the second vehicle, the notification is switched to make the obstacle factor notification about the second vehicle (see IHI in FIG. 17).

It is preferable that the notification control unit 103*b* displays, in the surrounding situation image, the situation of the lane (hereinafter, scheduled entry lane) which the host vehicle enters by the right or left turn before the right or left turn at the intersection of the host vehicle, and makes the obstacle factor notification indicating the obstacle even in a case where an obstacle that was not identified as the scheduled entry lane is newly identified. According to this, it is possible to easily receive the assistance from driver in the avoidance of the obstacle newly identified as the scheduled entry lane. Examples of the obstacle newly identified as the scheduled entry lane include a parked vehicle and a preceding vehicle that is stopped in the traffic congestion.

Figure 18:
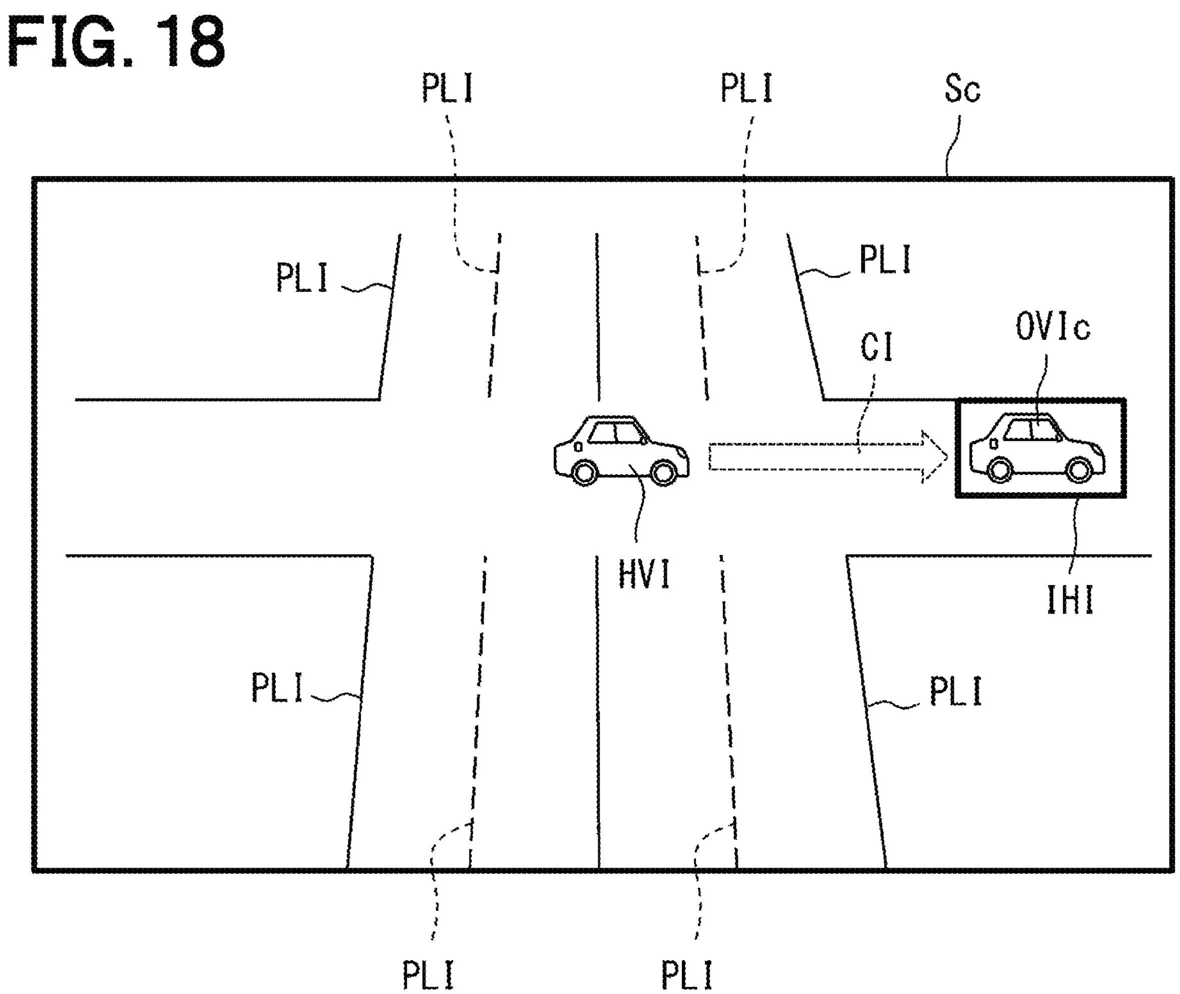
FIG. 18 is a diagram for describing an example of switching of the obstacle factor notification according to the change in the obstacle in the scheduled entry lane.

With reference to FIGS. 15 and 18, an example of switching of the obstacle factor notification according to the change in the obstacle in the scheduled entry lane will be described. In FIG. 18, as in FIG. 15, a case of turning right at an intersection will be described as an example. FIG. 15 illustrates an example in which the obstacle is not identified in the scheduled entry lane due to the right turn of the host vehicle. On the other hand, FIG. 18 illustrates an example in which the obstacle is newly identified in the scheduled entry lane due to the right turn of the host vehicle. OVIc of FIG. 18 is a surrounding vehicle image showing the parked vehicle as the newly identified obstacle. As illustrated in FIG. 15, at a time point when the parked vehicle as the obstacle is not identified in the scheduled entry lane when the host vehicle turns right at the intersection, and the image of the parked vehicle is not displayed, the obstacle factor notification about the parked vehicle is not made. On the other hand, as illustrated in FIG. 18, in a case where a parked vehicle as an obstacle is newly identified in the scheduled entry lane, the obstacle factor notification about the parked vehicle is made (see IHI in FIG. 18).

An example of a flow of processing (hereinafter, obstacle factor notification related process) related to the control of the obstacle factor notification in the HCU 10*b* will be described with reference to a flowchart of FIG. 19. The flowchart of FIG. 19 may be started, for example, in a case where the power switch of the host vehicle is turned on.

First, in step S81, in a case where the situation identification unit 102 identifies that the automation level of the host vehicle is LV3 or higher (YES in S81), the process proceeds to step S82. That is, in a case where the situation identification unit 102 identifies that the host vehicle is in non-monitoring-obligation automated driving, the process proceeds to step S82. On the other hand, in a case where the automation level of the host vehicle is identified to be less than LV3 (NO in S81), the process proceeds to step S90.

In step S82, in a case where the operation identification unit 121 identifies a right or left turn of the host vehicle at the intersection (YES in S82), the process proceeds to step S83. In a case where the operation identification unit 121 does not identify the right or left turn of the host vehicle at the intersection (NO in S82), the process proceeds to step S90.

In step S83, in a case where the situation identification unit 102 identifies the obstacle (YES in S83), the process proceeds to step S85. On the other hand, in a case where the obstacle has not been identified (NO in S83), the process proceeds to step S84. In step S84, in a case where the situation identification unit 102 identifies that the host vehicle has passed through the intersection (YES in S84), the process proceeds to step S90. On the other hand, in a case where it is not identified that the host vehicle has passed through the intersection (NO in S84), the process returns to S83 and is repeated.

In step S85, the notification control unit 103*b* starts the obstacle factor notification. In step S86, in a case where the situation identification unit 102 identifies that the host vehicle has passed through the intersection (YES in S86), the process proceeds to step S87. On the other hand, in a case where it is not identified that the host vehicle has passed through the intersection (NO in S86), the process proceeds to step S88. In step S87, the notification control unit 103*b* ends the obstacle factor notification, and the procedure proceeds to step S90.

In step S88, in a case where there is a change in the obstacle identified by the situation identification unit 102 (YES in S88), the process proceeds to step S89. On the other hand, in a case where there is no change in the obstacle identified by the situation identification unit 102 (YES in S88), the process returns to S86 and is repeated. Examples of the change in the identified obstacle include a change in which the identified obstacle is switched, a change in which the identified obstacle deviates from the obstacle, and the like.

In step S89, the notification control unit 103*b* changes the obstacle factor notification according to the change in the obstacle identified by the situation identification unit 102, and returns to S86 to repeat the process. For example, in a case where there is a change in which the identified obstacle is switched, the notification is switched to the obstacle factor notification about the switched obstacle. In a case where there is a change in which the identified obstacle deviates from the obstacle, the obstacle factor notification about the obstacle is terminated.

In step S90, in a case where it is the timing at which the obstacle factor notification related process ends (YES in S90), the obstacle factor notification related process ends. On the other hand, in a case where it is not the timing at which the obstacle factor notification related process ends (NO in S90), the process returns to S81 and repeats. An example of the timing at which the obstacle factor notification related process ends includes that the power switch is turned off.

Figure 19:
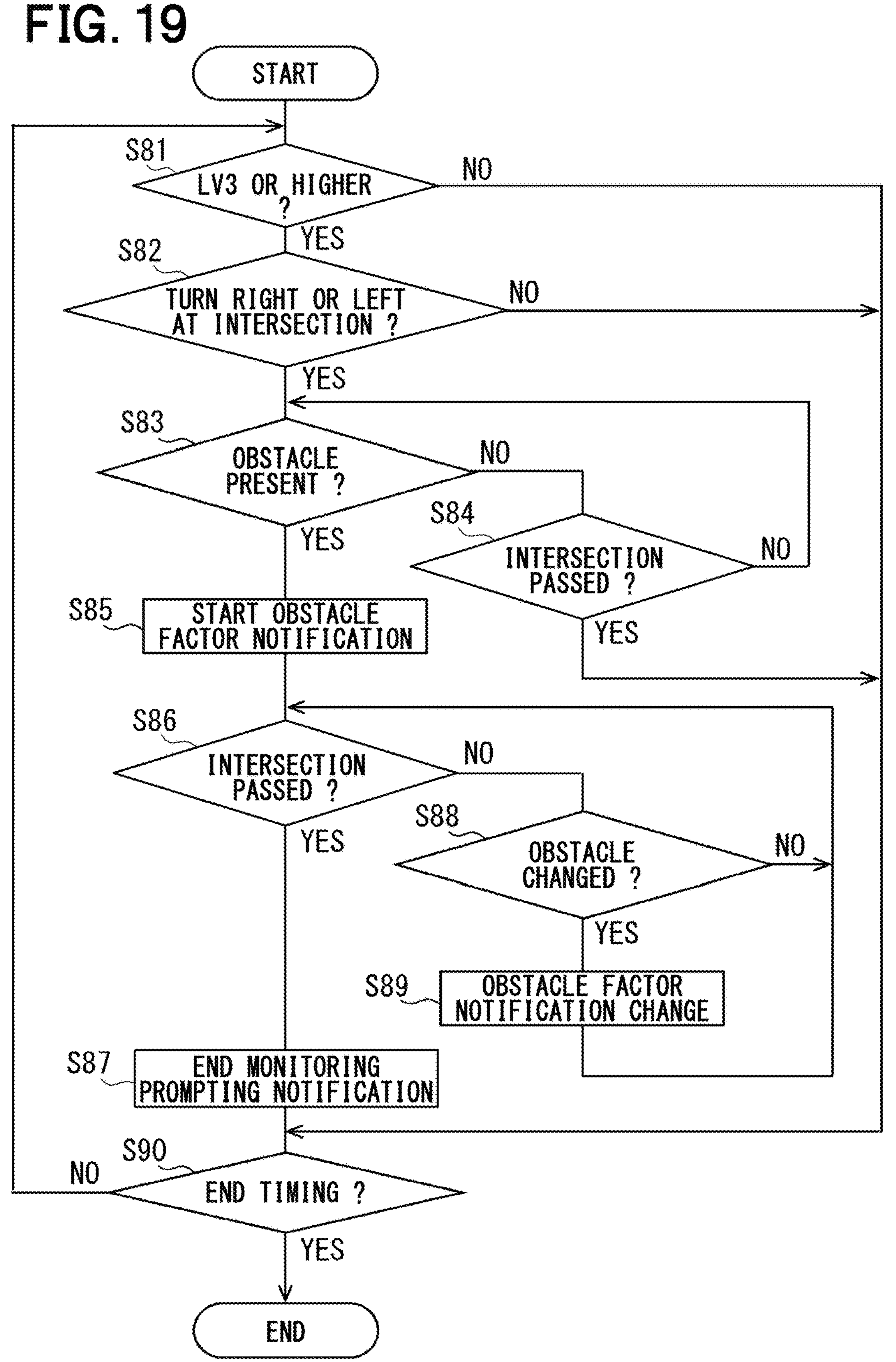
FIG. 19 is a flowchart illustrating an example of a flow of an obstacle factor notification related process in the HCU in the sixth embodiment.

FIG. 19 illustrates a configuration is shown in which, in a case where it is identified in S81 that the host vehicle is in non-monitoring-obligation automated driving, the process proceeds to S82, but the present invention is not necessarily limited thereto. For example, in a case where the automation level of the host vehicle is identified in S81 to be one or more, the process may proceed to S82. That is, in a case where it is determined in S81 that the host vehicle is in automated driving, the process may proceed to S82. Alternatively, in a case where the automation level of the host vehicle is identified in S81 to be two or higher, the process may proceed to S82.

Seventh Embodiment

The present invention is not limited to the above-described embodiment, and may have a configuration as in the following sixth embodiment. Hereinafter, an example of the sixth embodiment will be described with reference to the drawings.

Figure 20:
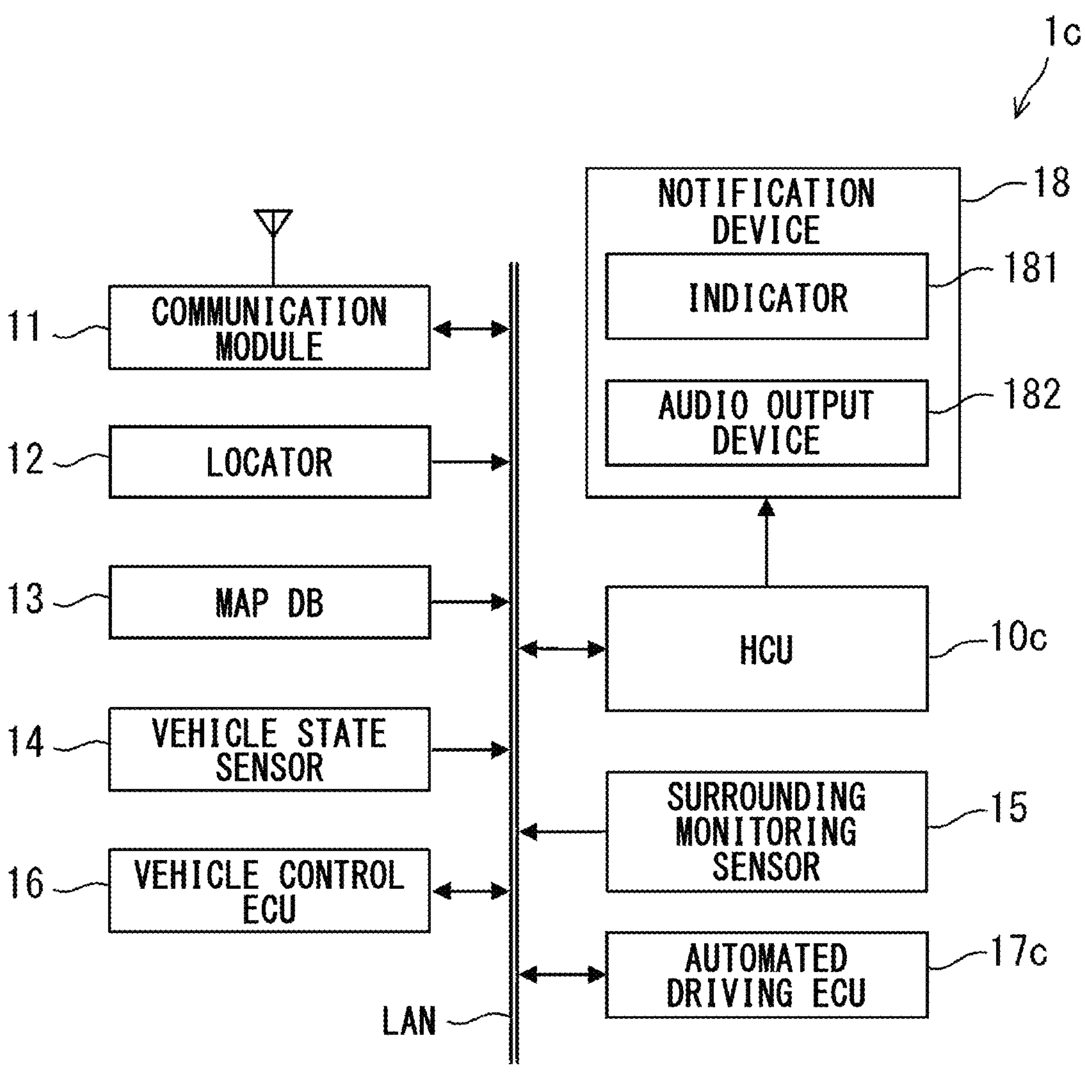
FIG. 20 is a diagram illustrating an example of a schematic configuration of a vehicle system.

Hereinafter, the vehicle system 1*c* illustrated in FIG. 20 can be used in an automated driving vehicle. As illustrated in FIG. 20, the vehicle system 1*c* includes an HCU 10*c*, the communication module 11, the locator 12, the map DB 13, the vehicle state sensor 14, the surrounding monitoring sensor 15, the vehicle control ECU 16, an automated driving ECU 17*c*, and the notification device 18. The vehicle system 1*c* includes the HCU 10*c* instead of the HCU 10. The vehicle system 1*c* includes the automated driving ECU 17*c* instead of the automated driving ECU 17. The vehicle system 1*c* is similar to the vehicle system 1 of the first embodiment except for these components.

The automated driving ECU 17*c* is similar to the automated driving ECU 17 of the first embodiment except that some processes are different. This different point will be described. The automated driving ECU 17*c* includes a route intersection prediction unit as a functional block. The route intersection prediction unit predicts whether a route intersection in which a scheduled route of the host vehicle intersects with an other vehicle or a scheduled route of the other vehicle. The scheduled route of the host vehicle may be generated by the action determination unit. Whether the scheduled route of the host vehicle intersects with the other vehicle may be predicted using the position of the other vehicle recognized by the travel environment recognition unit. The scheduled route of the other vehicle may be identified from information about the other vehicle, the information being acquired by the automated driving ECU 17*c* via the communication module 11. The scheduled route of the other vehicle may be identified from the position of the other vehicle. For example, in a case where the other vehicle is located in a right-turn exclusive lane, a route for turning right at the intersection from the right-turn exclusive lane along the shape of the intersection may be identified as the scheduled route of the other vehicle.

In a case where the route intersection prediction unit predicts occurrence of the route intersection, the automated driving ECU 17*c* determines a travel plan for passing the intersection with avoiding the other vehicle with which the occurrence of the route intersection is predicted. Hereinafter, the other vehicle with which the occurrence of the route intersection is predicted is referred to as an intersection target vehicle. Examples of the travel plan for avoiding the intersection target vehicle and passing the intersection include the followings. For example, the automated driving ECU 17*c* determines a travel plan in which the vehicle temporarily stops until the intersection target vehicle passes an occurrence point of the route intersection. In addition, in a case where the intersection target vehicle is stopped at the occurrence point of the route intersection, the automated driving ECU 17*c* determines a travel plan for avoiding the intersection target vehicle and passing the intersection. That is, the route is changed to a scheduled route for avoiding the intersection target vehicle and passing the intersection.

Figures 21, 22:
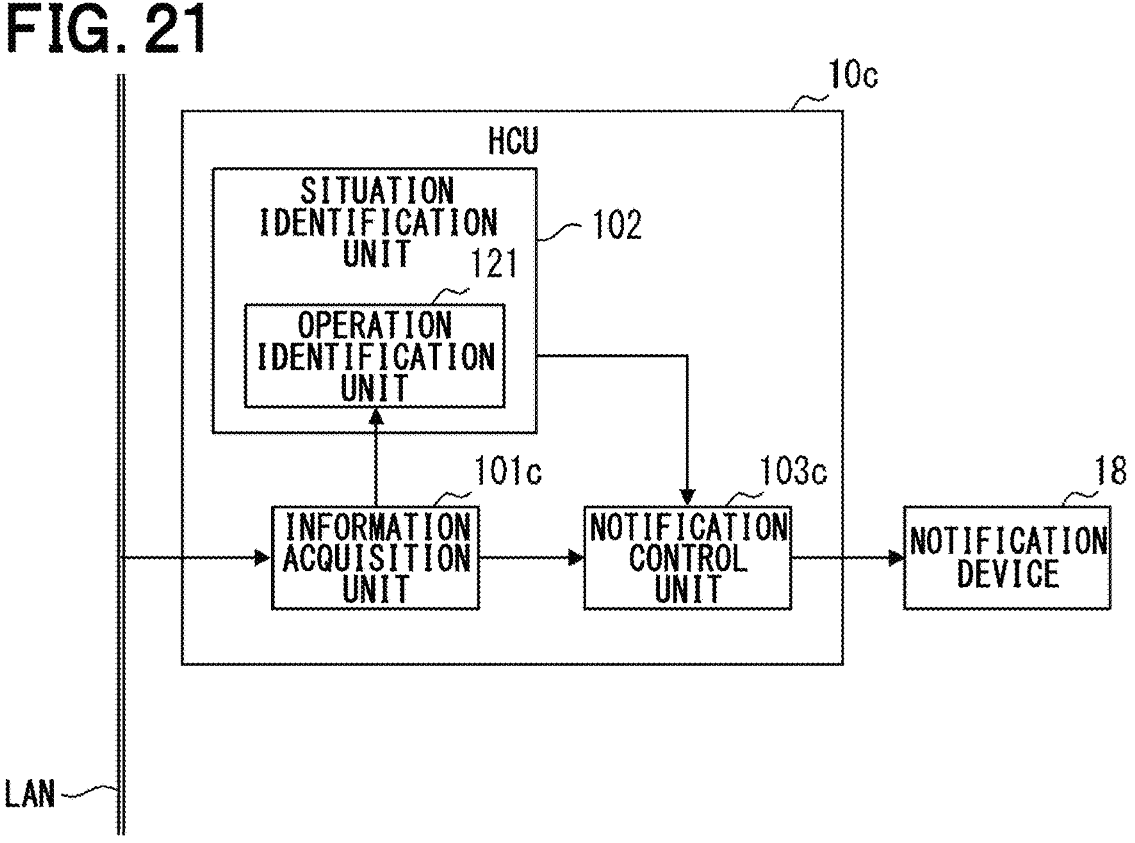
FIG. 21 is a diagram illustrating an example of a schematic configuration of an HCU.
FIG. 22 is a diagram for describing an example of display of a surrounding situation image.

Next, the schematic configuration of the HCU 10*c* will be described with reference to FIG. 21. As illustrated in FIG. 21, the HCU 10*c* includes an information acquisition unit 101*c*, the situation identification unit 102, and a notification control unit 103*c* as functional blocks regarding the control of the notification by the notification device 18. The HCU 10*c* includes the information acquisition unit 101*c* instead of the information acquisition unit 101. The HCU 10*c* includes the notification control unit 103*c* instead of the notification control unit 103. The HCU 10*c* is similar to the HCU 10 of the first embodiment except for these components. The HCU 10*c* also corresponds to a vehicle notification control device. Execution of processing of each functional block of the HCU 10*c* by the computer also corresponds to execution of the vehicle notification control method.

The information acquisition unit 101*c* is similar to the information acquisition unit 101 of the first embodiment except that some processes are different. Hereinafter, this different point will be described. The information acquisition unit 101*c* acquires a prediction result by the route intersection prediction unit. Information acquisition unit 101*c* acquires information about the intersection target vehicle as a recognition result of the travel environment recognition unit. In a case where the scheduled route is changed due to the presence of the intersection target vehicle, the information acquisition unit 101*c* acquires the changed scheduled route from the action determination unit.

The notification control unit 103*c* is similar to the notification control unit 103 of the first embodiment except that some processes are different. Hereinafter, this different point will be described. The notification control unit 103*c* display-highlights the scheduled route image based on the occurrence of route intersection, compared with the case where no route intersection occurs. Examples of the display-highlighting include increasing the luminance, increasing the color, and changing to the warning color. In addition, the notification control unit 103*c* displays a portion of the scheduled route image that corresponds to a scheduled route of the host vehicle and has been modified due to the occurrence of route intersection, with a different display style than another portion that has been not modified. Hereinafter, the portion corresponding to the scheduled route of the host vehicle modified due to the occurrence of the route intersection is referred to as a modified portion. The other portion that has not been modified refers to a portion other than the modified portion in the scheduled route image. Examples of the display in different styles include changing luminance and changing color. The notification control unit 103*c* may identify the modified portion from the information about the scheduled routes before and after the modification acquired by the information acquisition unit 101*c*.

According to the above configuration, by display-highlighting the scheduled route image, the occupant can easily prepare for the behavior change even in a case where the behavior change of the host vehicle occurs to avoid the intersection target vehicle. Therefore, comfort for the occupant is improved. In addition, by changing the display style of the modified portion, the occupant can easily recognize a future behavior change of the host vehicle. As a result, the occupant easily has a sense of security with respect to the automated driving.

It is preferable that the notification control unit 103*c* displays the scheduled route image over a region of a predetermined distance from the exit of the intersection through which the vehicle passes. The boundary between the inside and the outside of the intersection may be, for example, the position of the temporary stop line. The predetermined distance referred to herein may be set in any distance. In addition, it is preferable that the notification control unit 103*c* progressively hides the scheduled route image corresponding to the passing region where the host vehicle has passed. The notification control unit 103*c* may identify the current position of the host vehicle with respect to the intersection from the travel environment of the host vehicle sequentially acquired by the information acquisition unit 101*c*.

According to the above configuration, by displaying the scheduled route image over the region of the predetermined distance from the exit of the intersection through which the vehicle passes, the occupant can easily recognize the traveling direction after passing through the intersection. This makes it easy to give a sense of security to the occupant of the vehicle during automated driving. In addition, by hiding the scheduled route image corresponding to the passing area, the occupant can easily recognize the progress of the host vehicle.

In the surrounding situation image, the notification control unit 103*c* may display-highlight the intersection target vehicle in which the route intersection occurs with the host vehicle. According to this, in a case where the host vehicle travels away from the intersection target vehicle, the occupant can easily recognize the cause. As a result, the occupant of the vehicle during automated driving easily feels a sense of security with respect to the behavior of the host vehicle.

An example of display of the surrounding situation image will be described with reference to FIG. 22. In FIG. 22, a case where the vehicle passes through an intersection while avoiding a stopped intersection target vehicle is taken as an example. IT indicates an indication highlighting the intersection target vehicle. CI indicates the scheduled route image. CIc indicates the modified portion in the scheduled route image. In the example of FIG. 22, the intersection target vehicle is highlighted by displaying a frame surrounding a surrounding vehicle image OVI indicating the intersection target vehicle. For example, in a case where the route intersection does not occur, the scheduled route image as illustrated in FIG. 11 may be displayed. As illustrated in FIG. 22, the scheduled route image is display-highlighted in a case where the route intersection occurs, compared with in a case where the route intersection does not occur. In addition, as illustrated in FIG. 22, the modified portion in the scheduled route image is displayed in a style different from that of the portion other than the modified portion of the scheduled route image. Further, as illustrated in FIG. 22, the scheduled route image is displayed not only in the intersection but also to a position beyond the exit of the intersection through which the host vehicle passes.

Next, an example in which the scheduled route image corresponding to the area through which the host vehicle has passed is hidden will be described with reference to FIG. 23.

Figure 23:
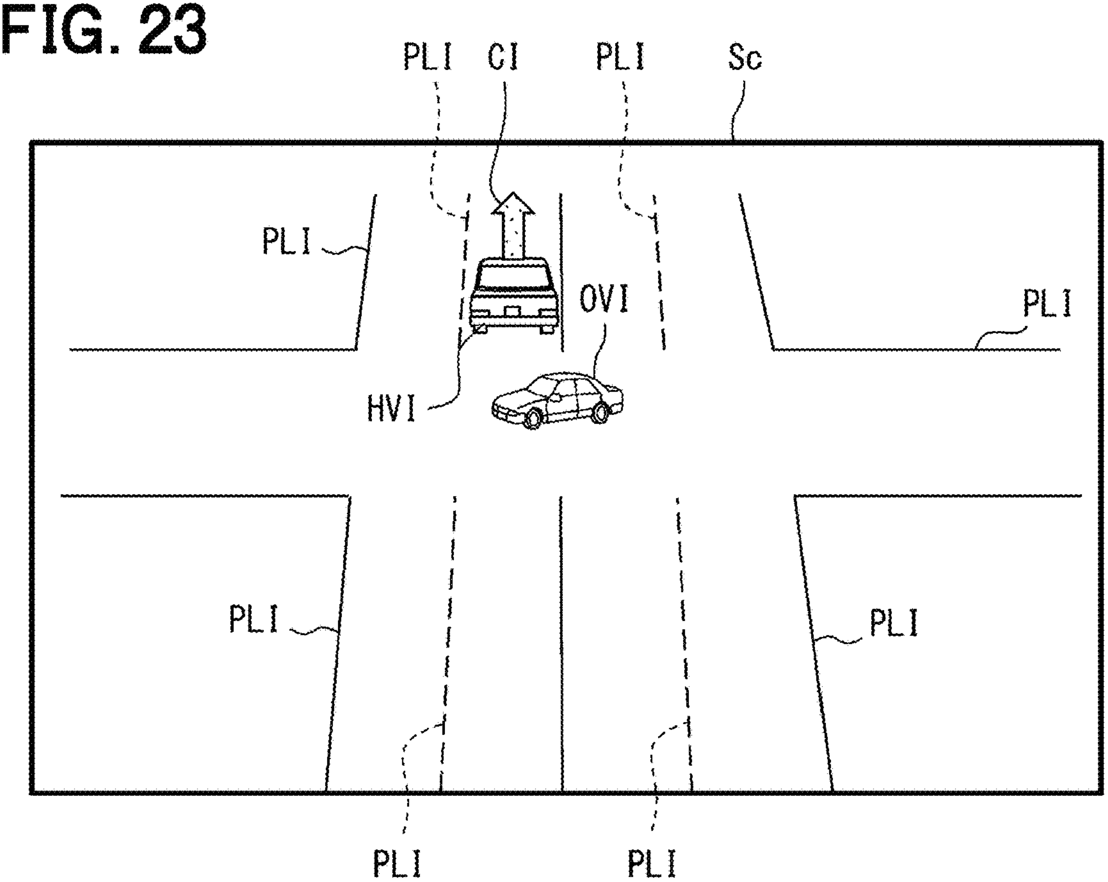
FIG. 23 is a diagram for describing an example in which the scheduled route image corresponding to the area through which the host vehicle has passed is hidden.

FIG. 23 illustrates an example in which the host vehicle continues passing from the case of FIG. 22. FIG. 23 illustrates an example in which the host vehicle ends avoiding the intersection target vehicle and reaches the exit of the intersection. As can be seen by comparing FIGS. 22 with 23, the scheduled route image corresponding to the area through which the host vehicle has passed is hidden. As illustrated in FIG. 23, the highlighted display may be ended for the intersection target vehicle that has been avoided.

It is preferable that in a case where the display of the scheduled route image and the display indicating the intersection target vehicle overlap or are close to each other, the notification control unit 103*c* performs the following. It is preferable that the notification control unit 103*c* display-highlights the intersection target vehicle by changing the display style of the intersection target vehicle itself. Hereinafter, a case where the display of the scheduled route image and the display indicating the intersection target vehicle overlap or are close to each other is referred to as a display dense state. In the display dense state, in a case where the highlighted display is performed with a frame or the like surrounding the intersection target vehicle, the scheduled route image and the highlighted display of the intersection target vehicle overlap and may be difficult to see. According to the above configuration, since the highlighted display is performed by the change in the display style of the intersection target vehicle itself, it is not difficult to see the highlighted display of the intersection target vehicle.

Figure 24:
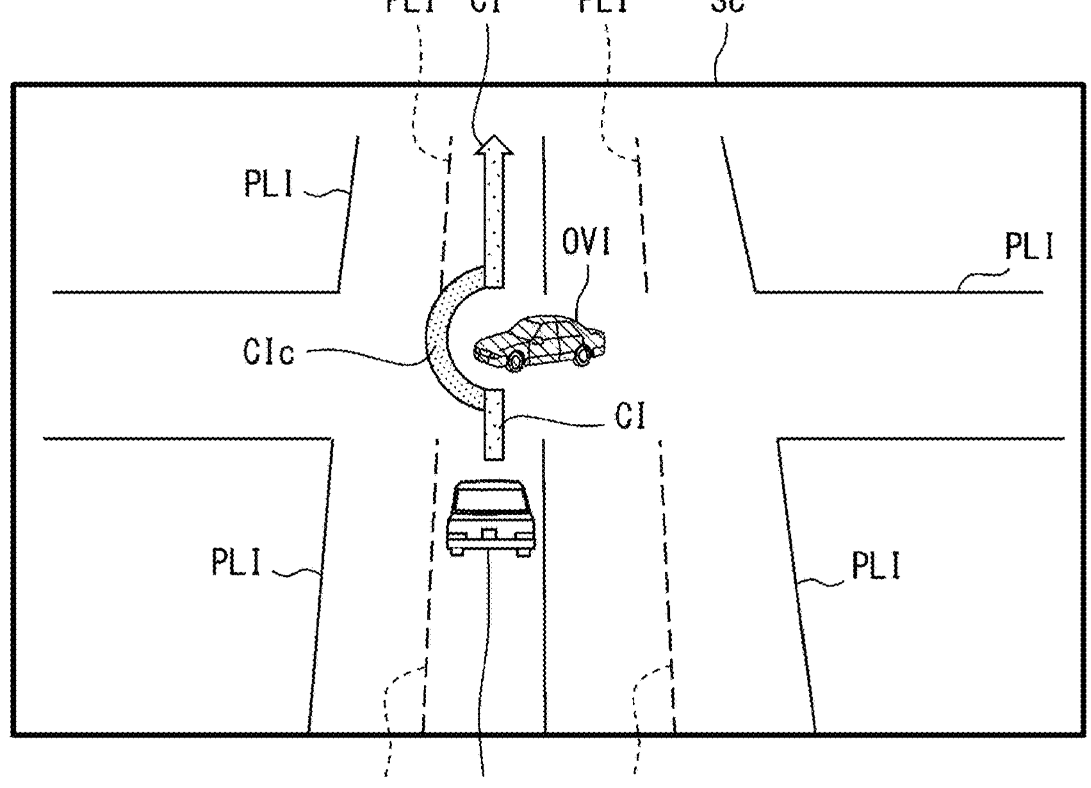
FIG. 24 is a diagram for describing an example of highlight display due to a change in a display style of the intersection target vehicle itself.

An example of highlighted display due to a change in a display style of the intersection target vehicle itself will be described with reference to FIG. 24. As can be seen by comparing FIGS. 22 with 24, highlighted display is performed by changing the display style of the intersection target vehicle itself. As an example, highlighted display may be performed by a change in color of an image indicating the intersection target vehicle.

The notification control unit 103*c* may change the presence or absence of the highlighted display of the scheduled route image according to the deviation amount by which the scheduled route of the host vehicle changed by the occurrence of the route intersection deviates from the extension of the host vehicle lane. The host vehicle lane may be the traveling lane of the host vehicle before the point where the route intersection occurs. The notification control unit 103*c* may identify the extension of the host vehicle lane from the recognition result by the travel environment recognition unit. In a case where the deviation amount is equal to or larger than the prescribed value, the notification control unit 103*c* may display-highlight the scheduled route image. On the other hand, in a case where the deviation amount is less than the prescribed value, the notification control unit 103*c* may not display-highlight the scheduled route image. In a case where the deviation amount is equal to or larger than the prescribed value, the notification control unit 103*c* may display an image indicating lighting of the direction indicator of the host vehicle in the surrounding situation image. An image indicating lighting of the direction indicator of the host vehicle is hereinafter referred to as a blinker image. The prescribed value referred to herein may be set in any distance. In a case where the deviation amount is less than the prescribed value, the notification control unit 103*c* may not display the blinker image in the surrounding situation image. According to the above configuration, the occupant can easily recognize that the behavior change of the host vehicle for avoiding the obstacle is large by the blinker image. As a result, the occupant is less likely to be surprised at a large behavior change, and the comfort for the occupant is improved.

Figure 25:
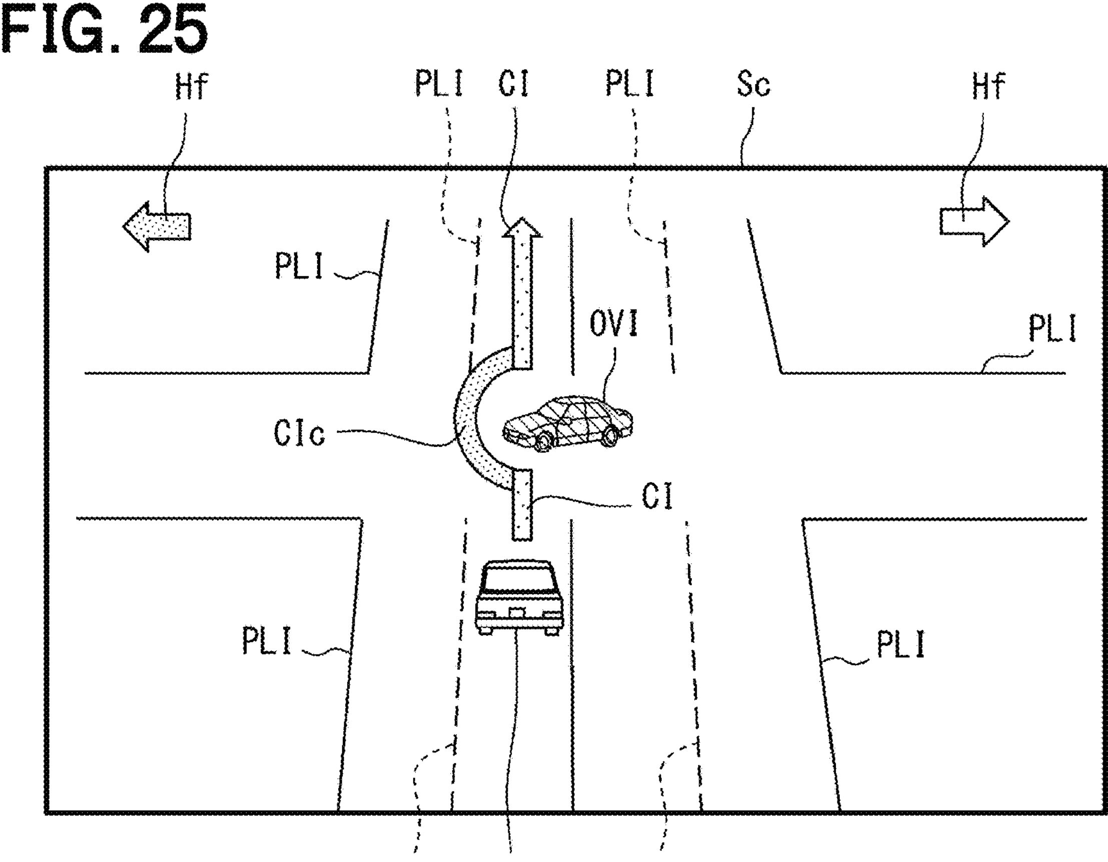
FIG. 25 is a diagram for describing an example of display of a blinker image.

An example of display of the blinker image will be described with reference to FIG. 25. HF in FIG. 25 illustrates a blinker image. For example, as illustrated in FIG. 25, the blinker image may be a pair of left and right images. The lighting of the direction indicator of the host vehicle may be indicated by display-highlighting the image on the side corresponding to the course change direction of the host vehicle.

In a case where the host vehicle is located outside the intersection, the notification control unit 103*c* may perform rotational display the surrounding situation image. The rotational display is display in which the surrounding situation image transitions with the movement of the host vehicle based on the traveling direction of the host vehicle with the position of the host vehicle as a center. The display centered on the position of the host vehicle is such that the position of the host vehicle is constantly located at a certain position near the center of the screen of the indicator 181. The display with the traveling direction of the host vehicle as a reference is a display in which the traveling direction of the host vehicle always faces a certain direction with respect to the screen of the indicator 181. On the other hand, the notification control unit 103*c* may fixedly display the surrounding situation image based on the host vehicle being located in the intersection. The fixed display is a display that fixes the surrounding situation image so as not to transition with the movement of the host vehicle. At the intersection, there is a possibility that a right or left turn is made and the direction of the host vehicle is greatly changed. In such a case, it is considered that the driver can intuitively understand how the host vehicle moves with respect to the intersection in the fixed display rather than the rotational display. During automated driving, it is conceivable that the driver is not continuously gazing at the scenery outside the vehicle, and thus it is considered to be particularly useful. The inside of the intersection referred to herein may be a range up to a predetermined distance outside the stop line when viewed from the center of the intersection. The predetermined distance referred to herein may be, for example, several tens of meters. The predetermined distance may be set in any distance.

Figure 26:
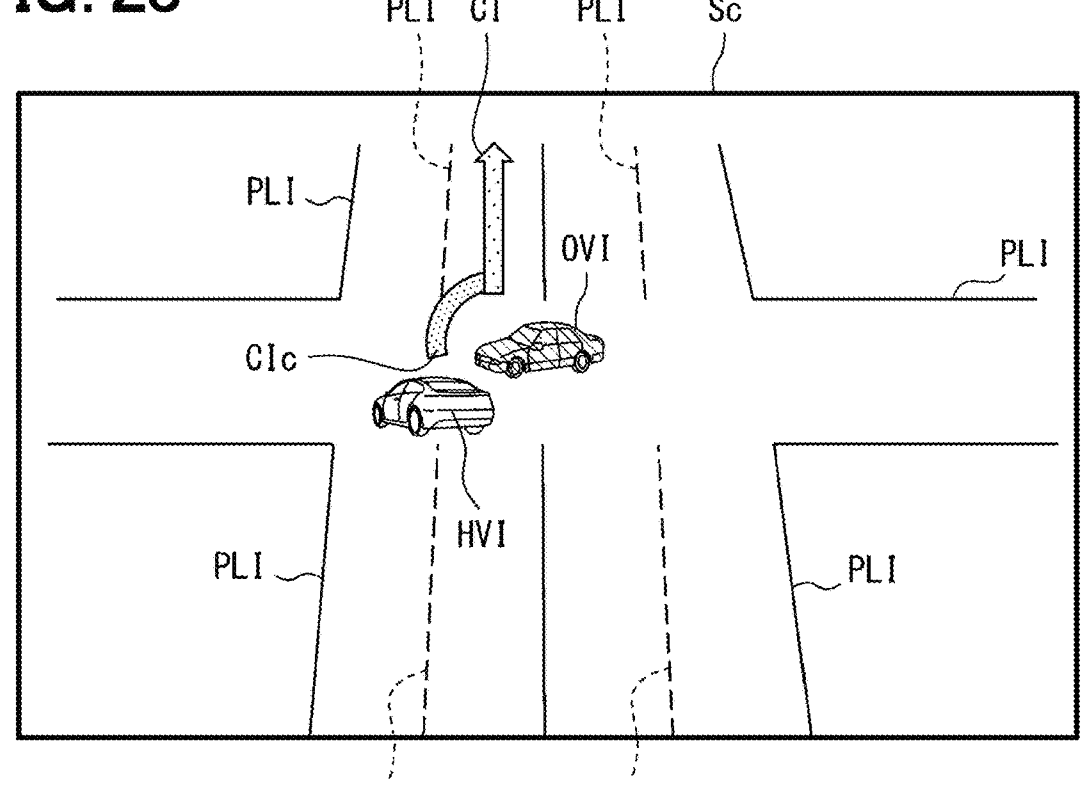
FIG. 26 is a diagram for describing an example of fixed display.
Figures 27, 28:
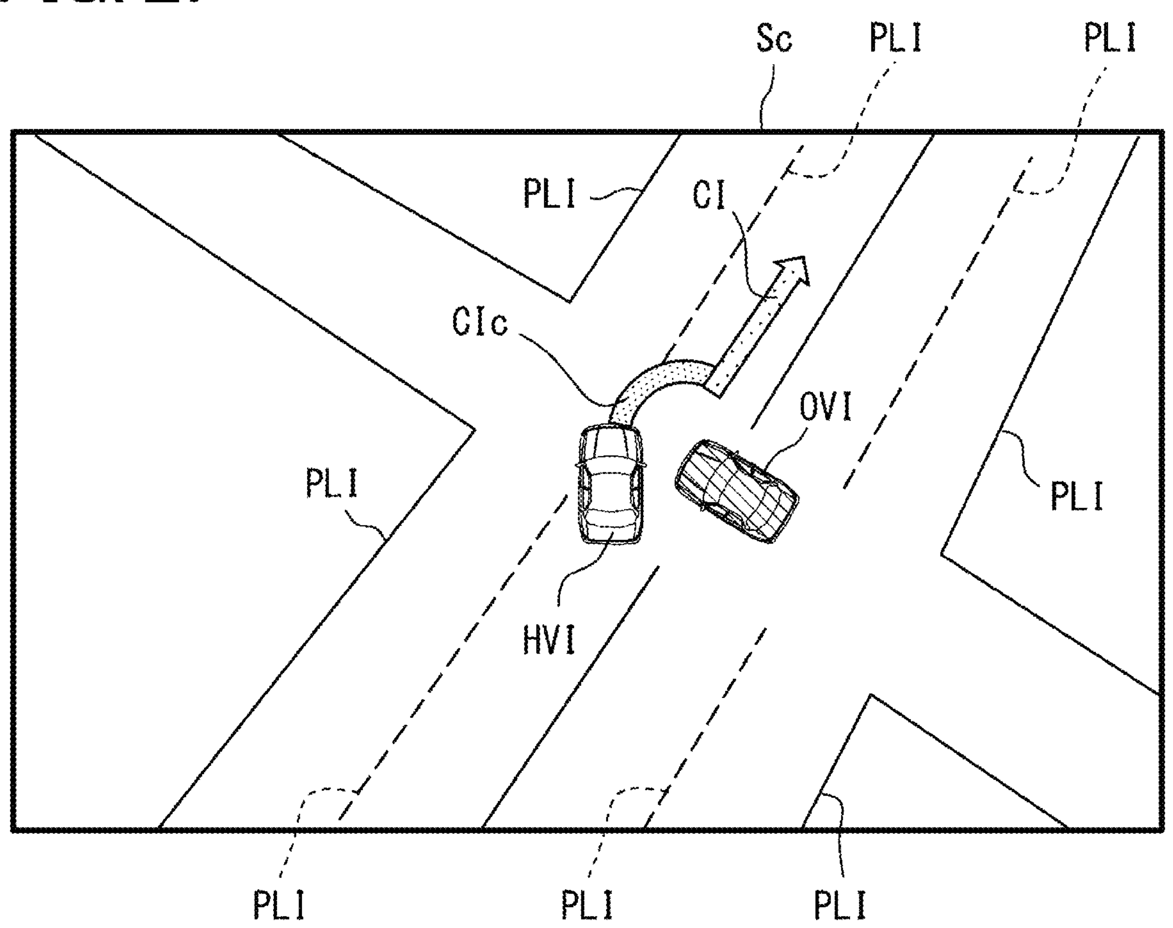
FIG. 27 is a diagram for describing an example of rotational display.
FIG. 28 is a diagram for describing an example of switching between rotational display and fixed display according to an automation level.

An example of the rotational display and the fixed display will be described with reference to FIGS. 26 and 27. FIG. 26 is a diagram for describing an example of the fixed display. FIG. 27 is a diagram for describing an example of the rotational display. FIGS. 26 and 27 illustrate the surrounding situation image after a certain time has elapsed from the situation illustrated in FIG. 24. As illustrated in FIG. 26, in the fixed display, the surrounding situation image remains fixed regardless of the movement of the host vehicle. On the other hand, as illustrated in FIG. 27, in the rotational display, the surrounding situation image moves and rotates as the host vehicle moves.

It is preferable that notification control unit 103*c* switch between the rotational display and the fixed display according to the automation level of the automated driving of the host vehicle. According to this, in a case where which of the rotational display and the fixed display is preferable for the driver is different according to the automation level, it is possible to perform preferable display according to the automation level.

The notification control unit 103*c* may perform the rotational display in a case where the automation level of the host vehicle is lower than the prescribed level. On the other hand, the notification control unit 103*c* may perform the fixed display in a case where the automation level of the host vehicle is equal to or higher than the prescribed level. The prescribed level may be, for example, LV3 that classifies the presence or absence of the surrounding monitoring obligation. The prescribed level may be set in any level. The higher the automation level, the higher the possibility that the driver is not continuously gazing at the scenery outside the vehicle. In such a case, it is considered that the driver can intuitively understand how the host vehicle moves with respect to the intersection in the fixed display rather than the rotational display. On the other hand, in a case where the automation level is low, there is a high possibility that the driver is continuously gazing at the scenery outside the vehicle. In such a case, the rotational display is displayed along the transition of the scenery rather than the fixed display, and thus, it is considered that the driver can intuitively understand the rotational display.

An example of switching between rotational display and fixed display according to the automation level will be described with reference to FIG. 28. In FIG. 28, a case where the automation level is equal to or higher than the prescribed level is indicated as the automation level "high". In FIG. 28, a case where the automation level is lower than the prescribed level is indicated as the automation level "low". As illustrated in FIG. 28, the notification control unit 103*c* performs fixed display in a case where the automation level is equal to or higher than the prescribed level. On the other hand, the notification control unit 103*c* performs the rotational display in a case where the automation level is lower than the prescribed level.

The notification control unit 103*c* may perform fixed display in a case where the automation level of the host vehicle is lower than the prescribed level, and may perform rotational display in a case where the automation level is equal to or higher than the prescribed level. Some drivers may intuitively understand how the host vehicle moves with respect to the intersection by the rotational display in a case where they do not continuously gaze at the scenery outside the vehicle. According to the above configuration, such a driver can easily understand how the host vehicle moves according to the automation level.

Eighth Embodiment

The present invention is not limited to the above-described embodiment, and may have a configuration as in the following eighth embodiment. Hereinafter, an example of the eighth embodiment will be described with reference to the drawings. A vehicle system 1 of the eighth embodiment is similar to the vehicle system 1*c* of the seventh embodiment except that an HCU 10*d* is included instead of the HCU 10*c*.

Figures 29, 30:
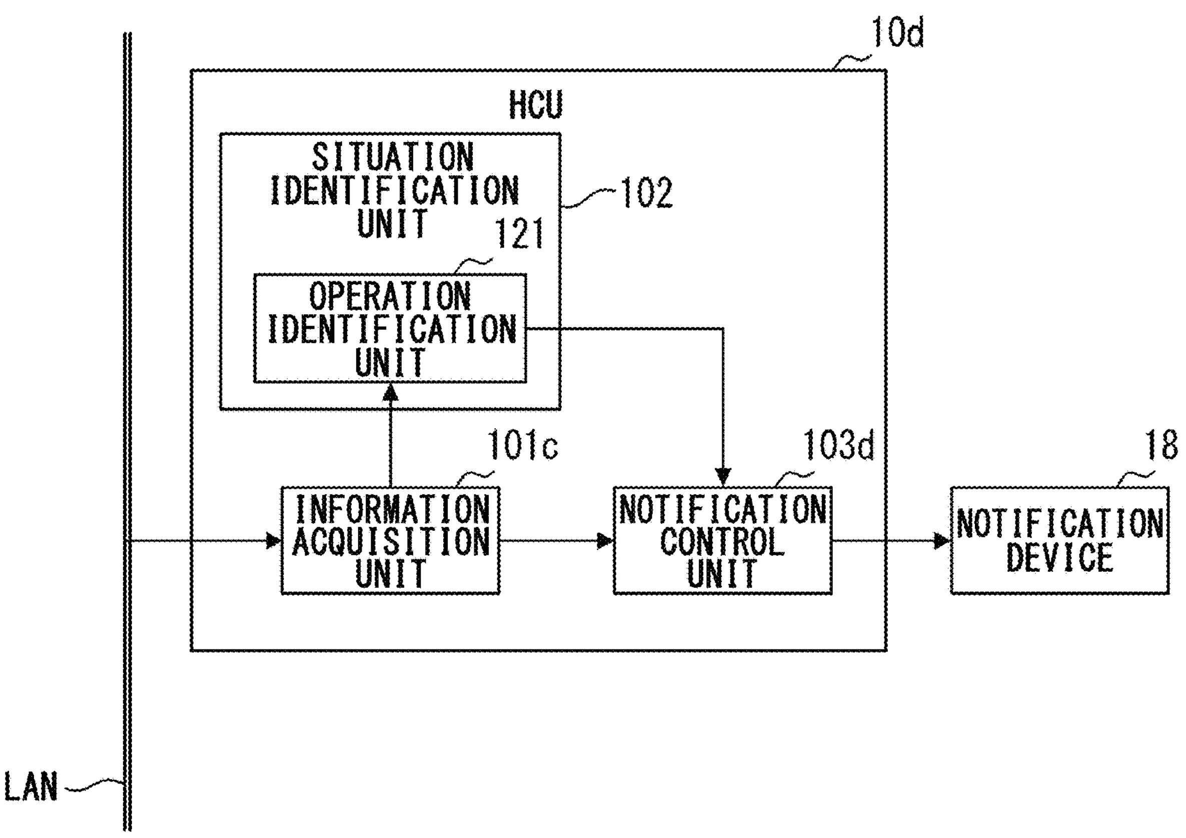
FIG. 29 is a diagram illustrating an example of a schematic configuration of an HCU.
FIG. 30 is a diagram for describing an example of switching between rotational display and fixed display according to the presence or absence of a target moving object.

Next, a schematic configuration of the HCU 10*d* will be described with reference to FIG. 29. As illustrated in FIG. 29, the HCU 10*d* includes the information acquisition unit 101*c*, the situation identification unit 102, and a notification control unit 103*d* as functional blocks regarding the control of the notification by the notification device 18. The HCU 10*d* is similar to the HCU 10*c* of the seventh embodiment except that a notification control unit 103*d* is provided instead of the notification control unit 103*c*. The HCU 10*d* also corresponds to a vehicle notification control device. Execution of processing of each functional block of the HCU 10*d* by the computer also corresponds to execution of the vehicle notification control method.

The notification control unit 103*d* is similar to the notification control unit 103*c* of the seventh embodiment except that some processes are different. Hereinafter, this different point will be described. In a case where the host vehicle is located in the intersection, the notification control unit 103*d* switches between the rotational display and the fixed display according to the presence or absence of the target moving object. The target moving object is a moving object that is likely to obstruct passage of the host vehicle at an intersection. The target moving object may be the obstacle and the intersection target vehicle described above. The target moving object may be a moving object that is likely to obstruct passage of the host vehicle at the intersection, other than the obstacle and the intersection target vehicle. The notification control unit 103*d* may identify the target moving object from the recognition result by the travel environment recognition unit. According to this, in a case where which of the rotational display and the fixed display is preferable for the driver is different depending on the presence or absence of the target moving object, it is possible to perform preferable display depending on the presence or absence of the target moving object.

The notification control unit 103*d* may perform the rotational display in a case where the host vehicle is located in the intersection and in a case where there is a target moving object. On the other hand, the notification control unit 103*d* may perform the fixed display in a case where the host vehicle is located in the intersection and in a case where there is no target moving object. In a case where there is the target moving object, it is considered that a request for the driver to confirm the actual positional relationship between the host vehicle and the target moving object is generated, unlike a case where there is no target moving object. In this case, it is considered that the actual positional relationship between the host vehicle and the target moving object is intuitively more easily understood in the fixed display than in the rotational display. On the other hand, in a case where there is no target moving object and there is a low possibility that the driver checks the outside of the vehicle, the driver can easily understand the progress of the host vehicle at the intersection by the rotational display.

An example of switching between rotational display and fixed display according to the presence or absence of the target moving object will be described with reference to FIG. 30. In FIG. 30, a case where there is a target moving object is indicated as a target moving object "present". In FIG. 30, a case where there is no target moving object is indicated as a target moving object "none". As illustrated in FIG. 30, in a case where there is a target moving object, the notification control unit 103*d* performs fixed display. On the other hand, in a case where there is no target moving object, the notification control unit 103*d* performs rotational display.

The notification control unit 103*d* may perform fixed display in a case where there is no target moving object, and may perform rotational display in a case where there is a target moving object. Depending on the driver, the actual positional relationship between the host vehicle and the target moving object may be more easily understood with the rotational display. According to the above configuration, such an occupant can easily understand the actual positional relationship between the host vehicle and the target moving object according to the presence or absence of the target moving object.

Ninth Embodiment

The present invention is not limited to the above-described embodiment, and may have a configuration as in the following ninth embodiment. Hereinafter, an example of the ninth embodiment will be described with reference to the drawings.

Figure 31:
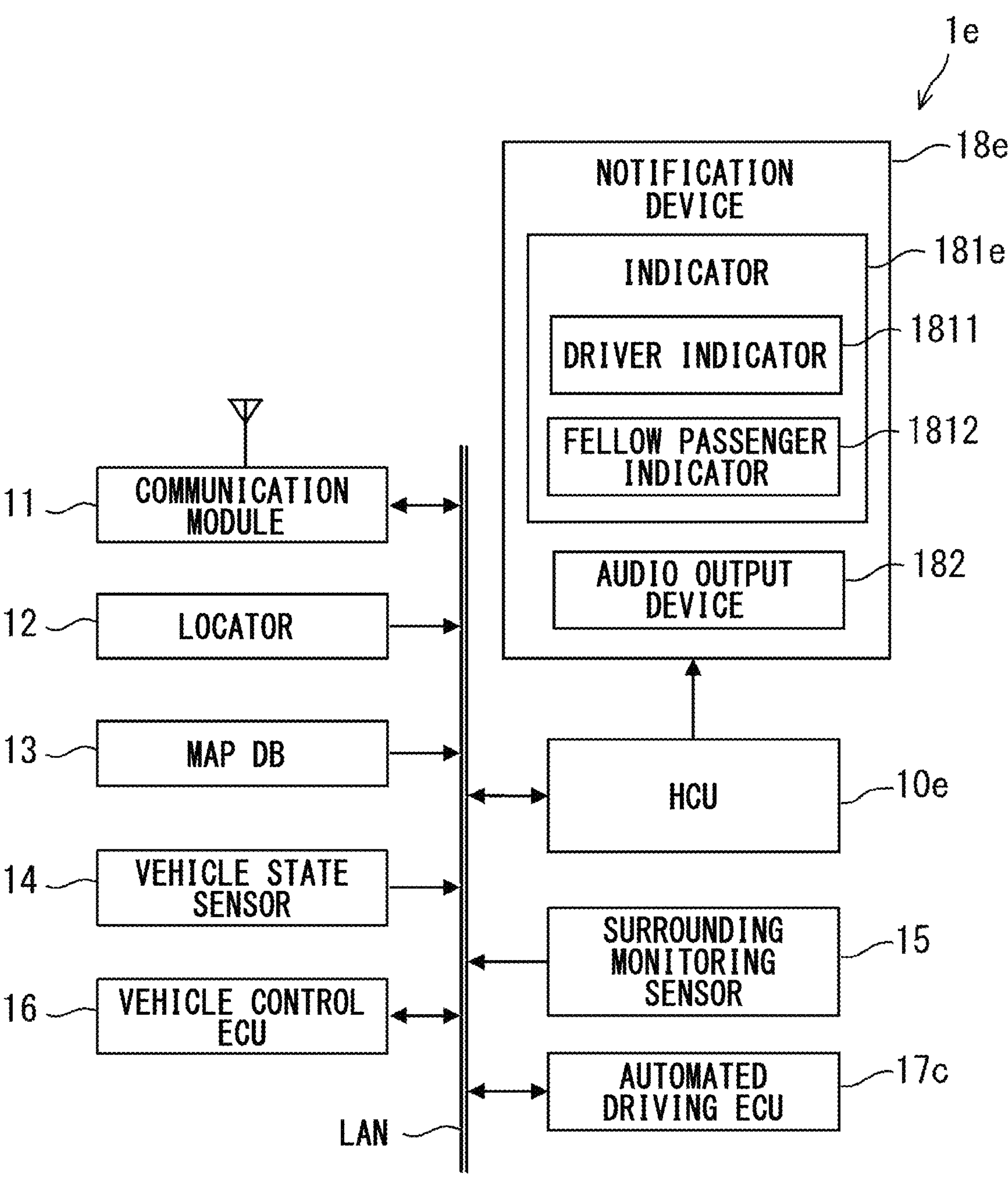
FIG. 31 is a diagram illustrating an example of a schematic configuration of a vehicle system 1*e*.

Hereinafter, a vehicle system 1*e* illustrated in FIG. 31 can be used in an automated driving vehicle. As illustrated in FIG. 31, the vehicle system 1*e* includes an HCU 10*e*, the communication module 11, the locator 12, the map DB 13, the vehicle state sensor 14, the surrounding monitoring sensor 15, the vehicle control ECU 16, the automated driving ECU 17*c*, and a notification device 18*e*. The vehicle system 1*e* includes the HCU 10*e* instead of the HCU 10*c*. The vehicle system 1*e* includes the notification device 18*e* instead of the notification device 18. The vehicle system 1*e* is similar to the vehicle system 1*c* of the seventh embodiment except for these components.

The notification device 18*e* includes an indicator 181*e* and the audio output device 182. The notification device 18*e* is similar to the notification device 18 of the first embodiment except that an indicator 181*e* is provided instead of the indicator 181. The indicator 181*e* includes a driver indicator 1811 and a fellow passenger indicator 1812. The driver indicator 1811 is the indicator 181*e* for the driver of the host vehicle. The driver indicator 1811 may be the indicator 181*e* whose display area is located in front of the driver seat. An example of the driver indicator 1811 is a meter MID. The driver indicator 1811 may be an HUD. The fellow passenger indicator 1812 is the indicator 181*e* provided so as to be visually recognizable by the fellow passenger. The fellow passenger is an occupant of the host vehicle other than the driver. The indicator 181*e* provided so as to be visually recognizable by the fellow passenger does not include the driver indicator 1811. Examples of the indicator 181*e* provided so as to be visually recognizable by the fellow passenger include a CID. The fellow passenger indicator 1812 may be the indicator 181*e* for a fellow passenger. An example of the indicator 181*e* for the fellow passenger includes the indicator 181*e* whose display area is located in front of the fellow passenger seat. An example of the indicator 181*e* for the fellow passenger includes an indicator 181*e* provided on the rear seat.

Figures 32, 33:
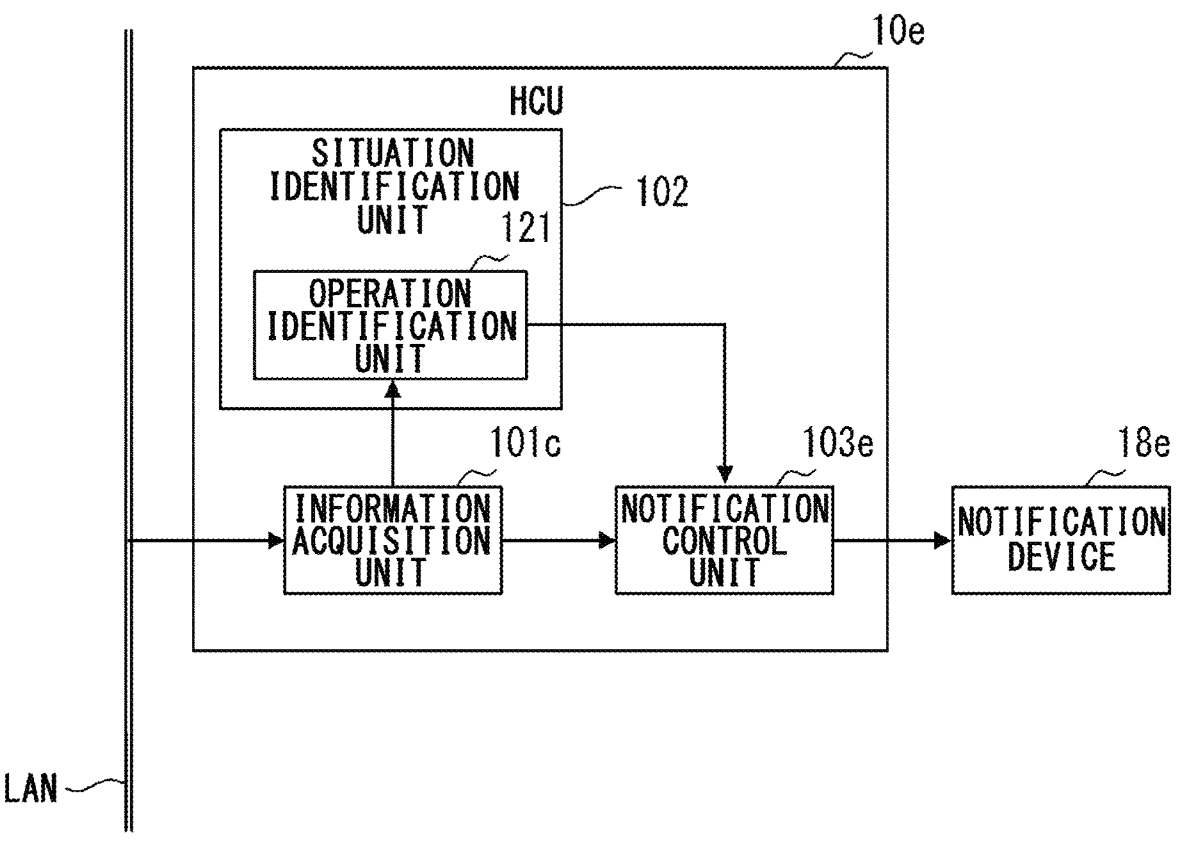
FIG. 32 is a diagram illustrating an example of a schematic configuration of an HCU.
FIG. 33 is a diagram for describing an example of use of rotational display and fixed display between the driver indicator and the fellow passenger indicator.

Next, a schematic configuration of the HCU 10*e* will be described with reference to FIG. 32. As illustrated in FIG. 32, the HCU 10*e* includes, as functional blocks, the information acquisition unit 101*c*, the situation identification unit 102, and a notification control unit 103*e* for controlling notification by the notification device 18*e*. The HCU 10*e* is similar to the HCU 10*c* of the seventh embodiment except that a notification control unit 103*e* is provided instead of the notification control unit 103*c*. The HCU 10*e* also corresponds to a vehicle notification control device. Execution of processing of each functional block of the HCU 10*e* by the computer also corresponds to execution of the vehicle notification control method.

In a case where a plurality of display areas in which the surrounding situation image is displayed is present, the notification control unit 103*e* simultaneously displays the rotational display and the fixed display in different display areas. The plurality of display areas may be different display areas of the indicator 181*e*. The plurality of display areas may be display areas obtained by dividing a screen of one indicator 181*e*. Accordingly, even in a case where the occupant who prefers the rotational display and the occupant who prefers the fixed display are mixed in the host vehicle, it is possible to perform preferable display for each occupant.

It is preferable that as illustrated in FIG. 33, the notification control unit 103*e* perform fixed display on the driver indicator 1811 and perform rotational display on the fellow passenger indicator 1812. According to this, the driver can intuitively understand how the host vehicle moves with respect to the intersection by the fixed display which is easily consistent with the actual scene. On the other hand, the traveling condition of the host vehicle at the intersection can be easily understood by the rotational display for the fellow passenger who does not need to have the consistency between the actual scene and the surrounding situation image. FIG. 33 is a diagram for describing an example of use of the rotational display and the fixed display in the driver indicator 1811 and the fellow passenger indicator 1812.

Tenth Embodiment

The present invention is not limited to the above-described embodiment, and may have a configuration as in the following the tenth embodiment. Hereinafter, an example of the tenth embodiment will be described with reference to the drawings. A vehicle system 1 of the tenth embodiment is similar to the vehicle system 1*c* of the seventh embodiment except that an HCU 10*f* is included instead of the HCU 10*c*.

Figures 34, 35:
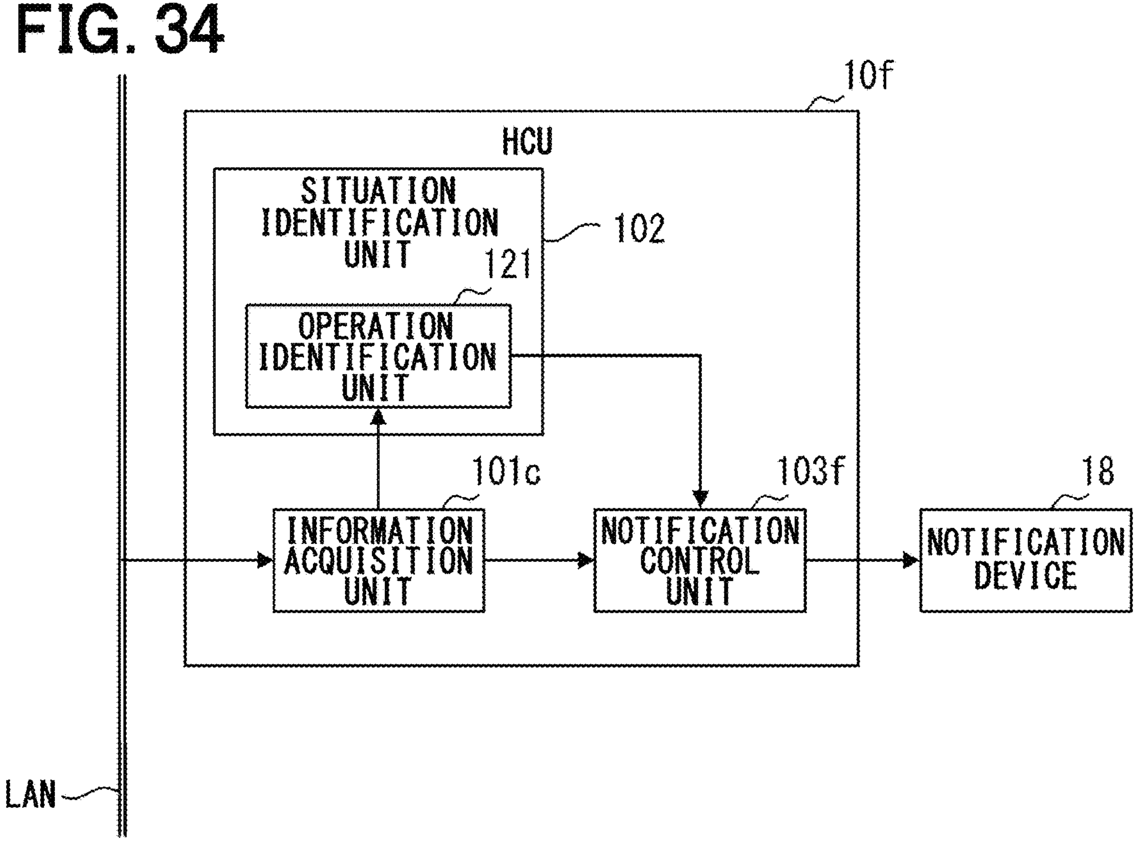
FIG. 34 is a diagram illustrating an example of a schematic configuration of an HCU.
FIG. 35 is a diagram for describing an example of display of a surrounding situation image.

Next, a schematic configuration of the HCU 10*f* will be described with reference to FIG. 34. As illustrated in FIG. 34, the HCU 10*f* includes the information acquisition unit 101*c*, the situation identification unit 102, and a notification control unit 103*f* as functional blocks regarding the control of the notification by the notification device 18. The HCU 10*f* is similar to the HCU 10*c* of the seventh embodiment except that a notification control unit 103*f* is provided instead of the notification control unit 103*c*. The HCU 10*f* also corresponds to a vehicle notification control device. Execution of processing of each functional block of the HCU 10*f* by the computer also corresponds to execution of the vehicle notification control method.

The notification control unit 103*f* is similar to the notification control unit 103*c* of the seventh embodiment except that some processes are different. Hereinafter, this different point will be described. In a case where the above-described route intersection occurs, the notification control unit 103*f* superimposes and displays the other vehicle image indicating the intersection target vehicle in the surrounding situation image on the scheduled route image of the host vehicle. That is, the portion where the scheduled route image and the other vehicle image overlap is displayed such that the scheduled route image is invisible. As an example, the layer of the other vehicle image may be superimposed and displayed on the layer of the scheduled route image. The scheduled route image and the surrounding situation image are displayed on the indicator 181. According to this, in the surrounding situation image, the scheduled route image appears to stick to the road, and the presence of the intersection target vehicle can be easily confirmed.

An example of display of the surrounding situation image will be described with reference to FIG. 35. In FIG. 35, a case where the situation is similar to that described in FIG. 10 is taken as an example. In FIG. 35, the surrounding vehicle image OVI corresponds to the above-described another vehicle image. As illustrated in FIG. 35, the notification control unit 103*f* displays a portion where the scheduled route image and the other vehicle image overlap such that the scheduled route image is invisible.

Eleventh Embodiment

The present invention is not limited to the above-described embodiment, and may have a configuration as in the following the eleventh embodiment. Hereinafter, an example of the eleventh embodiment will be described with reference to the drawings. A vehicle system 1 of the eleventh embodiment is similar to the vehicle system 1*c* of the seventh embodiment except that an HCU 10*g* is included instead of the HCU 10*c*.

Figures 36, 37:
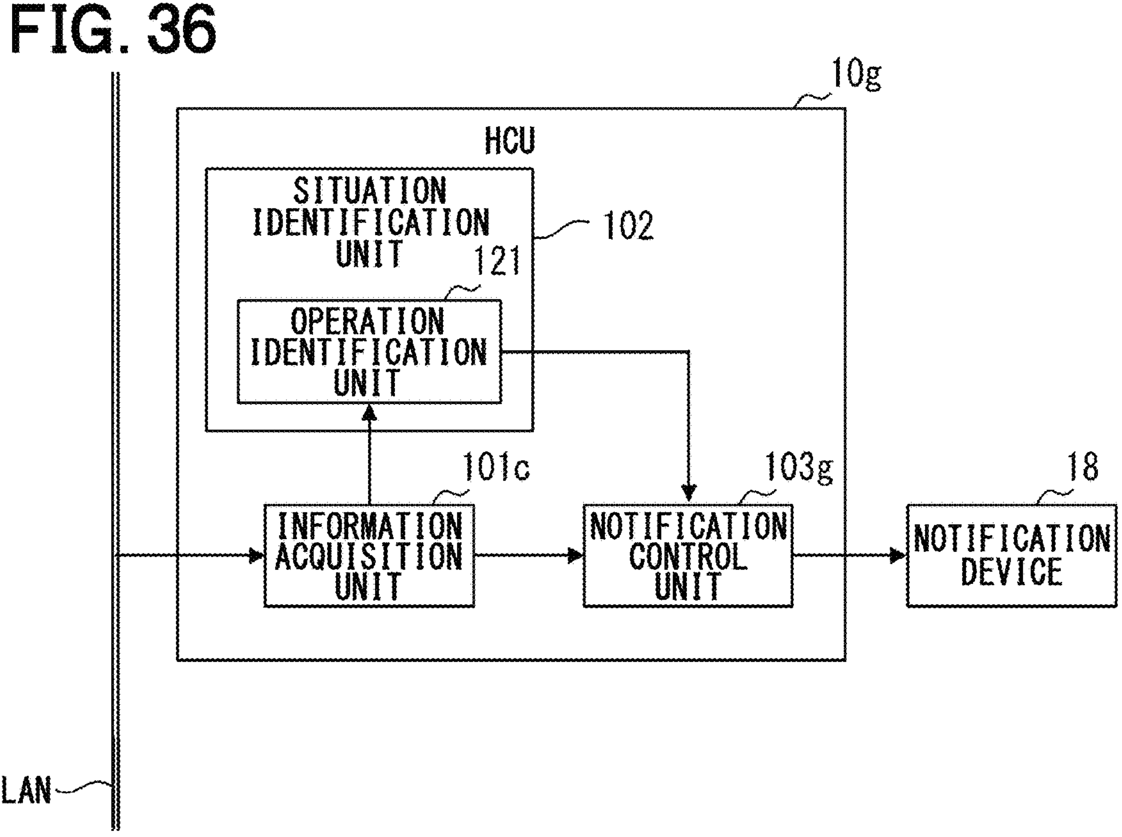
FIG. 36 is a diagram illustrating an example of a schematic configuration of an HCU.
FIG. 37 is a diagram for describing an example of display of a surrounding situation image.

Next, a schematic configuration of the HCU 10*g* will be described with reference to FIG. 36. As illustrated in FIG. 36, the HCU 10*g* includes the information acquisition unit 101*c*, the situation identification unit 102, and a notification control unit 103*g* as functional blocks regarding the control of the notification by the notification device 18. The HCU 10*g* is similar to the HCU 10*c* of the seventh embodiment except that a notification control unit 103*g* is provided instead of the notification control unit 103*c*. The HCU 10*g* also corresponds to a vehicle notification control device. Execution of processing of each functional block of the HCU 10*g* by the computer also corresponds to execution of the vehicle notification control method.

The notification control unit 103*g* is similar to the notification control unit 103*c* of the seventh embodiment except that some processes are different. Hereinafter, this different point will be described. In a case where the above-described route intersection occurs, the notification control unit 103*g* displays the scheduled route image of the host vehicle up to the point where the route intersection occurs. Hereinafter, point where the route intersection occurs is referred to as a route intersection point. On the other hand, the notification control unit 103*g* displays the traveling direction image indicating the scheduled traveling direction of the host vehicle on the exit side of the intersection through which the host vehicle passes. The scheduled route image and the surrounding situation image are displayed on the indicator 181. According to the above configuration, since the display at the route intersection point is reduced, the occupant can easily focus on the display of the intersection target vehicle. In addition, by displaying the traveling direction image while reducing the display at the route intersection point, the occupant can easily recognize the route of the host vehicle.

An example of display of the surrounding situation image will be described with reference to FIG. 37. In FIG. 37, a case where the situation is similar to that described in FIG. 10 is taken as an example. In FIG. 37, the surrounding vehicle image OVI corresponds to an image of the intersection target vehicle. In addition, in the example of FIG. 37, it is assumed that a point where the intersection target vehicle is located is a route intersection point. As illustrated in FIG. 37, the notification control unit 103*g* displays the scheduled route image from the host vehicle to the position of the intersection target vehicle which is the route intersection point.

It is preferable that in a case where the above-described route intersection occurs and in a case where the host vehicle turns right or left on the lane of the intersection target vehicle, the notification control unit 103*g* performs the following. The notification control unit 103*g* may display the scheduled route image of the host vehicle up to the route intersection point, and may display the scheduled route image so that the image does not reach an extension of the lane of the intersection target vehicle. The right or left turn referred to herein may be a right turn in a country where left-hand traffic is legalized, and a left turn in a country where right-hand traffic is legalized. According to the above configuration, since the traveling route of the oncoming vehicle of the host vehicle is not hidden by the scheduled route image, the occupant can easily understand the movement of the oncoming vehicle.

Figure 38:
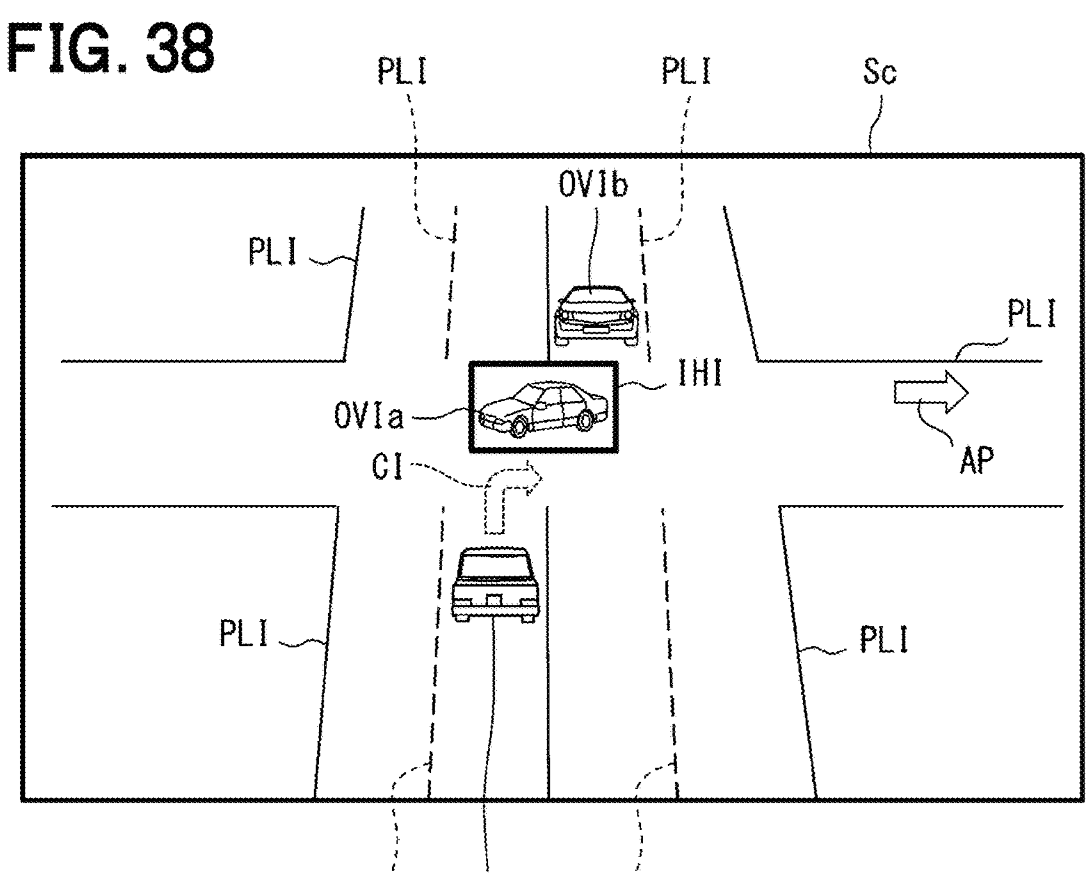
FIG. 38 is a diagram for describing an example of display of a surrounding situation image in a case where the host vehicle turns right on the lane of the intersection target vehicle.

An example of display of a surrounding situation image in a case where the host vehicle turns right on the lane of the intersection target vehicle will be described with reference to FIG. 38. In FIG. 38, a case where the situation is similar to that described in FIG. 15 is taken as an example. In FIG. 38, the surrounding vehicle images OVIa and OVIb correspond to the images of the intersection target vehicle. The AP in FIG. 38 indicates the traveling direction image. As illustrated in FIG. 38, the notification control unit 103*g* displays the scheduled route image from the host vehicle to the position of the intersection target vehicle which is the route intersection point. As illustrated in FIG. 38, the notification control unit 103*g* displays the scheduled route image so that the image does not reach an extension of the lane of the intersection target vehicle. On the other hand, the traveling direction image is displayed on the exit side of the intersection through which the host vehicle passes.

Twelfth Embodiment

The present invention is not limited to the above-described embodiment, and may have a configuration as in the following the twelfth embodiment. Hereinafter, an example of the twelfth embodiment will be described with reference to the drawings. A vehicle system 1 of the twelfth embodiment is similar to the vehicle system 1*c* of the seventh embodiment except that an HCU 10*h* is included instead of the HCU 10*c*.

Figure 39:
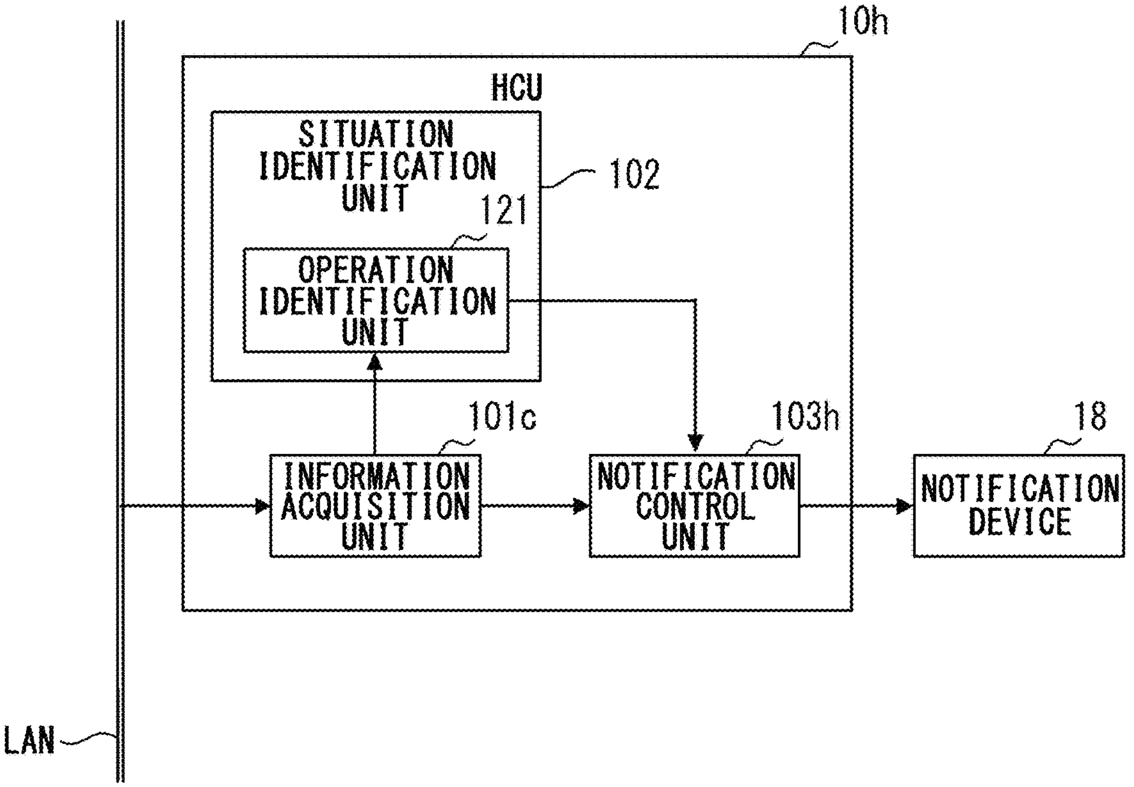
FIG. 39 is a diagram illustrating an example of a schematic configuration of an HCU.

Next, a schematic configuration of the HCU 10*h* will be described with reference to FIG. 39. As illustrated in FIG. 39, the HCU 10*h* includes an information acquisition unit 101*c*, a situation identification unit 102, and a notification control unit 103*h* as functional blocks regarding the control of the notification by the notification device 18. The HCU 10*h* is similar to the HCU 10*c* of the seventh embodiment except that the notification control unit 103*h* is provided instead of the notification control unit 103*c*. The HCU 10*h* also corresponds to a vehicle notification control device. Execution of processing of each functional block of the HCU 10*h* by the computer also corresponds to execution of the vehicle notification control method.

The notification control unit 103*h* is similar to the notification control unit 103*c* of the seventh embodiment except that some processes are different. Hereinafter, this different point will be described. The notification control unit 103*h* displays the target moving object image indicating the target moving object in the surrounding situation image. As described above, the target moving object is a moving object that is likely to obstruct passage of the host vehicle at the intersection. In the present embodiment, the target moving object may be limited to another vehicle other than the host vehicle. The scheduled route image, the target moving object image, and the surrounding situation image are displayed on the indicator 181. In addition, the notification control unit 103*h* switches the display style between the scheduled route image and the target moving object image according to the automation level of the automated driving of the host vehicle. According to this, in a case where which of the scheduled route image and the target moving object image is preferably display-highlighted is different according to the automation level, it is possible to perform preferable display according to the automation level.

It is preferable that the notification control unit 103*h* increases a degree of highlighting for the target moving object image with increase in the automation level. The notification control unit 103*h* may increase the degree of highlighting for the target moving object image further than the scheduled route image with increase in the automation level. On the other hand, it is preferable that the notification control unit 103*h* increases a degree of highlighting for the scheduled route image with decrease in the automation level. The notification control unit 103*h* may increase the degree of highlighting for the scheduled route image further than the target moving object image with decrease in the automation level. As an example, the notification control unit 103*h* may switch which of the scheduled route image and the target moving object image is highlighted according to whether the automated driving is the non-monitoring-obligation automated driving. That is, in a case where the automation level is LV3 or higher, the notification control unit 103*h* may display-highlight the target moving object image further than the scheduled route image. On the other hand, in a case where the automation level is less than LV3, the notification control unit 103*h* may display-highlight the scheduled route image further than the target moving object image.

The higher the automation level of the host vehicle, the higher the possibility that the occupant is not monitoring the surroundings. On the other hand, the lower the automation level of the host vehicle, the lower the possibility that the occupant is not monitoring the surroundings. In a case where the surroundings are not monitored, it is considered that the occupant is more concerned about whether the target moving object can be sensed by the system of the host vehicle rather than the route scheduled by the host vehicle. On the other hand, since the occupant can view the target moving object in a case where the surroundings are monitored, it is considered that the occupant is interested in the scheduled route of the host vehicle. According to the above configuration, it is possible to intelligibly present an image estimated to be necessary by the occupant among the target moving object image and the scheduled route image according to the automation level.

It is preferable that in a case where the host vehicle is located in the intersection and in a case where the automation level is changed in an unscheduled manner, the notification control unit 103*h* performs the following. It is preferable that the notification control unit 103*h* maintains the display styles of the scheduled route image and the target moving object image unchanged at the time of the unscheduled change in the automation level. The scheduled change in automation level is a planned change. On the other hand, the unscheduled change in the automation level is an unplanned sudden change. The scheduled change in the automation level is performed, for example, in a case where the permitted automation level transitions to a different travel section. The unscheduled change in the automation level is performed, for example, in a case where the automation level cannot be maintained due to a failure in recognition of the travel environment by the travel environment recognition unit. Alternatively, the unscheduled change may be performed in a case where an emergency vehicle approaches. The case where the automated driving level is changed in a unscheduled manner is considered to be a case where some trouble has occurred. In such a case, when the display styles of the scheduled route image and the target moving object image change, the amount of information to be processed increases, and the burden on the driver increases. According to the above configuration, even in a case where the automated driving level is changed in an unscheduled manner, it is possible to suppress an increase in the burden on the driver.

Figures 40, 41:
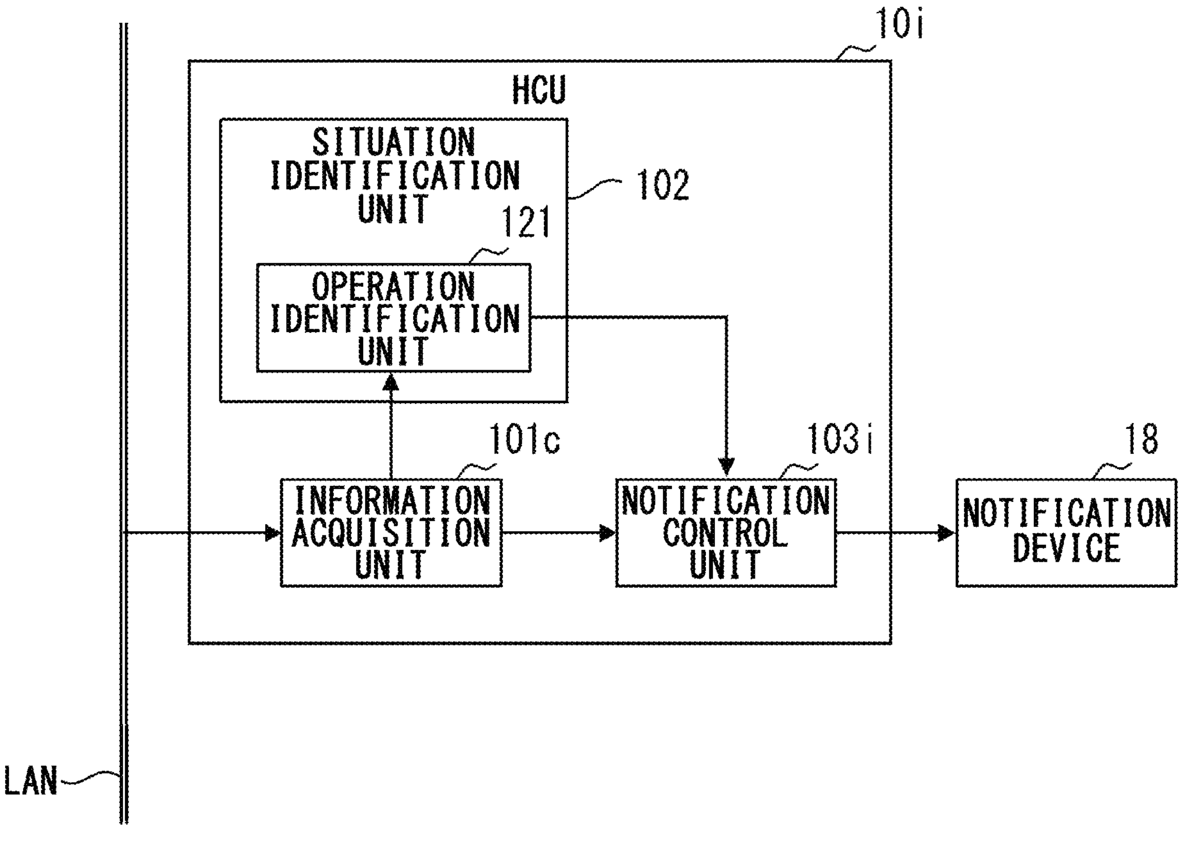
FIG. 40 is a diagram for describing an example of a change in a display style of the scheduled route image and the target moving object image according to the automation level.
FIG. 41 is a diagram illustrating an example of a schematic configuration of an HCU.

An example of a change in the display style of the scheduled route image and the target moving object image according to the automation level will be described with reference to FIG. 40. In FIG. 40, a case where the automation level is equal to or higher than the prescribed level is indicated as the automation level "high". In FIG. 40, a case where the automation level is lower than the prescribed level is indicated as the automation level "low". The prescribed level may be LV3, for example. In FIG. 40, a case where the dynamic driving level is changed in a non-planned manner is referred to as the automation level "sudden change". As illustrated in FIG. 40, the notification control unit 103*h* display-highlights the target moving object image in a case where the automation level is equal to or higher than the prescribed level. In this case, the scheduled route image is not display-highlighted. On the other hand, in a case where the automation level is lower than the prescribed level, the notification control unit 103*h* display-highlights the scheduled route image. In this case, the target moving object image may not be display-highlighted. In addition, in a case where the automated driving level is changed in a non-planned manner, the display style of the scheduled route image and the target moving object image is maintained even in a case where the automation level changes across the prescribed level. The maintaining of the display style in this case refers to maintaining the highlighted display style. For example, if not display-highlighted, a non-display-highlighted state is maintained, and if display-highlighted, a display-highlighted state is maintained.

The notification control unit 103*h* may display-highlight the scheduled route image further according to an increase in the automation level of the host vehicle. The notification control unit 103*h* may display-highlight the target moving object image further according to a decrease in the automation level. Some occupants may be more concerned about the route scheduled by the host vehicle in a case where the automation level is high. According to the above configuration, it is possible to present an image estimated to be more necessary to such a driver in an easy-to-understand manner.

Thirteenth Embodiment

The present invention is not limited to the above-described embodiment, and may have a configuration as in the following the thirteenth embodiment. Hereinafter, an example of the thirteenth embodiment will be described with reference to the drawings. A vehicle system 1 of the thirteenth embodiment is similar to the vehicle system 1*c* of the seventh embodiment except that an HCU 10*i* is included instead of the HCU 10*c*.

Next, a schematic configuration of the HCU 10*i* will be described with reference to FIG. 41. As illustrated in FIG. 41, the HCU 10*i* includes the information acquisition unit 101*c*, the situation identification unit 102, and a notification control unit 103*i* as functional blocks regarding the control of the notification by the notification device 18. The HCU 10*i* is similar to the HCU 10*c* of the seventh embodiment except that a notification control unit 103*i* is provided instead of the notification control unit 103*c*. The HCU 10*i* also corresponds to a vehicle notification control device. Execution of processing of each functional block of the HCU 10*i* by the computer also corresponds to execution of the vehicle notification control method.

The notification control unit 103*i* is similar to the notification control unit 103*c* of the seventh embodiment except that some processes are different. Hereinafter, this different point will be described. The notification control unit 103*i* performs as follows in a case where the temporary stop of the host vehicle is required in the intersection. The notification control unit 103*i* separately displays the scheduled route image up to the position where the host vehicle temporarily stops and the scheduled route image after the host vehicle temporarily stops. The notification control unit 103*i* may identify that it is necessary to temporarily stop the host vehicle in the intersection from the determination result by the action determination unit. In the present embodiment, it is assumed that the action determination unit determines that a temporary stop of the host vehicle is required in the intersection even in a case where there is no passage blocking object. For example, even in a case where an oncoming vehicle is not detected in the opposite lane at the time of turning right or left, a case where the vehicle temporarily stops just in case is exemplified. According to the above configuration, the occupant can easily intuitively recognize that the host vehicle temporarily stops. In addition, in a case where the temporary stop is made by a passage blocking object, it is easy to see the display of the image indicating the passage blocking object.

Figures 42, 43:
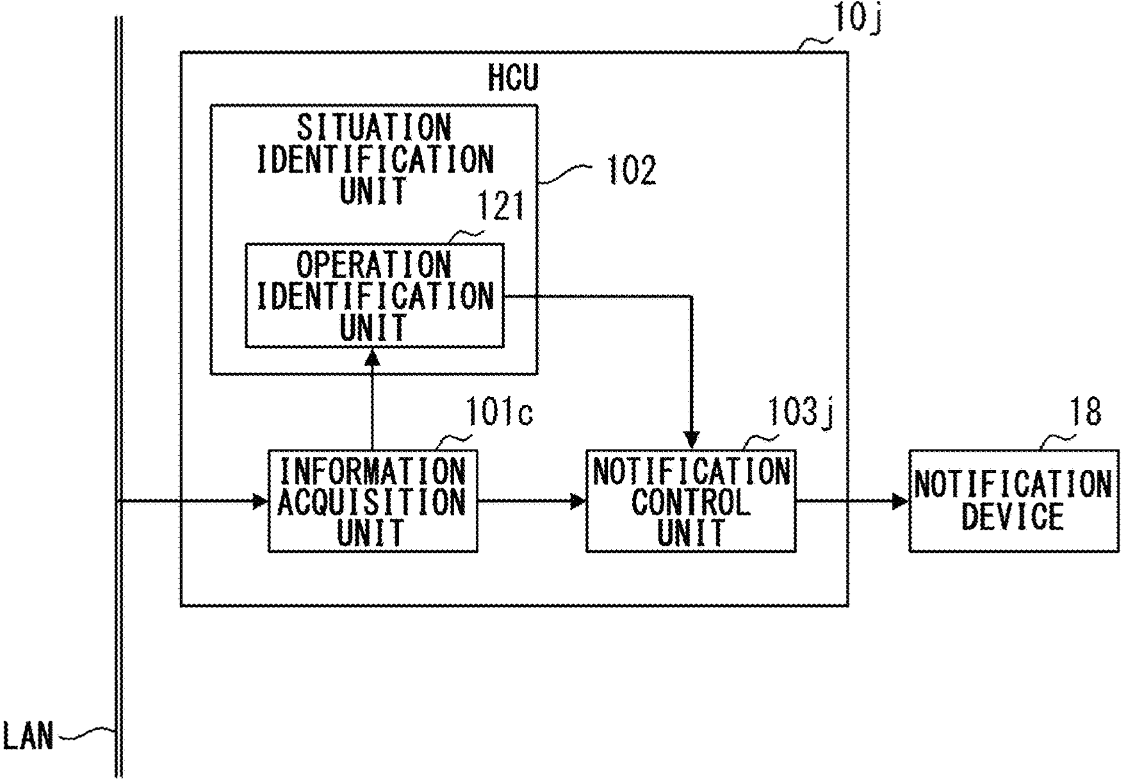
FIG. 42 is a diagram for describing an example of display of a surrounding situation image.
FIG. 43 is a diagram illustrating an example of a schematic configuration of an HCU.

An example of display of the surrounding situation image will be described with reference to FIG. 42. In FIG. 42, a case where there is a pedestrian who obstructs the right turn of the host vehicle scheduled to turn right at the intersection will be described as an example. In the example of FIG. 42, it is assumed that the host vehicle temporarily stops before crossing the opposite lane even if the host vehicle has not detected an oncoming vehicle. In the example of FIG. 42, it is assumed that a temporary stop is performed in front of a pedestrian as an obstacle. As illustrated in FIG. 42, the notification control unit 103*i* divides and displays the scheduled route image at the position where the host vehicle temporarily stops.

Fourteenth Embodiment

The present invention is not limited to the above-described embodiment, and may have a configuration as in the following the fourteenth embodiment. Hereinafter, an example of the fourteenth embodiment will be described with reference to the drawings. A vehicle system 1 of the fourteenth embodiment is similar to the vehicle system 1*c* of the seventh embodiment except that an HCU 10*j* is included instead of the HCU 10*c*.

Next, a schematic configuration of the HCU 10*j* will be described with reference to FIG. 43. As illustrated in FIG. 43, the HCU 10*j* includes the information acquisition unit 101*c*, the situation identification unit 102, and a notification control unit 103*j* as functional blocks regarding the control of the notification by the notification device 18. The HCU 10*j* is similar to the HCU 10*c* of the seventh embodiment except that a notification control unit 103*j* is provided instead of the notification control unit 103*c*. The HCU 10*j* also corresponds to a vehicle notification control device. Execution of processing of each functional block of the HCU 10*j* by the computer also corresponds to execution of the vehicle notification control method.

Figures 46, 47:
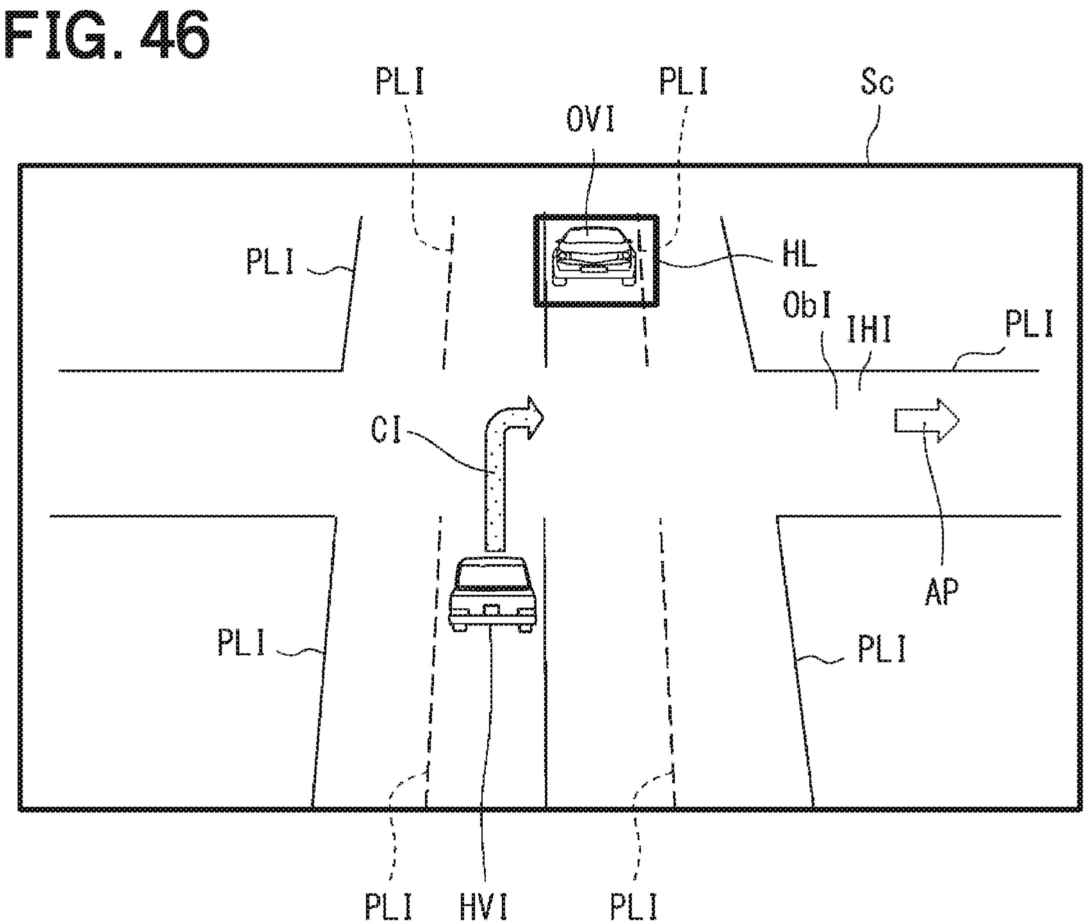
FIG. 46 is a diagram for describing an example of display of a surrounding situation image after a passage blocking object is detected.
FIG. 47 is a diagram for describing an example of a display where a vehicle turns right or left in a direction indicated by an arrow light and where a vehicle turns right or left without an arrow light.

The notification control unit 103*j* is similar to the notification control unit 103*c* of the seventh embodiment except that some processes are different. Hereinafter, this different point will be described. As illustrated in FIG. 47, the notification control unit 103*j* displays the surrounding situation image in a simplified manner when the host vehicle turns right or left at the intersection in the arrow lighting direction, compared with when the host vehicle turns right or left at the intersection without the arrow lighting. The simplified display includes omission of highlight display, single stroke of a scheduled route image, and the like. The arrow lighting direction is a direction indicated by an arrow lighting of an arrow-type traffic light. In a case where the arrow lighting is performed by the arrow-type traffic light, the traffic light indicates a red light for traffic in directions other than the direction of the arrow lighting. Therefore, it is less necessary to pay attention to the passage of the vehicle on the opposite lane and the pedestrian on the crosswalk at the time of turning right or left in the direction of the arrow lighting than at the time of turning right or left without the arrow lighting. According to the above configuration, it is possible to simplify the display with low necessity to pay attention and to make the display easy to see.

Fifteenth Embodiment

The present invention is not limited to the above-described embodiment, and may have a configuration as in the following the fifteenth embodiment. Hereinafter, an example of the fifteenth embodiment will be described with reference to the drawings. A vehicle system 1 of the fifteenth embodiment is similar to the vehicle system 1*c* of the seventh embodiment except that an HCU 10*k* is included instead of the HCU 10*c*.

Figures 44, 45:
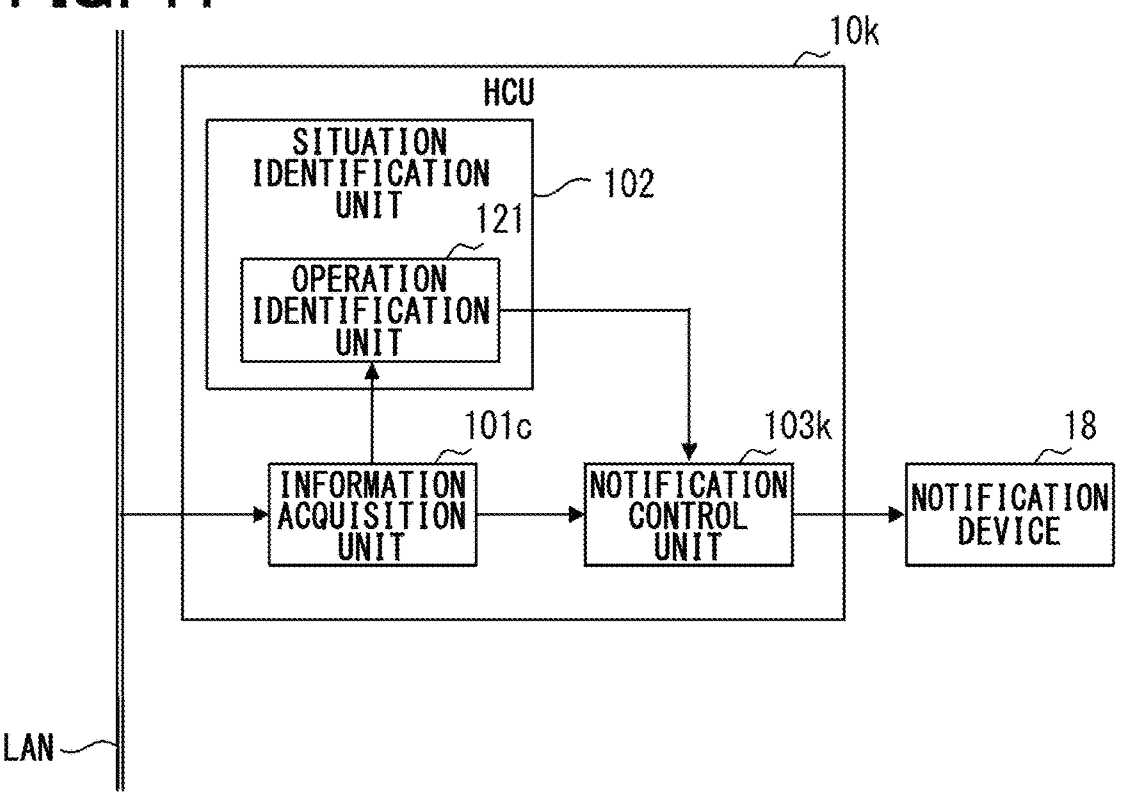
FIG. 44 is a diagram illustrating an example of a schematic configuration of an HCU.
FIG. 45 is a diagram for describing an example of display of a surrounding situation image before a passage blocking object is detected.

Next, a schematic configuration of the HCU 10*k* will be described with reference to FIG. 44. As illustrated in FIG. 44, the HCU 10*k* includes the information acquisition unit 101*c*, the situation identification unit 102, and a notification control unit 103*k* as functional blocks regarding the control of the notification by the notification device 18. The HCU 10*k* is similar to the HCU 10*c* of the seventh embodiment except that a notification control unit 103*k* is provided instead of the notification control unit 103*c*. The HCU 10*k* also corresponds to a vehicle notification control device. Execution of processing of each functional block of the HCU 10*k* by the computer also corresponds to execution of the vehicle notification control method.

The notification control unit 103*k* is similar to the notification control unit 103*c* of the seventh embodiment except that some processes are different. Hereinafter, this different point will be described. In a case where a new obstacle in the scheduled route image displayed before the host vehicle enters the intersection is detected after the host vehicle enters the intersection and the images is changed, the notification control unit 103*k* display-highlights the changes portion of the scheduled route image. As an example, there is a case where an oncoming vehicle that has not been detected is newly detected when the host vehicle turns right. According to the above configuration, the occupant can easily recognize that the situation has changed and the changed situation by display-highlighting the changed portion of the scheduled route image.

An example of display of the surrounding situation image will be described with reference to FIGS. 45 and 46. FIG. 45 is a diagram for describing an example of display of a surrounding situation image before a passage blocking object is detected. FIG. 46 is a diagram for describing an example of display of a surrounding situation image after the passage blocking object is detected. The examples of FIGS. 45 and 46 illustrate a case where the host vehicle turns right at an intersection. In a case where there is no passage blocking object, the notification control unit 103*k* displays a scheduled route image continuing from the current position of the host vehicle to the exit side of the intersection as shown in FIG. 45. Thereafter, in a case where a passage blocking object is detected, the notification control unit 103*k* switches the scheduled route image to display from the current position of the host vehicle to the temporary stop position of the host vehicle as illustrated in FIG. 46. In this case, as illustrated in FIG. 46, the notification control unit 103*k* may display the traveling direction image on the exit side of the intersection through which the host vehicle passes.

Sixteenth Embodiment

In the above-described embodiments, the configuration in which the HCU 10 makes the monitoring prompting notification related process is described, but the present invention is not necessarily limited thereto. For example, processing similar to the monitoring prompting notification related process may be performed by an electronic control device other than the HCU 10. In this case, the electronic control device other than the HCU 10 corresponds to a vehicle notification control device. In the above-described embodiments, the configuration in which the HCU 10*a* performs the temporary stop notification related process is described, but the present invention is not necessarily limited thereto. For example, processing similar to the temporary stop notification related process may be performed by an electronic control device other than the HCU 10*a*. In this case, the electronic control device other than the HCU 10*a* corresponds to a vehicle notification control device. In the above-described embodiments, the configuration in which the HCU 10*b* makes the obstacle factor notification related process is described, but the present invention is not necessarily limited thereto. For example, processing similar to the obstacle factor notification related process may be performed by an electronic control device other than the HCU 10*b*. In this case, the electronic control device other than the HCU 10*b* corresponds to a vehicle notification control device.

The present disclosure is not limited to the above-described embodiments, and various modifications can be made within the scope indicated in the claims, and embodiments obtained by appropriately combining technical means disclosed in different embodiments are also included in the technical scope of the present disclosure. The control unit and the method thereof described in the present disclosure may be realized by a dedicated computer including a processor programmed to execute one or a plurality of functions embodied by a computer program and a memory. Further, the device and the method thereof described in the present disclosure may be realized by using a dedicated hardware logic circuit. Alternatively, the device and the method thereof described in the present disclosure may be realized by one or more dedicated computers configured by a combination of a processor that executes a computer program and one or more hardware logic circuits. Furthermore, the computer program may be stored in a computer-readable non-transition tangible recording medium as an instruction executed by a computer.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle notification control device for a vehicle configured to execute automated driving, the vehicle notification control device comprising:

an operation identification unit configured to identify a predetermined operation of the vehicle to be executed in an intersection; and a notification control unit configured to cause a notification device provided in a vehicle compartment of the vehicle to make a notification, wherein the notification control unit is configured to make a notification related to the predetermined operation and prompting a driver of the vehicle to assist in passing the intersection during automated driving of the vehicle based on the operation identification unit identifying the predetermined operation to be executed in the intersection, the notification control unit is configured to make a monitoring prompting notification prompting the driver to monitor surroundings during automated driving of the vehicle based on the following conditions being satisfied:

(i) the operation identification unit identifies a right or left turn to be executed in the intersection as the predetermined operation, and (ii) a temporary stop of the vehicle is required in the intersection.

2. The vehicle notification control device according to claim 1, wherein the operation identification unit is configured to identify a scheduled right or left turn to be executed in the intersection as the predetermined operation, and the notification control unit is configured to make the monitoring prompting notification before the vehicle entering the intersection during automated driving of the vehicle based on the operation identification unit identifying the scheduled right or left turn to be executed in the intersection as the predetermined operation.

3. The vehicle notification control device according to claim 1, wherein the notification control unit is configured to make the monitoring prompting notification at a timing before the right or left turn being executed in the intersection and a timing before the vehicle entering a crosswalk after completion of the right or left turn during automated driving of the vehicle based on the operation identification unit identifying the right or left turn to be executed in the intersection as the predetermined operation.

4. The vehicle notification control device according to claim 1, wherein the notification control unit is configured to continue making the monitoring prompting notification until the vehicle completes the right or left turn in the intersection and starts straight traveling based on a start of the monitoring prompting notification.

5. The vehicle notification control device according to claim 1, wherein the notification control unit is configured to make a temporary stop notification indicating to the driver that the vehicle temporarily stops during automated driving of the vehicle based on the operation identification unit identifying a temporary stop to be executed in the intersection as the predetermined operation.

6. The vehicle notification control device according to claim 5, wherein the notification control unit is configured to display a surrounding situation image on an indicator, the surrounding situation image indicating a surrounding situation of the vehicle, and highlight a stop object that is a factor of the temporary stop in the surrounding situation image when making the temporary stop notification.

7. The vehicle notification control device according to claim 5, wherein the notification control unit is configured to display a surrounding situation image and a scheduled route image on an indicator, the surrounding situation image indicating a surrounding situation of the vehicle, the scheduled route image indicating a scheduled route of the vehicle in the surrounding situation image, and decrease visibility of the scheduled route image to be lower when the vehicle is temporarily stopped in the intersection than when the vehicle does not temporarily stop in the intersection.

8. The vehicle notification control device according to claim 7, wherein the notification control unit is configured to increase the visibility of the scheduled route image that has been decreased to be higher when the vehicle resumes passing the intersection after the temporary stop than when the vehicle does not temporarily stop in the intersection.

9. The vehicle notification control device according to claim 1, wherein the notification control unit is configured to make an obstacle factor notification indicating an obstacle during automated driving of the vehicle based on the operation identification unit identifying a right or left turn to be executed in the intersection as the predetermined operation and the obstacle being present as a factor that obstructs the right or left turn.

10. The vehicle notification control device according to claim 9, wherein the notification control unit is configured to make the obstacle factor notification indicating an oncoming vehicle during automated driving of the vehicle on a road where left-hand traffic is mandatory based on the operation identification unit identifying a right turn to be executed in the intersection as the predetermined operation and the oncoming vehicle being present as the obstacle, and make the obstacle factor notification indicating an object during automated driving of the vehicle on the road where left-hand traffic is mandatory based on the operation identification unit identifying a left turn to be executed in the intersection as the predetermined operation and the object being present as the obstacle, the object being either a pedestrian or a two-wheeled vehicle.

11. The vehicle notification control device according to claim 9, wherein the notification control unit is configured to make the obstacle factor notification based on change of an object to be the obstacle.

12. The vehicle notification control device according to claim 9, wherein the notification control unit is configured to display a surrounding situation image on an indicator, the surrounding situation image indicating a surrounding situation of the vehicle, display a situation of a lane that the vehicle is to enter by the right or left turn in the surrounding situation image before the right or left turn, and make the obstacle factor notification indicating the obstacle based on the obstacle that has not been identified in the lane being newly identified in the lane.

13. The vehicle notification control device according to claim 1, wherein the notification control unit is configured to display a surrounding situation image and a scheduled route image on an indicator for traveling in the intersection, the surrounding situation image indicating a surrounding situation of the vehicle, the scheduled route image indicating a scheduled route of the vehicle in the surrounding situation image.

14. The vehicle notification control device according to claim 13, wherein the vehicle is a host vehicle, the notification control unit is configured to highlight the scheduled route image based on occurrence of a route intersection compared with a case where the route intersection does not occur, the route intersection being an intersection where the scheduled route of the host vehicle intersects with an other vehicle or a scheduled route of the other vehicle, and display a portion of the scheduled route image that has modified due to the occurrence of the route intersection, with a different display style than another portion of the scheduled route image that is not modified.

15. The vehicle notification control device according to claim 14, wherein the notification control unit is configured to display the scheduled route image up to a region of a predetermined distance from an exit of the intersection that the host vehicle passes, and progressively hide a region of the scheduled route image where the host vehicle has passed.

16. The vehicle notification control device according to claim 14, wherein the notification control unit is configured to highlight the other vehicle that is in the route intersection with the host vehicle by changing a display style of the other vehicle based on the scheduled route image and the other vehicle being overlapped or close to each other.

17. The vehicle notification control device according to claim 14, wherein the notification control unit is configured to determine whether to highlight the scheduled route image based on a deviation amount by which the scheduled route modified due to the occurrence of the route intersection deviates from an extension of a traveling lane of the host vehicle, and display an image indicating lighting of a direction indicator of the host vehicle in the surrounding situation image based on the deviation amount being a prescribed value or more.

18. The vehicle notification control device according to claim 14, wherein the notification control unit is configured to perform rotational display based on the host vehicle being located outside the intersection, the rotational display being display in which the surrounding situation image transitions with movement of the host vehicle based on a traveling direction of the host vehicle and the host vehicle is positioned at a center of the display, and perform fixed display based on the host vehicle being located inside the intersection, the fixed display being display in which the surrounding situation image is fixedly displayed so as not to transition with movement of the host vehicle.

19. The vehicle notification control device according to claim 14, wherein the notification control unit is configured to switch between a rotational display and a fixed display according to an automation level of automated driving of the host vehicle, the rotational display being display in which the surrounding situation image transitions with movement of the host vehicle based on a traveling direction of the host vehicle and the host vehicle is positioned at a center of the display, the fixed display being display in which the surrounding situation image is fixedly displayed so as not to transition with movement of the host vehicle.

20. The vehicle notification control device according to claim 19, wherein the notification control unit is configured to perform the rotational display based on the automation level being lower than a prescribed level, and perform the fixed display based on the automation level being equal to or higher than the prescribed level.

21. The vehicle notification control device according to claim 14, wherein the notification control unit is configured to switch between a rotational display and a fixed display according to presence or absence of a target moving object based on the host vehicle being located in the intersection, the target moving object being a moving object likely to obstruct the host vehicle passing the intersection, the rotational display being display in which the surrounding situation image transitions with movement of the host vehicle based on a traveling direction of the host vehicle and the host vehicle is positioned at a center of the display, the fixed display being display in which the surrounding situation image is fixedly displayed so as not to transition with movement of the host vehicle.

22. The vehicle notification control device according to claim 21, wherein the notification control unit is configured to perform the rotational display based on the host vehicle being located in the intersection and the target moving object being present, and performs the fixed display based on the host vehicle being located in the intersection and the target moving object being absent.

23. The vehicle notification control device according to claim 14, wherein the notification control unit is configured to simultaneously display a rotational display and a fixed display in different display areas based on the display areas configured to display the surrounding situation image being present, the rotational display being display in which the surrounding situation image transitions with movement of the host vehicle based on a traveling direction of the host vehicle and the host vehicle is positioned at a center of the display, the fixed display being display in which the surrounding situation image is fixedly displayed so as not to transition with movement of the host vehicle.

24. The vehicle notification control device according to claim 13, wherein the vehicle is a host vehicle, and the notification control unit is configured to superimpose another vehicle image indicating an other vehicle on the scheduled route image in the surrounding situation image based on the scheduled route of the host vehicle intersecting with the other vehicle or a scheduled route of the other vehicle.

25. The vehicle notification control device according to claim 13, wherein the vehicle is a host vehicle, the notification control unit is configured to display the scheduled route image up to a point where route intersection occurs based on occurrence of the route intersection, the route intersection being an intersection where the scheduled route of the host vehicle intersects with an other vehicle or a scheduled route of the other vehicle, and display a traveling direction image indicating a traveling direction scheduled by the host vehicle at an exit of the intersection that the host vehicle passes.

26. The vehicle notification control device according to claim 13, wherein the notification control unit is configured to display a target moving object image in the surrounding situation image, the target moving image indicating a target moving object that is a moving object likely to obstruct the vehicle passing the intersection, and switch a display style between the scheduled route image and the target moving object image according to an automation level of automated driving of the vehicle.

27. The vehicle notification control device according to claim 26, wherein the notification control unit is configured to increase a degree of highlighting for the target moving object image with increase in the automation level, and increase a degree of highlighting for the scheduled route image with decrease in the automation level.

28. The vehicle notification control device according to claim 26, wherein the notification control unit is configured to maintain display styles for the scheduled route image and the target moving object image unchanged at time of unscheduled change in the automation level based on the vehicle being located in the intersection.

29. The vehicle notification control device according to claim 13, wherein the notification control unit is configured to display the scheduled route image by separately displaying a route image up to a position of a temporary stop of the vehicle and a route image after the temporary stop of the vehicle based on the operation identification unit identifying the temporary stop to be executed in the intersection.

30. The vehicle notification control device according to claim 13, wherein the notification control unit is configured to display the surrounding situation image in a simplified manner in a case where the vehicle turns right or left in a direction indicated by an arrow light of an arrow-type traffic light in the intersection, compared with a case where the vehicle turns right or left in the intersection without the arrow-type traffic light.

31. The vehicle notification control device according to claim 13, wherein the notification control unit is configured to highlight a modified portion of the scheduled route image based on the scheduled route image being modified due to a newly detected obstacle in the intersection after the vehicle entering the intersection.

32. The vehicle notification control device according to claim 1, wherein the automated driving is automated driving without a surrounding monitoring obligation.

33. A vehicle notification control device for a vehicle configured to execute automated driving, the vehicle notification control device comprising:

an operation identification unit configured to identify a predetermined operation of the vehicle to be executed in an intersection; and a notification control unit configured to cause a notification device provided in a vehicle compartment of the vehicle to make a notification, wherein the notification control unit is configured to make a notification related to the predetermined operation and prompting a driver of the vehicle to assist in passing the intersection during automated driving of the vehicle based on the operation identification unit identifying the predetermined operation to be executed in the intersection, the notification control unit is configured to make a monitoring prompting notification prompting the driver to monitor surroundings during automated driving of the vehicle based on the following conditions being satisfied:

(i) the operation identification unit identifies a right or left turn to be executed in the intersection as the predetermined operation, and (ii) a request for a driving operation is temporarily made to the driver.

34. A vehicle notification control device for a vehicle configured to execute automated driving, the vehicle notification control device comprising:

an operation identification unit configured to identify a predetermined operation of the vehicle to be executed in an intersection; and a notification control unit configured to cause a notification device provided in a vehicle compartment of the vehicle to make a notification, wherein the notification control unit is configured to make a notification related to the predetermined operation and prompting a driver of the vehicle to assist in passing the intersection during automated driving of the vehicle based on the operation identification unit identifying the predetermined operation to be executed in the intersection, the notification control unit is configured to display a surrounding situation image and a scheduled route image on an indicator for traveling in the intersection, the surrounding situation image indicating a surrounding situation of the vehicle, the scheduled route image indicating a scheduled route of the vehicle in the surrounding situation image, the vehicle is a host vehicle, the notification control unit is configured to display the scheduled route image up to a point where route intersection occurs based on occurrence of the route intersection, the route intersection being an intersection where the scheduled route of the host vehicle intersects with an other vehicle or a scheduled route of the other vehicle, and display a traveling direction image indicating a traveling direction scheduled by the host vehicle at an exit of the intersection that the host vehicle passes, and the notification control unit is configured to display the scheduled route image without the scheduled route image reaching an extension of a lane of the other vehicle based on the occurrence of the route intersection and the operation identification unit identifying a right or left turn toward the lane of the other vehicle.

35. A vehicle notification control method for a vehicle configured to execute automated driving, the method comprising:

identifying a predetermined operation of the vehicle to be executed in an intersection; and making a notification related to the predetermined operation during automated driving of the vehicle based on the identifying the predetermined operation, the notification prompting a driver of the vehicle to assist in passing the intersection, wherein the making of the notification includes making a monitoring prompting notification prompting the driver to monitor surroundings during automated driving of the vehicle based on the following conditions being satisfied:

(i) the operation identification unit identifies a right or left turn to be executed in the intersection as the predetermined operation, and (ii) a temporary stop of the vehicle is required in the intersection.

36. A vehicle notification control method for a vehicle configured to execute automated driving, the method comprising:

identifying a predetermined operation of the vehicle to be executed in an intersection; and making a notification related to the predetermined operation during automated driving of the vehicle based on the identifying the predetermined operation, the notification prompting a driver of the vehicle to assist in passing the intersection, wherein the making of the notification includes making a monitoring prompting notification prompting the driver to monitor surroundings during automated driving of the vehicle based on the following conditions being satisfied:

(i) the operation identification unit identifies a right or left turn to be executed in the intersection as the predetermined operation, and (ii) a request for a driving operation is temporarily made to the driver.

* * * * *